US012362834B2

(12) United States Patent
Lee et al.

(10) Patent No.: US 12,362,834 B2
(45) Date of Patent: Jul. 15, 2025

(54) FREQUENCY COMB POWER CONTROL APPARATUS FOR 4D BEAMFORMING, AND METHOD THEREFOR

(71) Applicant: LG ELECTRONICS INC., Seoul (KR)

(72) Inventors: Hojae Lee, Seoul (KR); Sangrim Lee, Seoul (KR); Kijun Jeon, Seoul (KR); JaYeong Kim, Seoul (KR); Byungkyu Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 188 days.

(21) Appl. No.: 18/025,767

(22) PCT Filed: Sep. 16, 2020

(86) PCT No.: PCT/KR2020/012496
§ 371 (c)(1),
(2) Date: Mar. 10, 2023

(87) PCT Pub. No.: WO2022/059814
PCT Pub. Date: Mar. 24, 2022

(65) Prior Publication Data
US 2023/0353247 A1 Nov. 2, 2023

(51) Int. Cl.
*H04B 10/00* (2013.01)
*H04B 10/50* (2013.01)
(Continued)

(52) U.S. Cl.
CPC ......... *H04B 10/504* (2013.01); *H04B 10/548* (2013.01); *H04B 10/564* (2013.01)

(58) Field of Classification Search
CPC ... H04B 10/11; H04B 10/112; H04B 10/1121; H04B 10/1123; H04B 10/1125;
(Continued)

(56) References Cited

U.S. PATENT DOCUMENTS 8,154,340 B2    4/2012   Dupuy et al.
8,294,533 B2   10/2012   Dupuy et al.
(Continued)

FOREIGN PATENT DOCUMENTS

KR    10-1119228 B1    3/2012
KR    10-1720434 B1    3/2017
WO    2017/095878 A1    6/2017

*Primary Examiner* — Daniel G Dobson
(74) *Attorney, Agent, or Firm* — BRYAN CAVE LEIGHTON PAISNER LLP

(57) ABSTRACT

The present specification provides a method, performed by an apparatus, for transmitting at least one beam in a wireless communication system, the method comprising transmitting the at least one beam to another apparatus and receiving information about a result of measuring the at least one beam from the other apparatus, wherein the at least one beam is a beam generated on the basis of a signal synthesized from a laser signal being incident on a meta surface from a power controller, the laser signal consists of a plurality of frequency components, the synthesized signal is a signal in which power amplification is applied to each of the plurality of frequency components, and the power amplification is applied on the basis of the intensity regarding each of the plurality of frequency components.

9 Claims, 82 Drawing Sheets

(51) Int. Cl.
*H04B 10/548* (2013.01)
*H04B 10/564* (2013.01)
*H04J 14/00* (2006.01)

(58) Field of Classification Search
CPC ............ H04B 10/1127; H04B 10/1129; H04B 10/114; H04B 10/1141; H04B 10/1143; H04B 10/1149; H04B 10/116; H04B 10/118
See application file for complete search history.

(56) References Cited

U.S. PATENT DOCUMENTS

| | | |
|---|---|---|
| 9,583,980 B2 | 2/2017 | Yeh et al. |
| 2007/0071385 A1 | 3/2007 | Dorrer et al. |
| 2018/0183516 A1* | 6/2018 | Moision ................. H04L 27/38 |
| 2019/0165849 A1 | 5/2019 | Ashrafi et al. |
| 2020/0028261 A1 | 1/2020 | Foo |
| 2020/0178123 A1 | 6/2020 | Shan et al. |

* cited by examiner

FIG. 53

$$\begin{bmatrix} 0 & 1 & 2 & 3 & 4 \\ -1 & 0 & 1 & 2 & 3 \\ -2 & -1 & 0 & 1 & 2 \\ -3 & -2 & -1 & 0 & 1 \\ -4 & -3 & -2 & -1 & 0 \end{bmatrix}$$

FIG. 55

$$\begin{bmatrix} -2 & \boxed{0} & 2 & 4 & 6 \\ -3 & -1 & 1 & 3 & 5 \\ -4 & -2 & \boxed{0} & 2 & 4 \\ -5 & -3 & -1 & 1 & 3 \\ -6 & -4 & -2 & \boxed{0} & 2 \end{bmatrix}$$

FREQUENCY COMB POWER CONTROL APPARATUS FOR 4D BEAMFORMING, AND METHOD THEREFOR

CROSS-REFERENCE TO RELATED APPLICATIONS

This application is the National Stage filing under 35 U.S.C. 371 of International Application No. PCT/KR2020/012496, filed on Sep. 16, 2020, the contents of which are all hereby incorporated by reference herein in their entirety.

TECHNICAL FIELD

The present disclosure relates to an Optical Wireless Communication (OWC) system.

BACKGROUND

Optical wireless communication systems may be broadly divided into Visible Light Communication (VLC) and Free Space Optical communication (FSO) systems according to purpose and the frequency of photons.

Meanwhile, if 4D beamforming is performed without considering the power distribution of the frequency comb as in the prior art, the shape of the main beam is not uniform, and it is difficult to operate the steering for beam tracking uniformly, and interference problems due to increased sidelobes and peak gain loss of the main beam occur.

Accordingly, the present disclosure seeks to provide a method and device for controlling the power of a frequency comb of a laser source in order to reflect the frequency repetition characteristics of a 2D antenna array.

SUMMARY

According to one embodiment of the present disclosure, a method may be provided in which power amplification is applied based on an intensity for each of a plurality of frequency components.

According to the present disclosure, it is possible to form a beam with an optimal peak gain in a target cell area. In addition, the shape of the beam can be maintained uniformly when performing beamforming in the target cell area. Furthermore, interference magnitudes in areas other than the target cell area can be minimized.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 53 schematically illustrates of an example of a coefficient matrix, and FIG. 54 schematically illustrates of a laser output spectrum thereof.

FIG. 55 schematically illustrates another example of a coefficient matrix, and FIG. 56 schematically illustrates a laser output spectrum thereof.

DETAILED DESCRIPTION

In the present disclosure, "A or B" may mean "only A", "only B" or "both A and B". When expressed separately, "A or B" may be interpreted as "A and/or B" in the present disclosure. For example, in the present disclosure, "A, B or C" may mean "only A", "only B", "only C", or "any combination of A, B and C".

A slash (/) or a comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B" or "both A and B". Also, in the present disclosure, the expression "at least one of A or B" or "at least one of A and/or B" may be interpreted the same as "at least one of A and B".

Also, in the present disclosure, "at least one of A, B and C" may mean "only A", "only B", "only C", or "any combination of A, B and C". Also, "at least one of A, B or C" or "at least one of A, B and/or C" may mean "at least one of A, B and C".

In addition, parentheses used in the present disclosure may mean "for example". Specifically, when "control information (PDCCH)" is indicated, "PDCCH" may be proposed as an example of "control information". When separately expressed, "control information" in the present disclosure may be not limited to "intra prediction", and "PDCCH" may be proposed as an example of "control information". Further, when "control information (i.e., PDCCH)" is indicated, "PDCCH" may be proposed as an example of "control information".

Technical features that are individually described in one drawing in this specification may be implemented individually or simultaneously.

Hereinafter, new radio access technology (new RAT, NR) will be described.

As more and more communication devices require greater communication capacity, a need for improved mobile broadband communication compared to conventional radio access technology (RAT) has emerged. In addition, massive machine type communications (MTC), which provides various services anytime and anywhere by connecting multiple devices and objects, is also one of the major issues to be considered in next-generation communication. In addition, communication system design considering reliability and latency-sensitive services/terminals is being discussed. The introduction of next-generation wireless access technologies in consideration of such expanded mobile broadband communication, massive MTC, URLLC (Ultra-Reliable and Low Latency Communication) is being discussed, in this specification, for convenience, the corresponding technology is referred to as new RAT or NR.

Figure 1:
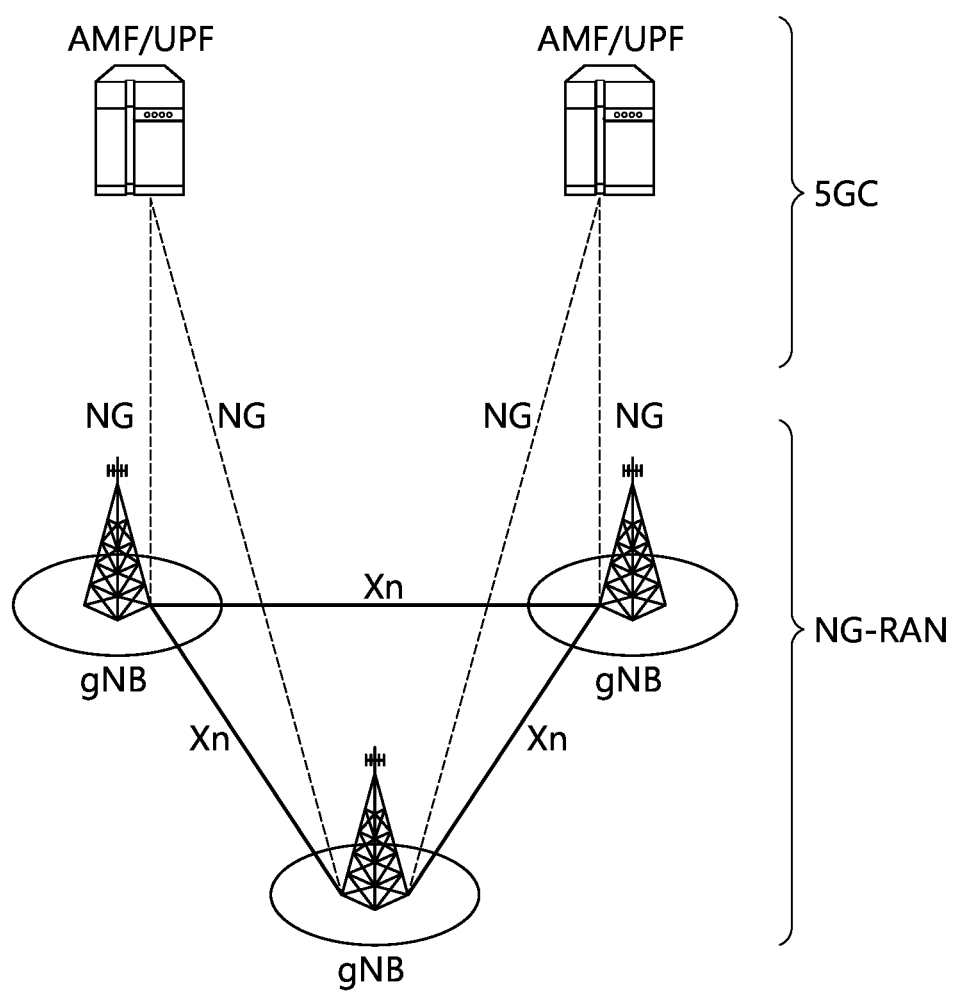
FIG. 1 illustrates a system structure of a New Generation Radio Access Network (NG-RAN) to which NR is applied.

FIG. 1 illustrates a system structure of a New Generation Radio Access Network (NG-RAN) to which NR is applied.

Referring to FIG. 1, a Next Generation-Radio Access Network (NG-RAN) may include a next generation-Node B (gNB) and/or eNB providing a user plane and control plane protocol termination to a user. FIG. 1 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 2:
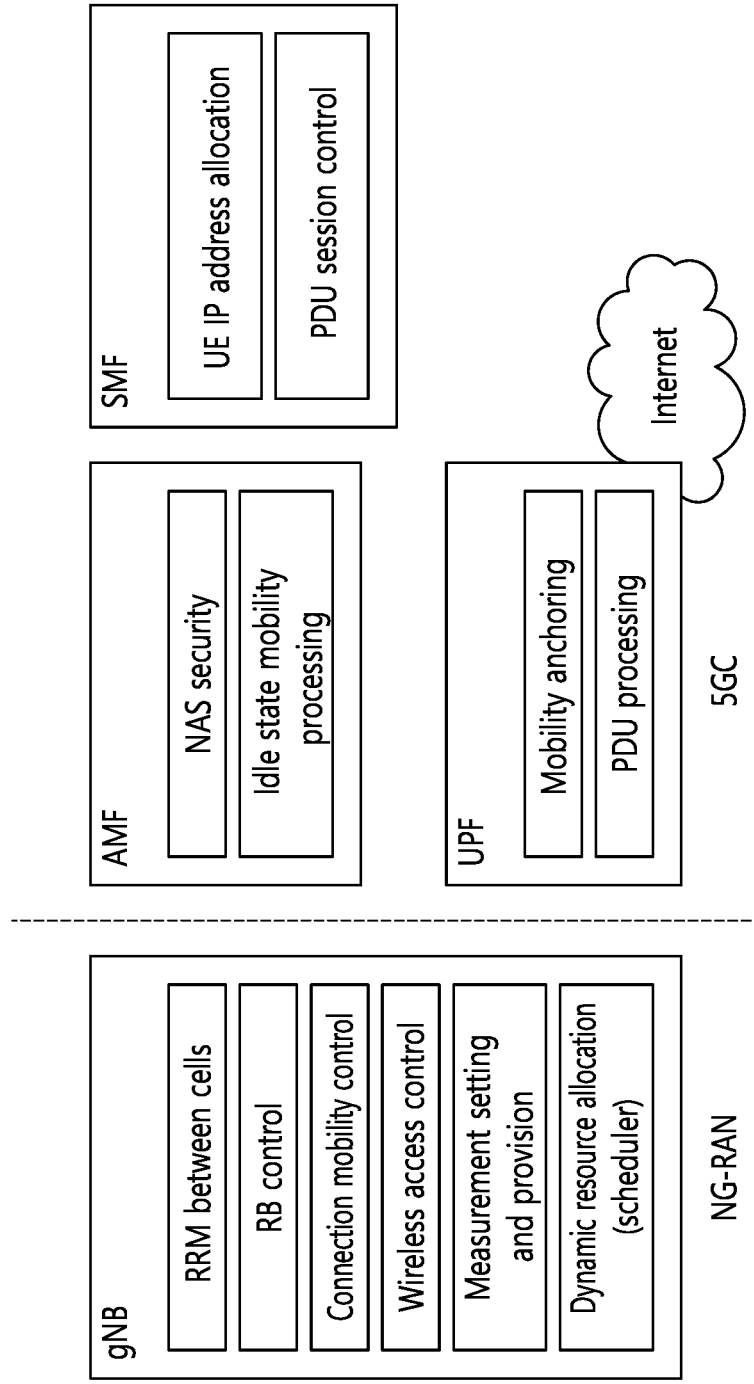
FIG. 2 illustrates the functional split between NG-RAN and 5GC.

FIG. 2 illustrates the functional split between NG-RAN and 5GC.

Referring to FIG. 2, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non-Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 3:
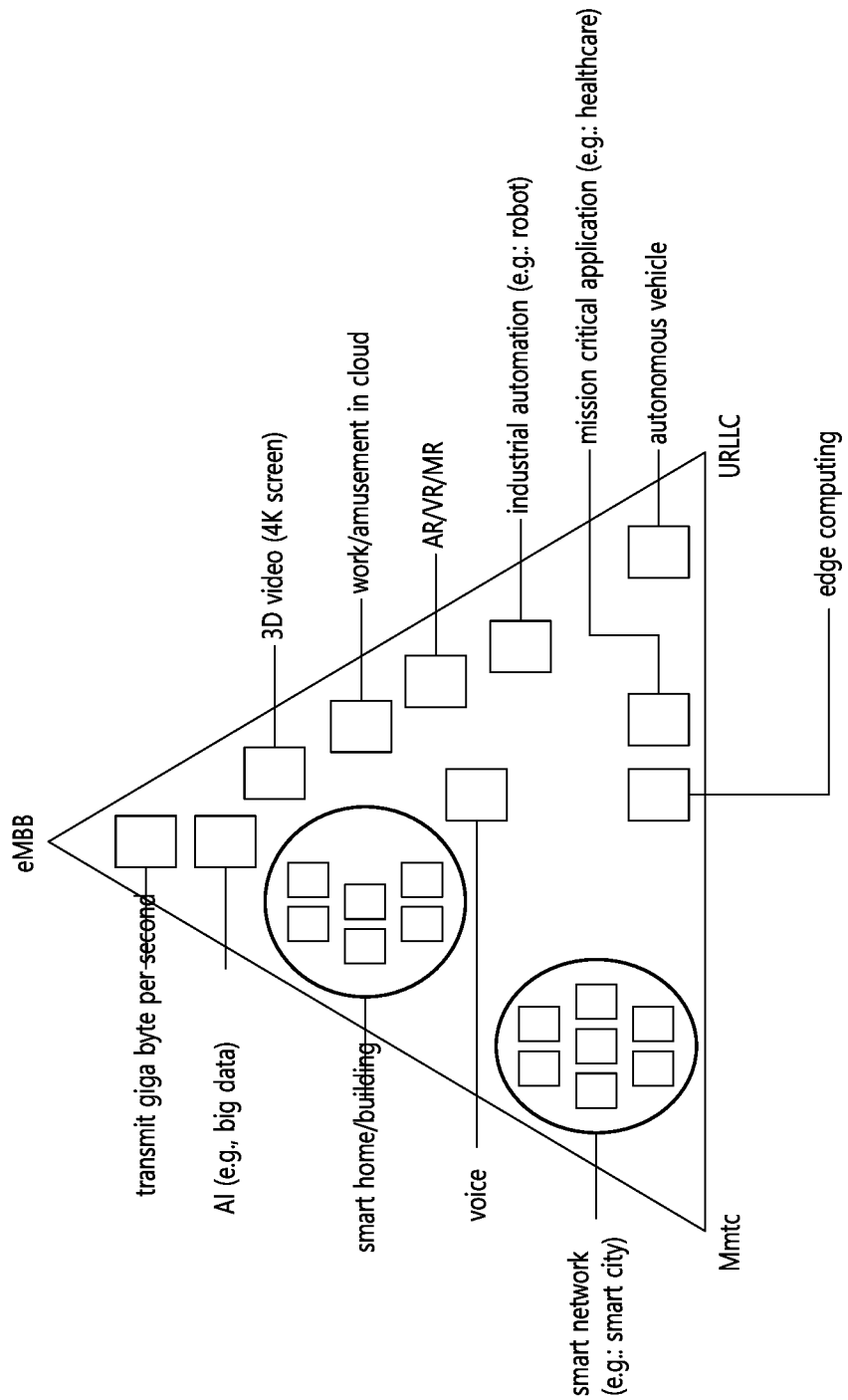
FIG. 3 shows examples of 5G usage scenarios to which the technical features of the present specification can be applied.

FIG. 3 shows examples of 5G usage scenarios to which the technical features of the present specification can be applied. The 5G usage scenarios shown in FIG. 3 are only exemplary, and the technical features of the present specification can be applied to other 5G usage scenarios which are not shown in FIG. 3.

Referring to FIG. 3, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of use cases included in the triangle of FIG. 3 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location-based information systems. Use cases of logistics and freight tracking typically require low data rates, but require a large range and reliable location information.

Hereinafter, examples of next-generation communication (e.g., 6G) that can be applied to the embodiments of the present specification will be described.

<6G System General>

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 1 below. That is, Table 1 shows the requirements of the 6G system.

TABLE 1

| Per device peak data rate | 1 Tbps |
|---|---|
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

Figure 4:
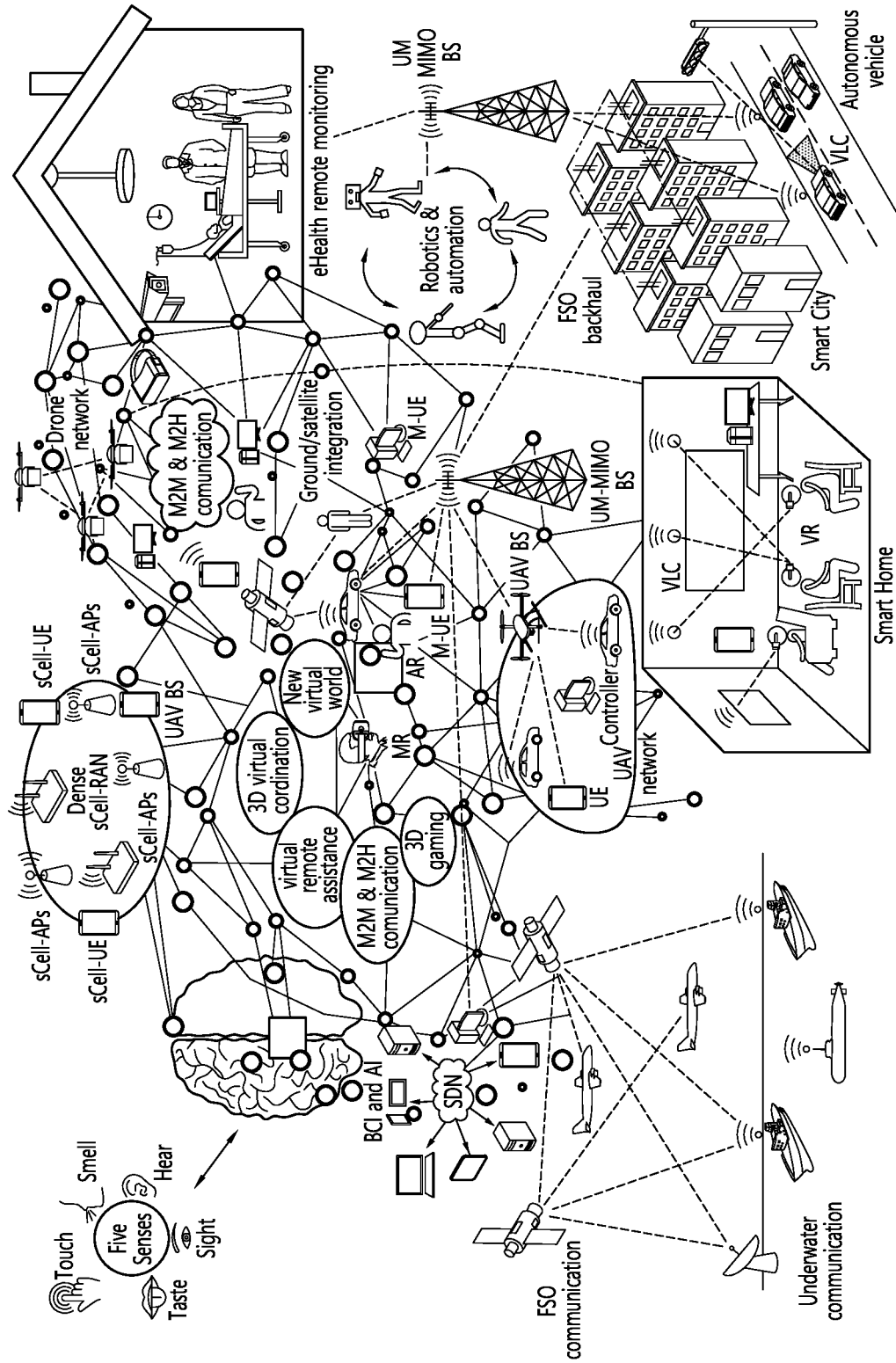
FIG. 4 is a diagram showing an example of a communication structure that can be provided in a 6G system.

The 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security. FIG. 4 is a diagram showing an example of a communication structure that can be provided in a 6G system. The 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimemtion connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduces costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

<Core Implementation Technology of 6G System>
Artificial Intelligence

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

An artificial neural network is an example of connecting several perceptrons.

Figure 5:
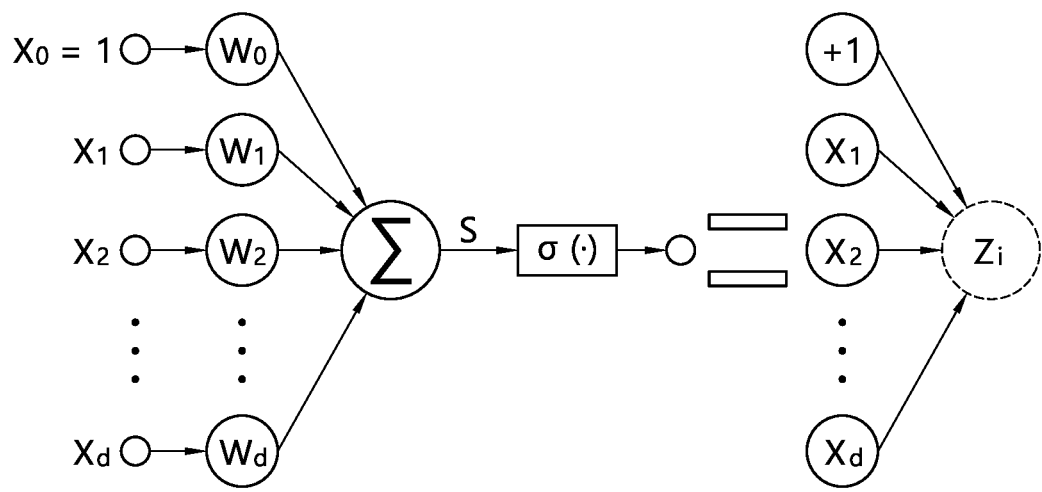
FIG. 5 schematically illustrates an example of a perceptron structure.

FIG. 5 schematically illustrates an example of a perceptron structure.

Referring to FIG. 5, if the input vector x=(x1, x2 . . . , xd) is input, each component is multiplied by the weight (W1, W2 . . . , Wd), after summing up all the results, applying the activation function σ(•), the entire process above is called a perceptron. The huge artificial neural network structure may extend the simplified perceptron structure shown in FIG. 5 and apply input vectors to different multi-dimensional perceptrons. For convenience of description, an input value or an output value is referred to as a node.

Meanwhile, the perceptron structure shown in FIG. 5 can be described as being composed of a total of three layers based on input values and output values. An artificial neural network in which H number of (d+1) dimensional perceptrons exist between the 1st layer and the 2nd layer and K number of (H+1) dimensional perceptrons between the 2nd layer and the 3rd layer can be expressed as shown in FIG. 6.

Figure 6:
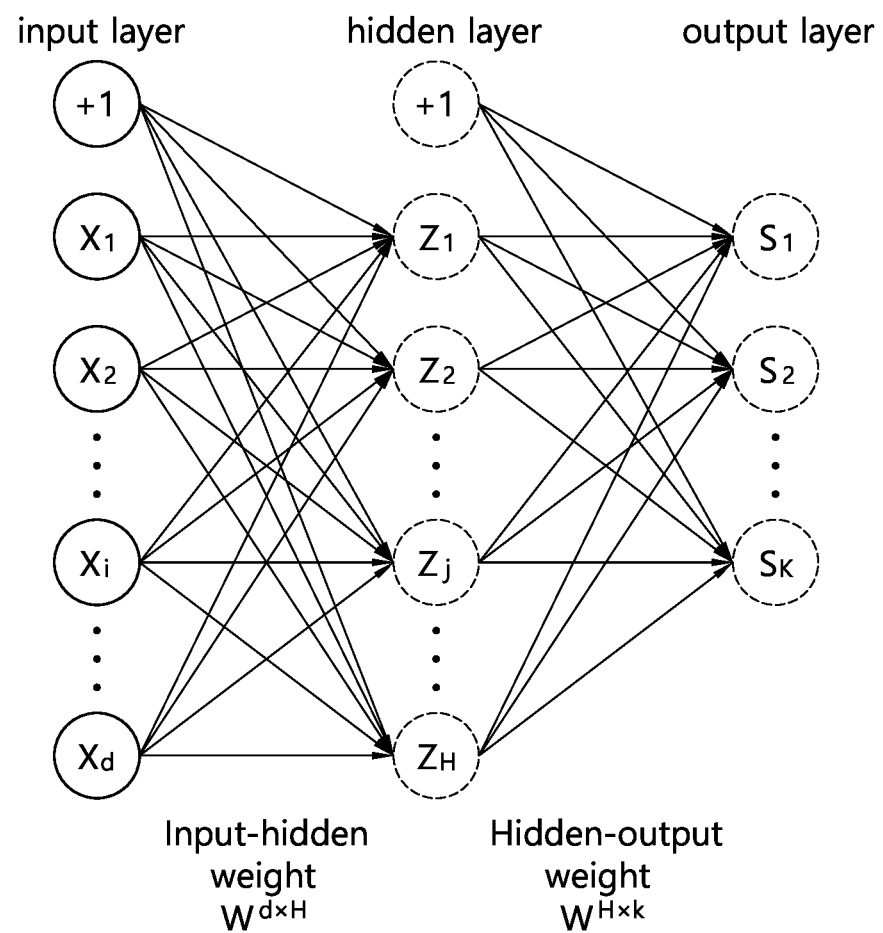
FIG. 6 schematically illustrates an example of a multilayer perceptron structure.

FIG. 6 schematically illustrates an example of a multi-layer perceptron structure.

The layer where the input vector is located is called the input layer, the layer where the final output value is located is called the output layer, and all the layers located between the input layer and the output layer are called hidden layers. In the example of FIG. 6, three layers are disclosed, but when counting the number of layers of an actual artificial neural network, since the count excludes the input layer, it can be regarded as a total of two layers. The artificial neural network is composed of two-dimensionally connected perceptrons of basic blocks.

The above-described input layer, hidden layer, and output layer can be jointly applied to various artificial neural network structures such as CNN and RNN, which will be described later, as well as multi-layer perceptrons. As the number of hidden layers increases, the artificial neural network becomes deeper, and a machine learning paradigm that uses a sufficiently deep artificial neural network as a learning model is called deep learning. In addition, the artificial neural network used for deep learning is called a deep neural network (DNN).

Figure 7:
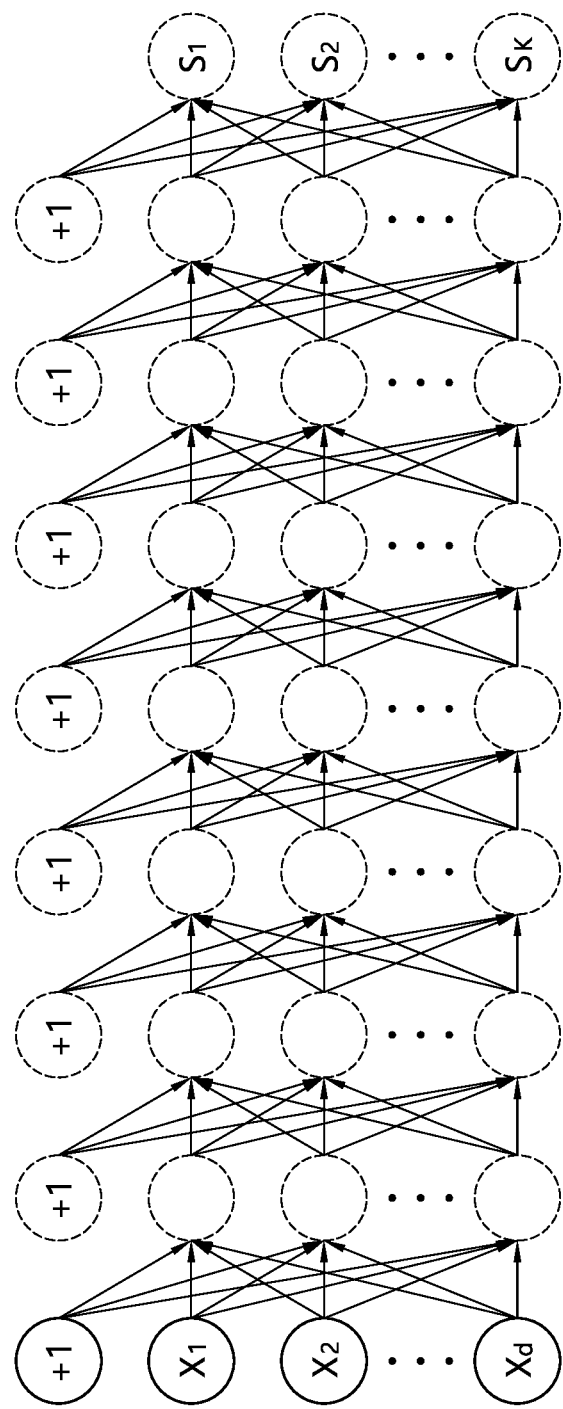
FIG. 7 schematically illustrates a deep neural network example.

FIG. 7 schematically illustrates a deep neural network example.

The deep neural network shown in FIG. 7 is a multi-layer perceptron consisting of 8 hidden layers+8 output layers. The multilayer perceptron structure is expressed as a fully-connected neural network. In a fully-connected neural network, there is no connection relationship between nodes located on the same layer, and there is a connection relationship only between nodes located on adjacent layers. DNN has a fully connected neural network structure and is composed of a combination of multiple hidden layers and activation functions, so it can be usefully applied to identify the correlation characteristics between inputs and outputs. Here, the correlation characteristic may mean a joint probability of input and output.

On the other hand, depending on how a plurality of perceptrons are connected to each other, various artificial neural network structures different from the aforementioned DNN can be formed.

Figure 8:
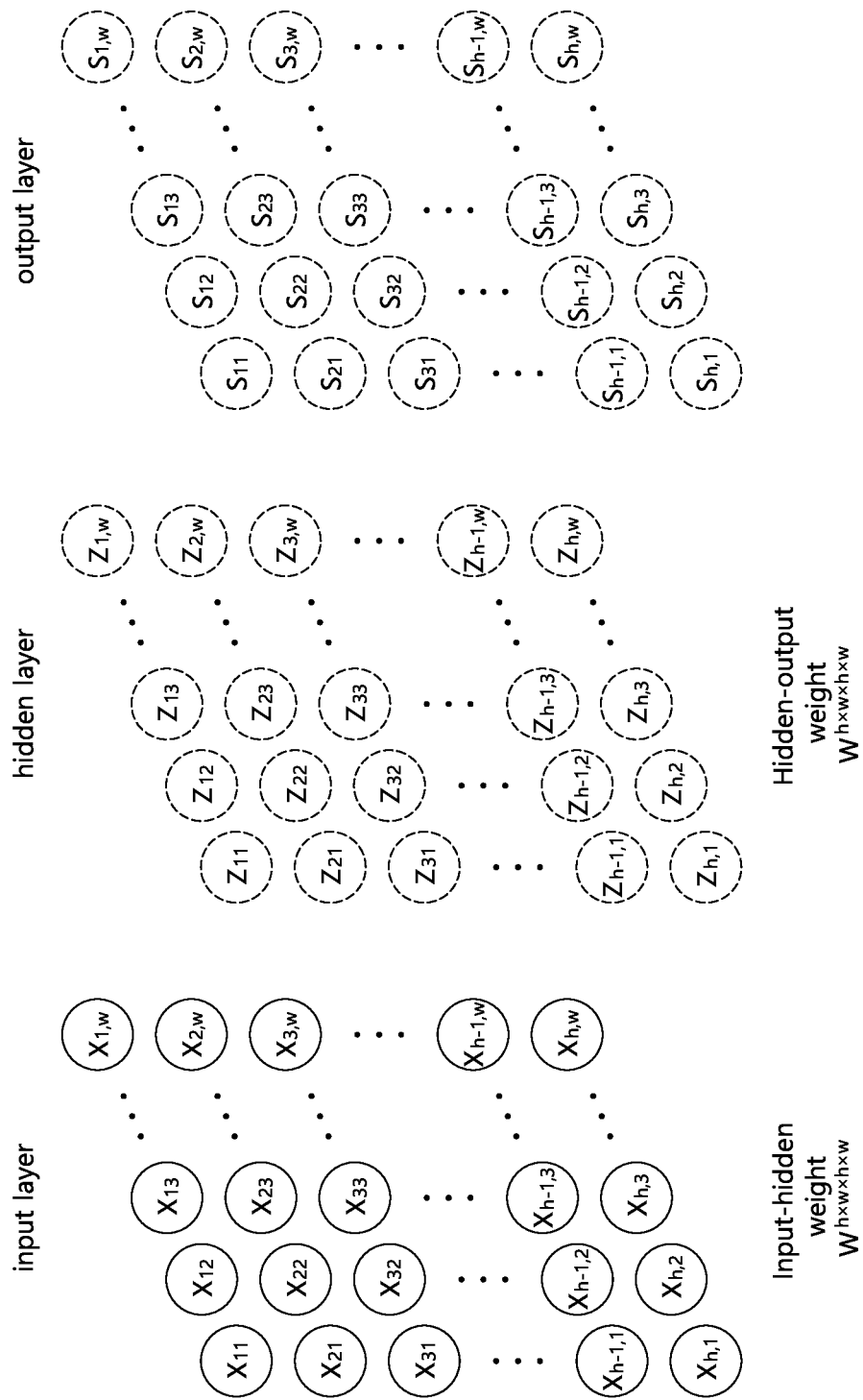
FIG. 8 schematically illustrates an example of a convolutional neural network.

FIG. 8 schematically illustrates an example of a convolutional neural network.

In DNN, nodes located inside one layer are arranged in a one-dimensional vertical direction. However, in FIG. 8, it can be assumed that the nodes are two-dimensionally arranged with w nodes horizontally and h nodes vertically (convolutional neural network structure of FIG. 8). In this case, since a weight is added for each connection in the connection process from one input node to the hidden layer, a total of h×w weights must be considered. Since there are h×w nodes in the input layer, a total of h2w2 weights are required between two adjacent layers.

Figure 9:
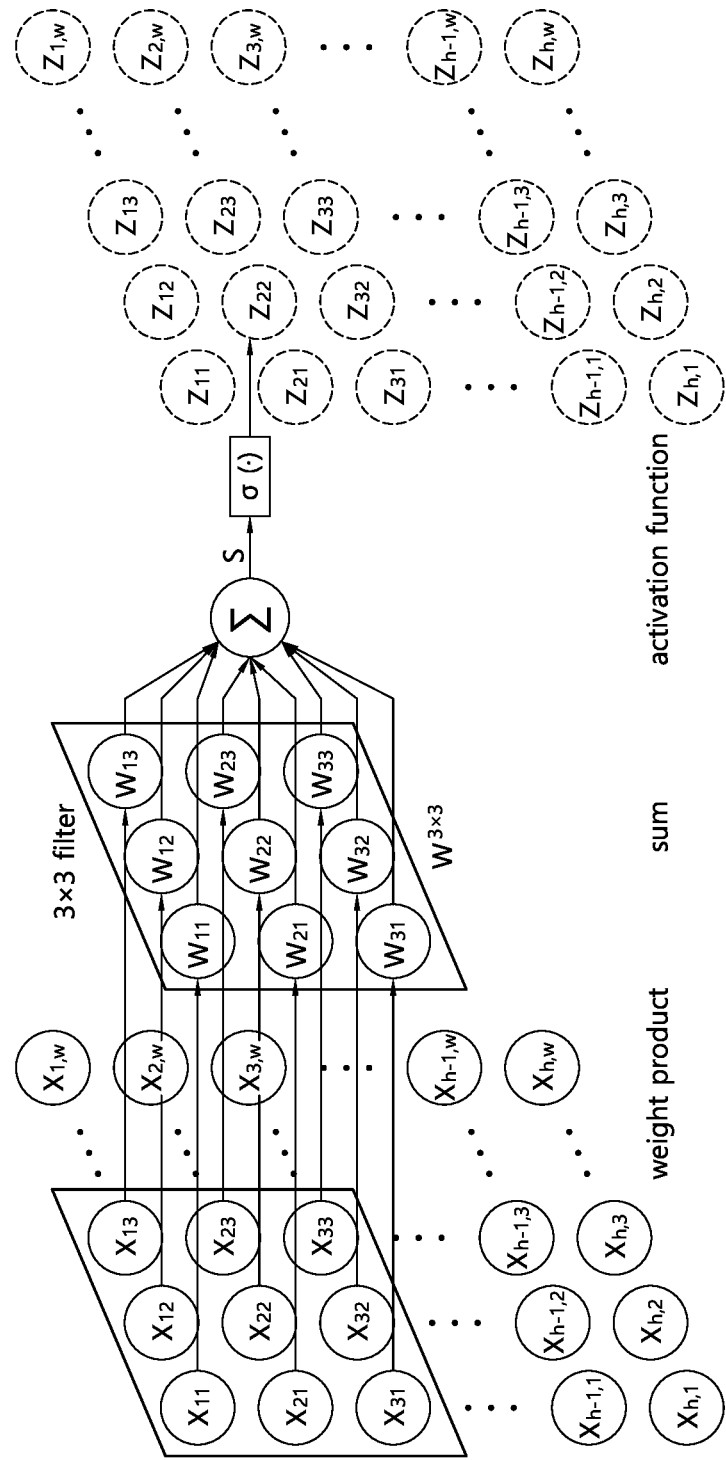
FIG. 9 schematically illustrates an example of a filter operation in a convolutional neural network.

The convolutional neural network of FIG. 8 has a problem that the number of weights increases exponentially according to the number of connections, so instead of considering all mode connections between adjacent layers, assuming that a filter having a small size exists, as shown in FIG. 9, a weighted sum and an activation function operation are performed on a portion where the filters overlap.

FIG. 9 schematically illustrates an example of a filter operation in a convolutional neural network.

One filter has weights corresponding to the number of filters, and learning of weights can be performed so that a specific feature on an image can be extracted as a factor and output. In FIG. 9, a 3×3 size filter is applied to the 3×3 area at the top left of the input layer, and the weighted sum and activation function calculations are performed on the corresponding node, and the resulting output value is stored in z22.

The filter scans the input layer while moving horizontally and vertically at regular intervals, performs weighted sum and activation function calculations, and places the output value at the position of the current filter. This operation method is similar to the convolution operation for images in the field of computer vision, so the deep neural network of this structure is called a convolutional neural network (CNN), a hidden layer generated as a result of the convolution operation is called a convolutional layer. Also, a neural network having a plurality of convolutional layers is referred to as a deep convolutional neural network (DCNN).

In the convolution layer, the number of weights may be reduced by calculating a weighted sum by including only nodes located in a region covered by the filter in the node where the current filter is located. This allows one filter to be used to focus on features for a local area. Accordingly, CNN can be effectively applied to image data processing in which a physical distance in a 2D area is an important criterion. Meanwhile, in the CNN, a plurality of filters may be applied immediately before the convolution layer, and a plurality of output results may be generated through a convolution operation of each filter.

Meanwhile, there may be data whose sequence characteristics are important according to data attributes. Considering the length variability and precedence relationship of these sequence data, input one element on the data sequence at each time step, a structure in which an output vector (hidden vector) of a hidden layer output at a specific point in time is input together with the next element in a sequence to an artificial neural network is called a recurrent neural network structure.

Figure 10:
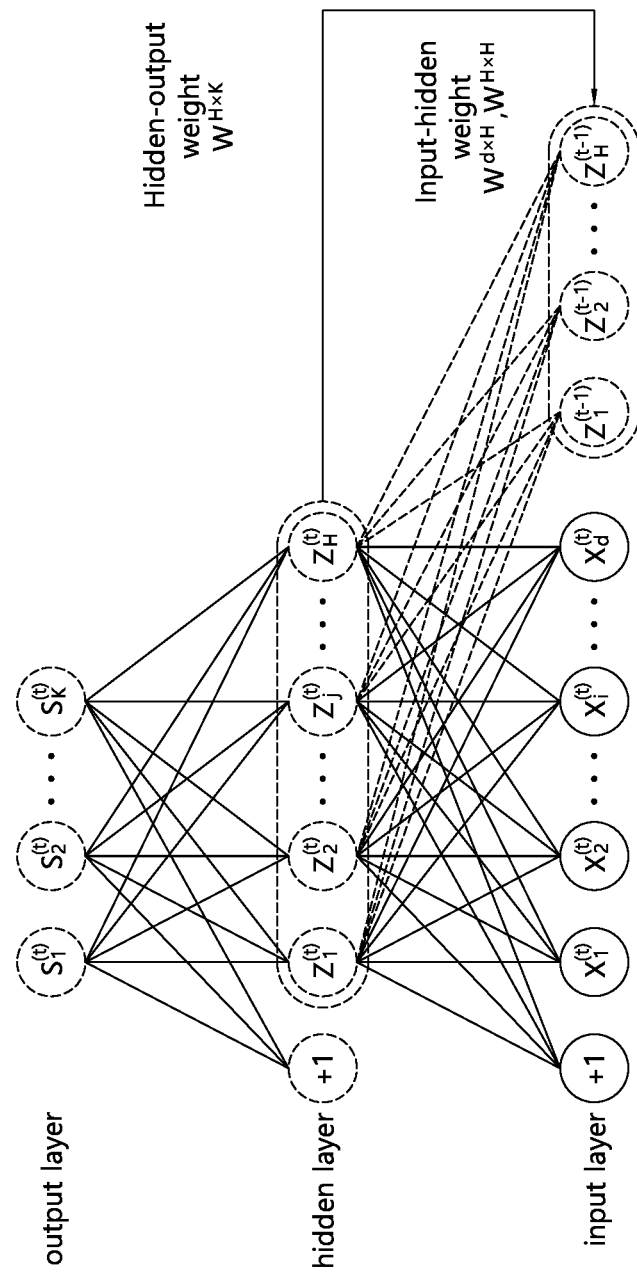
FIG. 10 schematically illustrates an example of a neural network structure in which a cyclic loop exists.

FIG. 10 schematically illustrates an example of a neural network structure in which a cyclic loop exists.

Referring to FIG. 10, a recurrent neural network (RNN) is a structure that applies a weighted sum and an activation function in the process of inputting an element (x1(t), x2(t) . . . , xd(t)) of any gaze t on the data sequence to the fully connected neural network, by entering together the hidden vector (z1(t−1), z2(t−1) . . . , zH(t−1)) of the immediately preceding time point t−1. The reason why the hidden vector is transmitted to the next time point in this way is that information in the input vector at previous time points is regarded as being accumulated in the hidden vector of the current time point.

Figure 11:
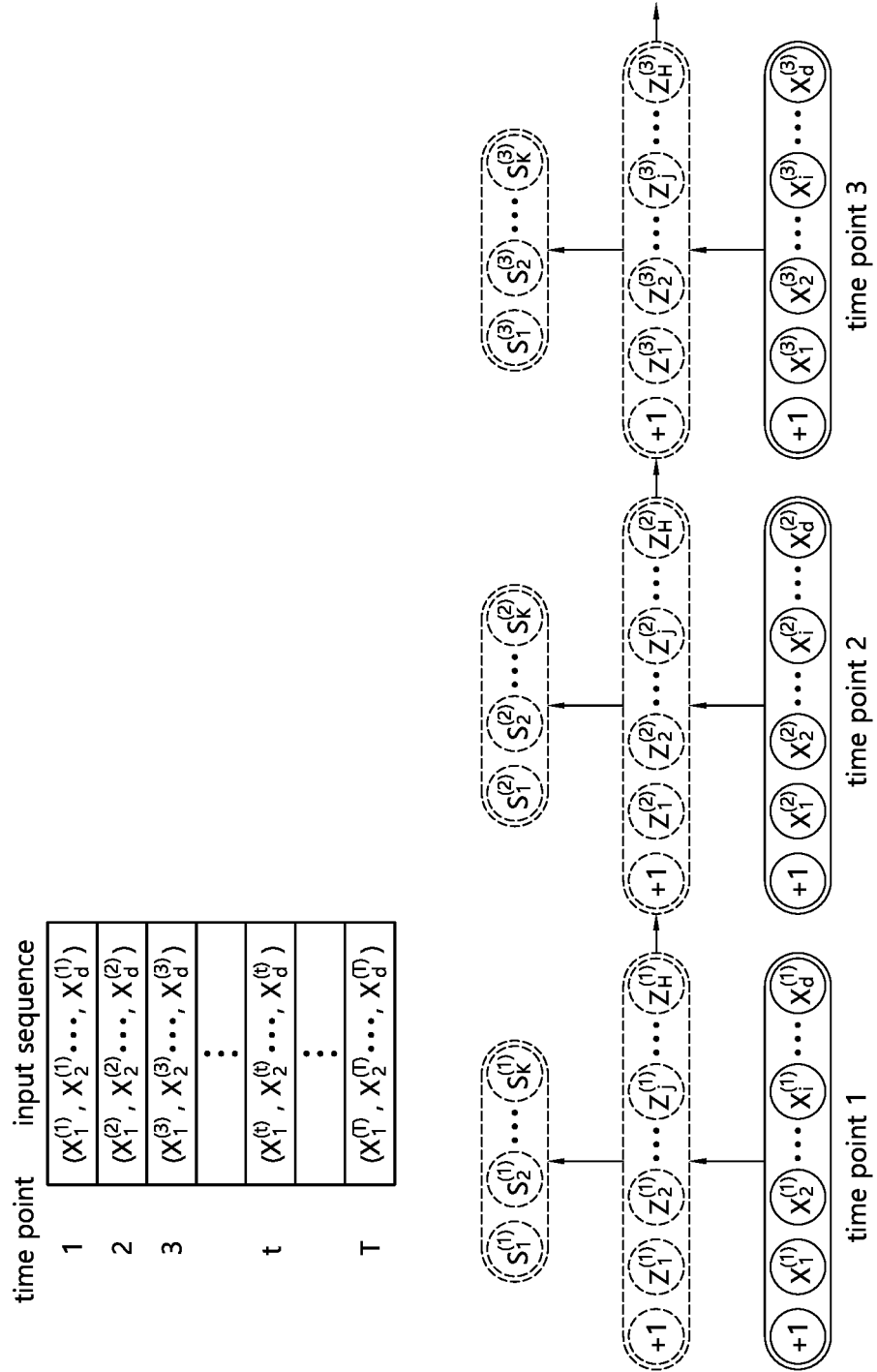
FIG. 11 schematically illustrates an example of an operating structure of a recurrent neural network.

FIG. 11 schematically illustrates an example of an operating structure of a recurrent neural network.

Referring to FIG. 11, the recurrent neural network operates in a sequence of predetermined views with respect to an input data sequence.

The hidden vectors (z1(1), z2(1) . . . , zH(1)) when the input vectors (x1(t), x2(t) . . . , xd(t)) at time point 1 are input to the recurrent neural network is input together with the input vector (x1(2), x2(2) . . . , xd(2)) of time point 2, the vector (z1(2), z2(2) . . . , zH(2)) of the hidden layer is determined through the weighted sum and activation function. This process is repeatedly performed until time point 2, time point 3 . . . , time point T.

Meanwhile, when a plurality of hidden layers is arranged in a recurrent neural network, it is referred to as a deep recurrent neural network (DRNN). Recurrent neural networks are designed to be usefully applied to sequence data (e.g., natural language processing).

As a neural network core used as a learning method, in addition to DNN, CNN, and RNN, various deep learning techniques such as Restricted Boltzmann Machine (RBM), deep belief networks (DBN), and deep Q-Network may be included. It can be applied to fields such as computer vision, voice recognition, natural language processing, and voice/signal processing.

Recently, there have been attempts to integrate AI with wireless communication systems, but these have been focused on the application layer and network layer, especially deep learning in the field of wireless resource management and allocation. However, these studies are gradually developing into the MAC layer and the physical layer, in particular, attempts are being made to combine deep learning with wireless transmission in the physical layer. AI-based physical layer transmission means applying a signal processing and communication mechanism based on an AI driver rather than a traditional communication framework in fundamental signal processing and communication mechanisms. For example, deep learning-based channel coding and decoding, deep learning-based signal estimation and detection, deep learning-based MIMO mechanism, AI-based resource scheduling and may include allocations, etc.

THz (Terahertz) Communication

A data rate may increase by increasing bandwidth. This may be performed by using sub-TH communication with wide bandwidth and applying advanced massive MIMO technology. THz waves which are known as sub-millimeter radiation, generally indicates a frequency band between 0.1 THz and 10 THz with a corresponding wavelength in a range of 0.03 mm to 3 mm A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

Figure 12:
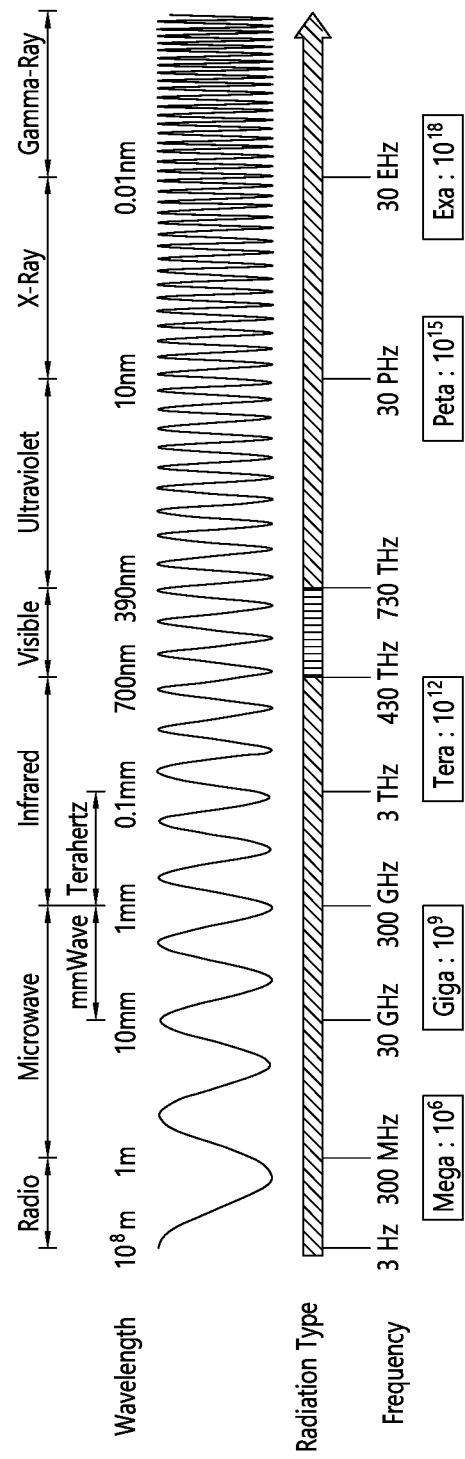
FIG. 12 shows an example of an electromagnetic spectrum.

FIG. 12 shows an example of an electromagnetic spectrum.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Massive MIMO Technology

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Blockchain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

3D Networking

The 6G system integrates terrestrial and public networks to support vertical expansion of user communication. A 3D BS will be provided through low-orbit satellites and UAVs. Adding new dimensions in terms of altitude and related degrees of freedom makes 3D connections significantly different from existing 2D networks.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Unmanned Aerial Vehicle

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Integration of Wireless Information and Energy Transfer

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connection such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

<General Terahertz (THz) Wireless Communication>

THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence. In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

Figure 13:
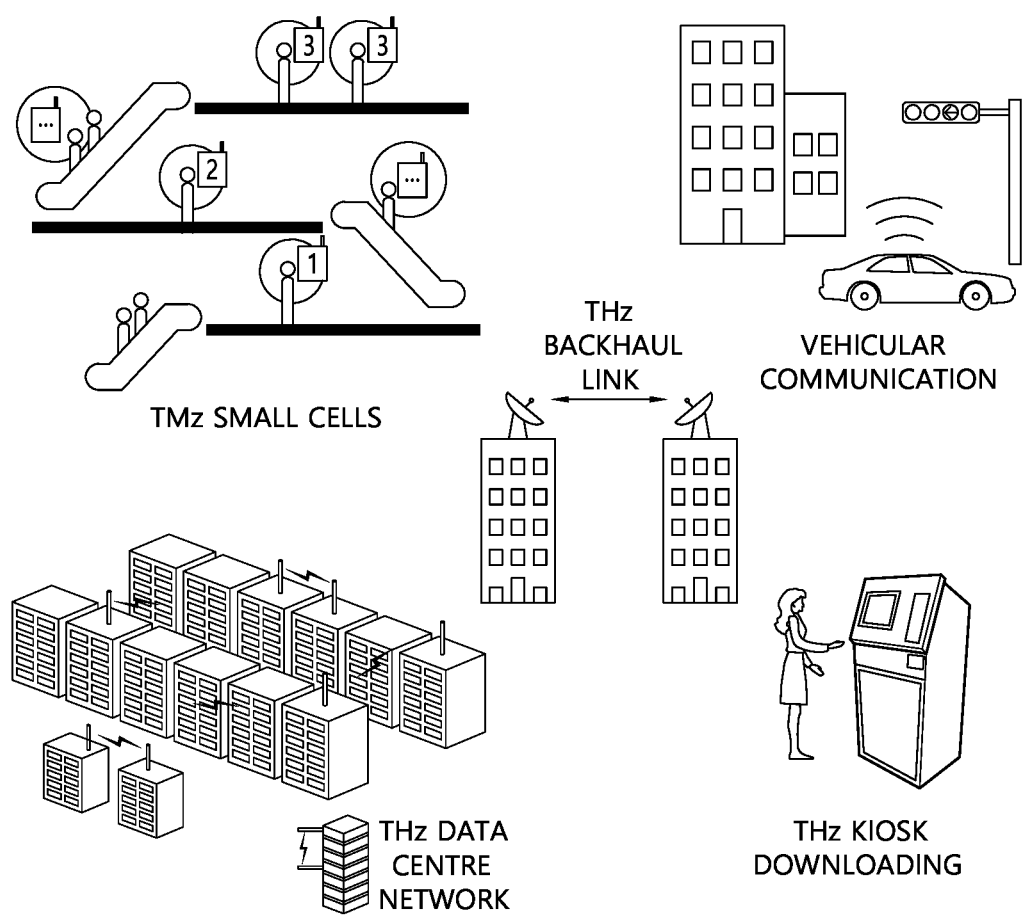
FIG. 13 is a diagram showing an example of a THz communication application.

FIG. 13 is a diagram showing an example of a THz communication application.

As shown in FIG. 13, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multi-point connection such as wireless connection in a data center or kiosk downloading.

Table 2 below is a table showing an example of a technology that can be used in a THz wave.

TABLE 2

| Transceivers Device | Available immature: UTC-PD, RTD and SBD |
|---|---|
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

Figure 14:
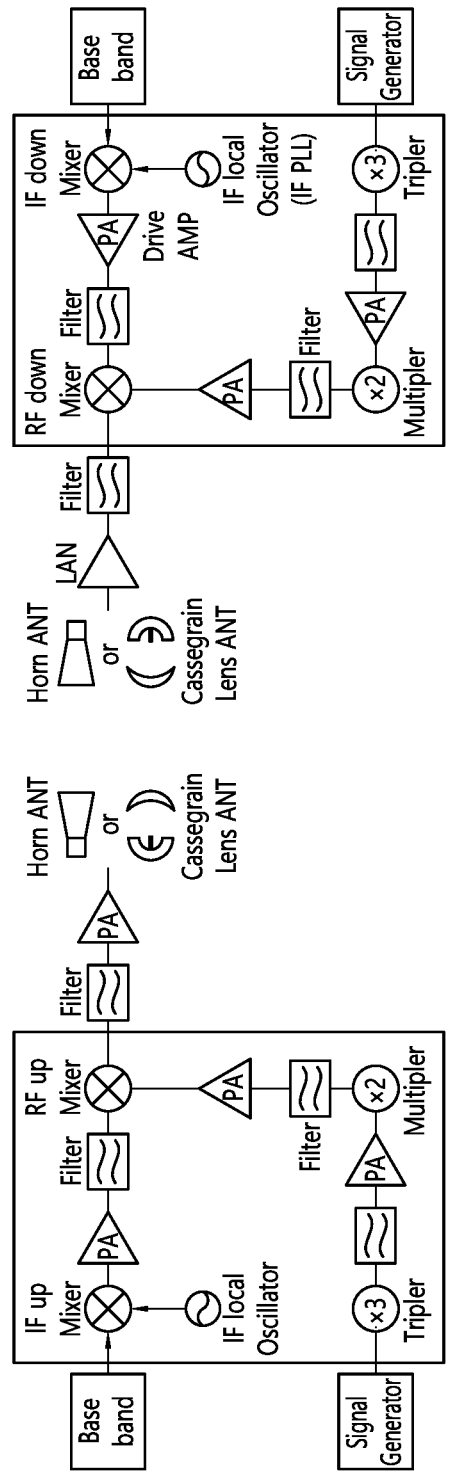
FIG. 14 is a diagram showing an example of an electronic element-based THz wireless communication transceiver.

THz wireless communication can be classified based on the method for generating and receiving THz. The THz generation method can be classified as an optical device or an electronic device-based technology. FIG. 14 is a diagram showing an example of an electronic element-based THz wireless communication transceiver. The method of generating THz using an electronic device includes a method using a semiconductor device such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 14, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 14. In FIG. 14, IF represents an intermediate frequency, a tripler and a multiplier represents a multiplier, PA represents a power amplifier, and LNA represents a low noise amplifier, and PLL represents a phase-locked loop.

Figure 15:
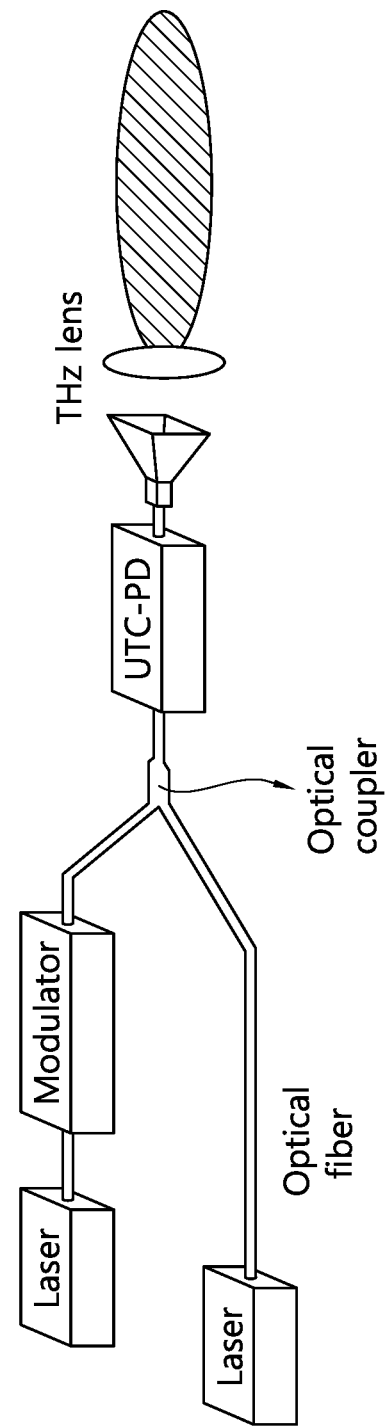
FIG. 15 is a diagram illustrating an example of a method for generating a THz signal based on an optical device.
Figure 16:
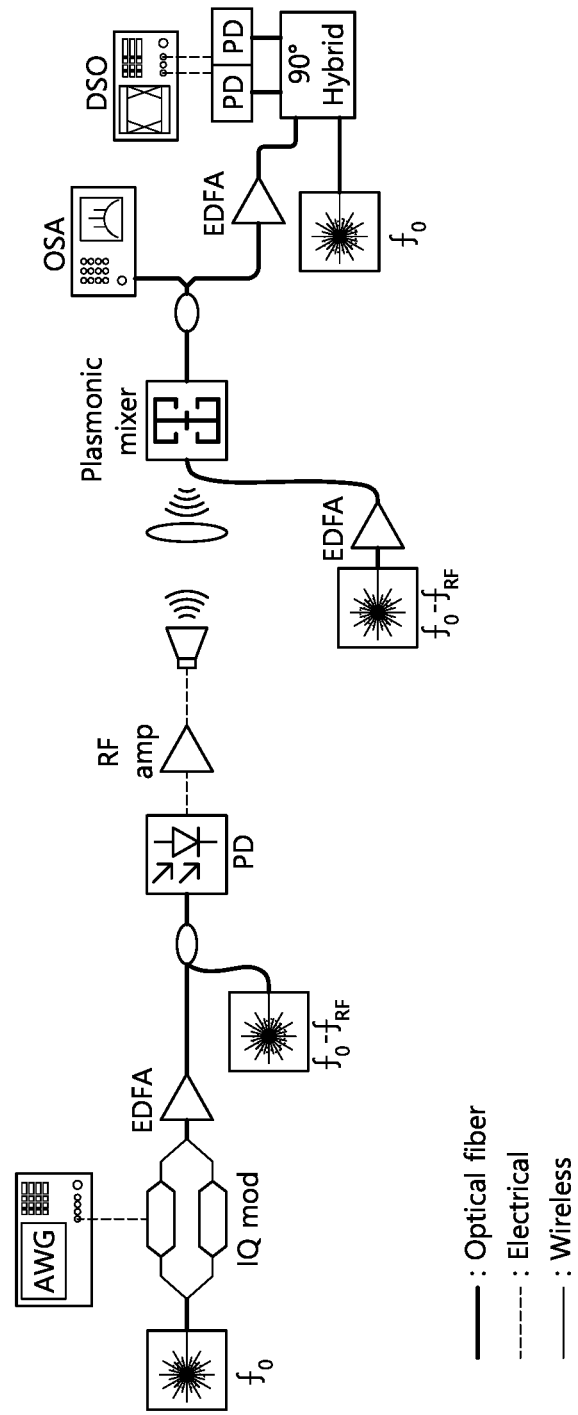
FIG. 16 is a diagram illustrating an example of a THz wireless communication transceiver based on an optical device.

FIG. 15 is a diagram illustrating an example of a method for generating a THz signal based on an optical device, and FIG. 16 is a diagram illustrating an example of a THz wireless communication transceiver based on an optical device.

The optical device-based THz wireless communication technology means a method of generating and modulating a THz signal using an optical device. The optical device-based THz signal generation technology refers to a technology that generates an ultrahigh-speed optical signal using a laser and an optical modulator, and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the THz signal based on the optical device, as shown in FIG. 15, a laser diode, a broadband optical modulator, and an ultrahigh-speed photodetector are required. In the case of FIG. 15, the light signals of two lasers having different wavelengths are combined to generate a THz signal corresponding to a wavelength difference between the lasers. In FIG. 15, an optical coupler refers to a semiconductor device that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 16, an erbium-doped fiber amplifier (EDFA) represents an optical fiber amplifier to which erbium is added, a photo detector (PD) represents a semiconductor device capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

Figure 17:
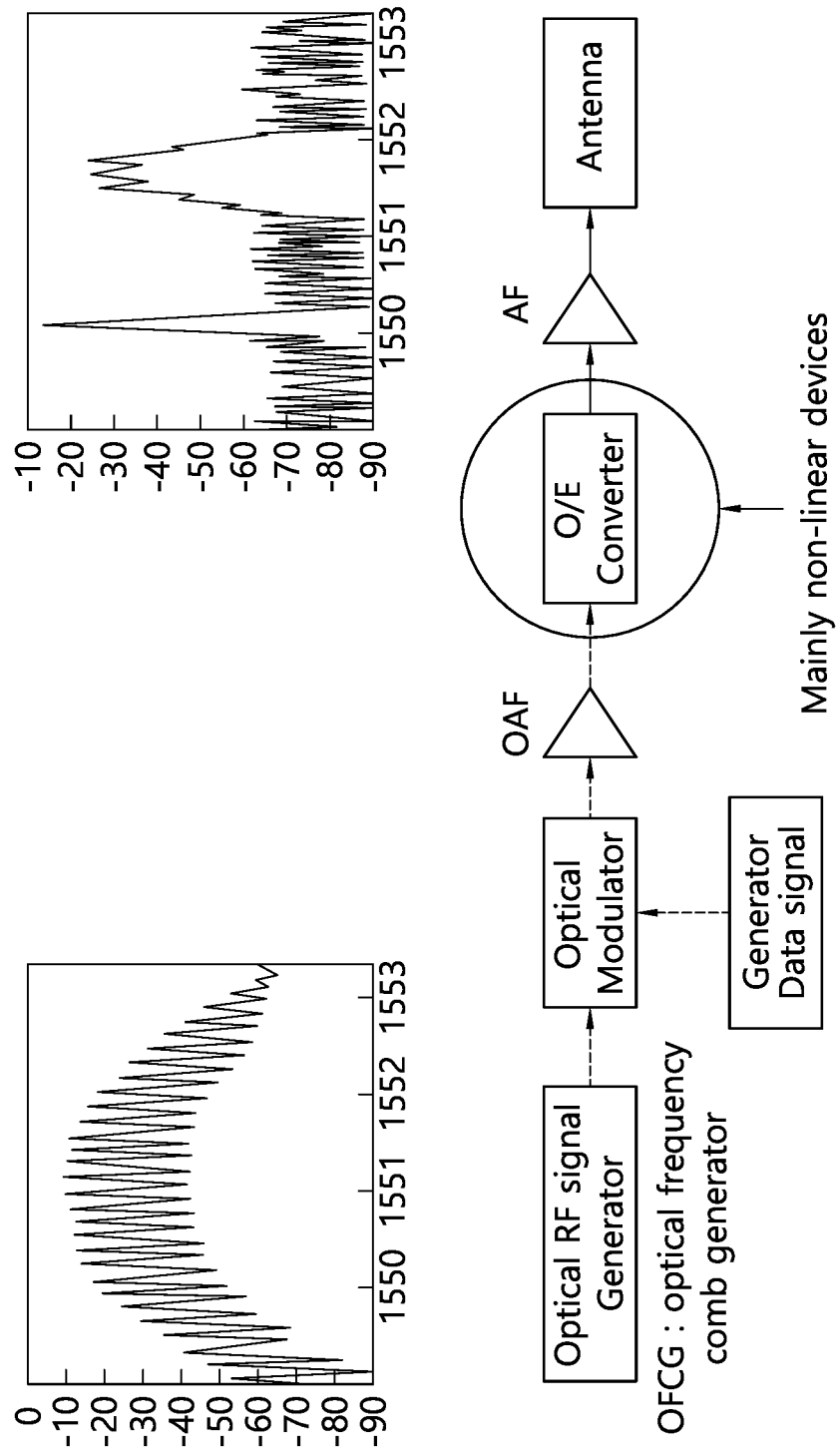
FIG. 17 illustrates a structure of a transmitter based on a photonic source.
Figure 18:
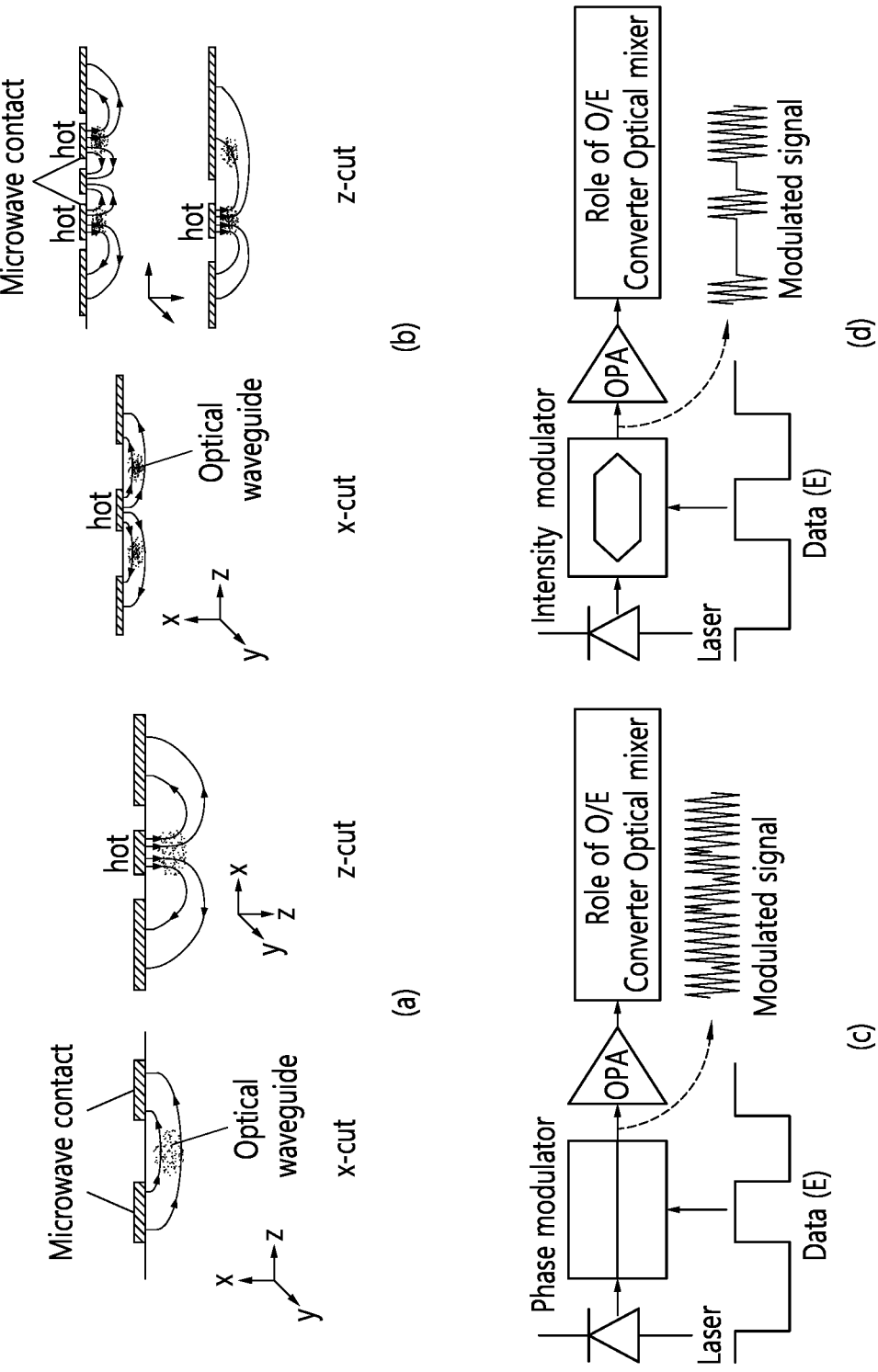
FIG. 18 illustrates a structure of an optical modulator.

The structure of the photoelectric converter (or photoelectric converter) will be described with reference to FIGS. 17 and 18. FIG. 17 illustrates a structure of a transmitter based on a photonic source, and FIG. 18 illustrates a structure of an optical modulator.

Generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter)

may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation 10^2 dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal nonlinearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

The present disclosure considers methods for controlling the beam of a wireless optical communication system.

In the case of wireless optical communication systems, unlike RF communication in LTE or NR, very small beam widths may be expected. In a mobile OWC system environment considering mobility, a fixed beam cannot be used, unlike OWC in a fixed-point environment, so beam steering and tracking techniques for a predefined cell area are required.

Figure 19:
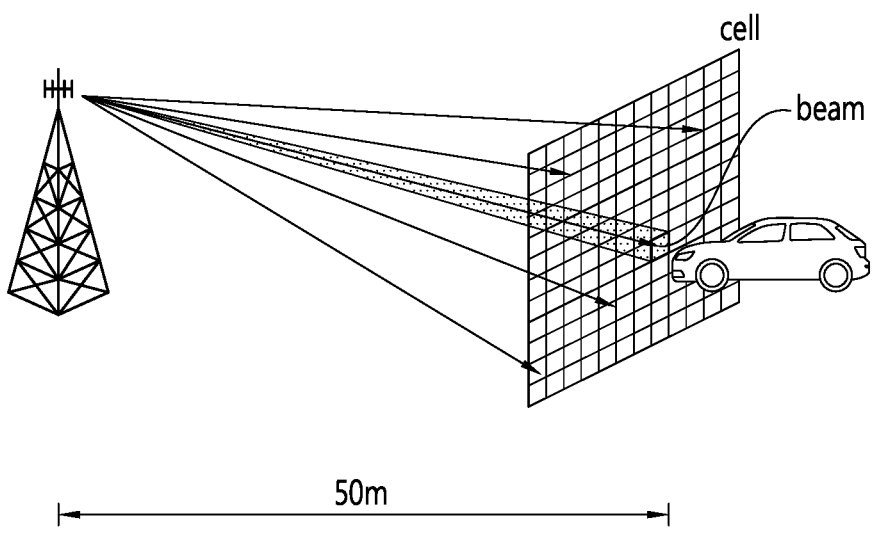
FIG. 19 schematically illustrates an example of a pencil beam according to an example of the present disclosure.

FIG. 19 schematically illustrates an example of a pencil beam according to an example of the present disclosure.

For example, if a distance between a transmitter and a receiver is 50 meters and a transmitter transmits a pencil beam with a half angle of beam divergence of about 100 micro-radians (with a beam waist of about 5 mm), the expected beam diameter of the receiving end is 5 mm to 3.5 cm. For example, for a cell area of 1 m×1 m near location of the receiving end as shown in the figure, there will be 10,000 beams considering an aperture of 1 cm^2.

In systems utilizing pencil beams as described above (e.g., mobile OWC, terahertz communication, etc.), a large number of Tx/Rx beams may exist within a single cell. For the link establishment of Tx and Rx, a beam tracking procedure is required to ensure beam alignment for the initial access phase or maintenance of the link connection.

If the number of beams is very large, the beam search time to check the alignment degree for each beam is very large. In 3GPP NR, for the step of performing beam search through SSB blocks, a symbol level beam search may be performed through as many symbols as there are beams.

In the above example, the beam search should be performed for a time of 10,000 symbols, which results in a very large resource loss. The multi-stage beam search method in which the broad beam is searched for first and then the narrow beam within the beam is found requires hand shaking between the Tx and Rx, and delays due to hand shaking. In other words, in a system utilizing pencil beams, it is necessary to solve the resource loss and delay caused by a large number of beams.

In addition, the beam steering method utilizing a phased array antenna based on a phase shifter determines the beam steering resolution based on the quantized level of the phase shifter used. This may be difficult to meet the needs of a system using a pencil beam because the beam width is very narrow and needs to be finely phased. In addition, the phase shifter-based method has disadvantages in terms of size and cost because a phase shifter should be mounted for each antenna, and heat generation problems may also occur. Therefore, an alternative method that can solve the disadvantages of using multiple phase shifters is needed.

As a method for solving the above problems, the following describes a method for designing a transmitter device having a device having a frequency gradient array characteristic (e.g., a metasurface, a 1D/2D antenna array, etc.) as a transmitting antenna in wireless optical communication.

Figure 20:
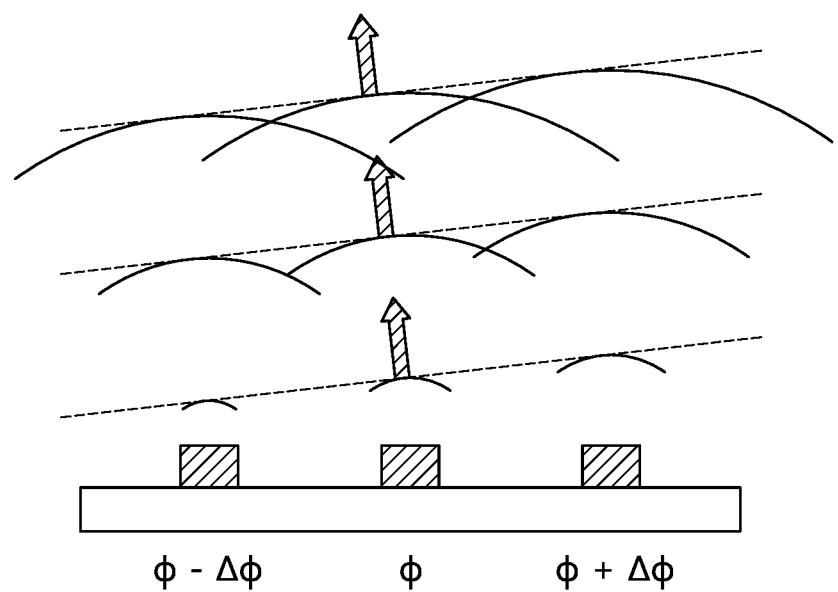
FIG. 20 schematically illustrates an example of a phased array antenna.

FIG. 20 schematically illustrates an example of a phased array antenna.

A phased array antenna, which is typically used for beamforming, has different phases of signals radiating from each antenna element, such that the phase determines the direction in which the signals overlap and cause constructive interference due to differences in the radiation times of the signals. For example, if there is a phase difference of $\Delta\Phi$ between the antennas, the difference shapes the beam direction of the radiated signal.

Figure 21:
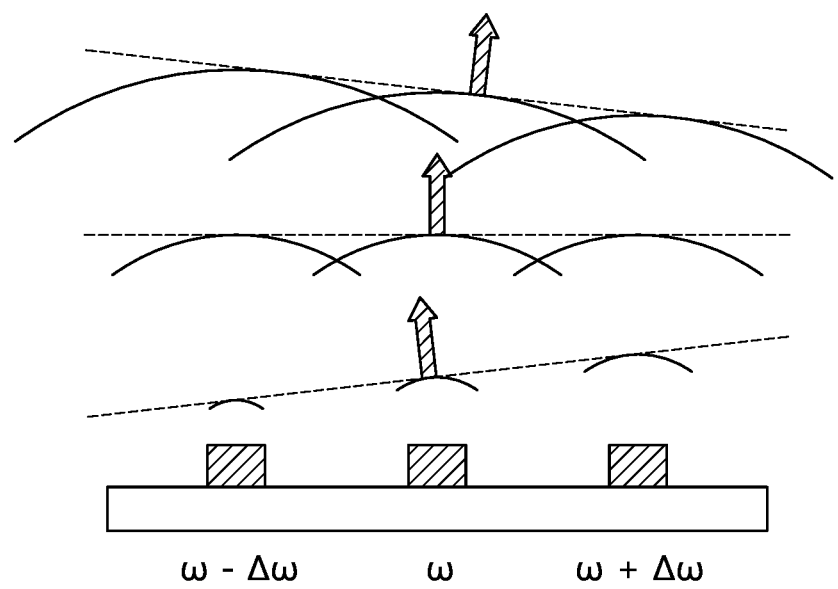
FIG. 21 schematically illustrates an example of a frequency gradient array antenna.

FIG. 21 schematically illustrates an example of a frequency gradient array antenna.

On the other hand, in a frequency gradient array antenna, the signals radiated from each antenna element have different frequencies (where $\omega=2\pi f$ is the angular frequency, but is expressed as frequency for ease of explanation), and the difference in frequency causes the position at which the signals overlap and cause constructive interference to change over time. For example, if there is a frequency difference of $\Delta\omega$ between the antennas, the difference causes the beam direction of the radiated signal to vary over time.

A frequency gradient metasurface is a metasurface that functions as both a meta-grating and a meta-lens. The metasurface has a high degree of freedom due to the combination design of microstructures, and multiple functions may be performed on one metasurface.

If the signal source is a mode-locked laser source represented by a sum of electromagnetic waves of different frequencies, the signal generated by the signal source is a pulsed laser with a specific repetition rate.

Figure 22:
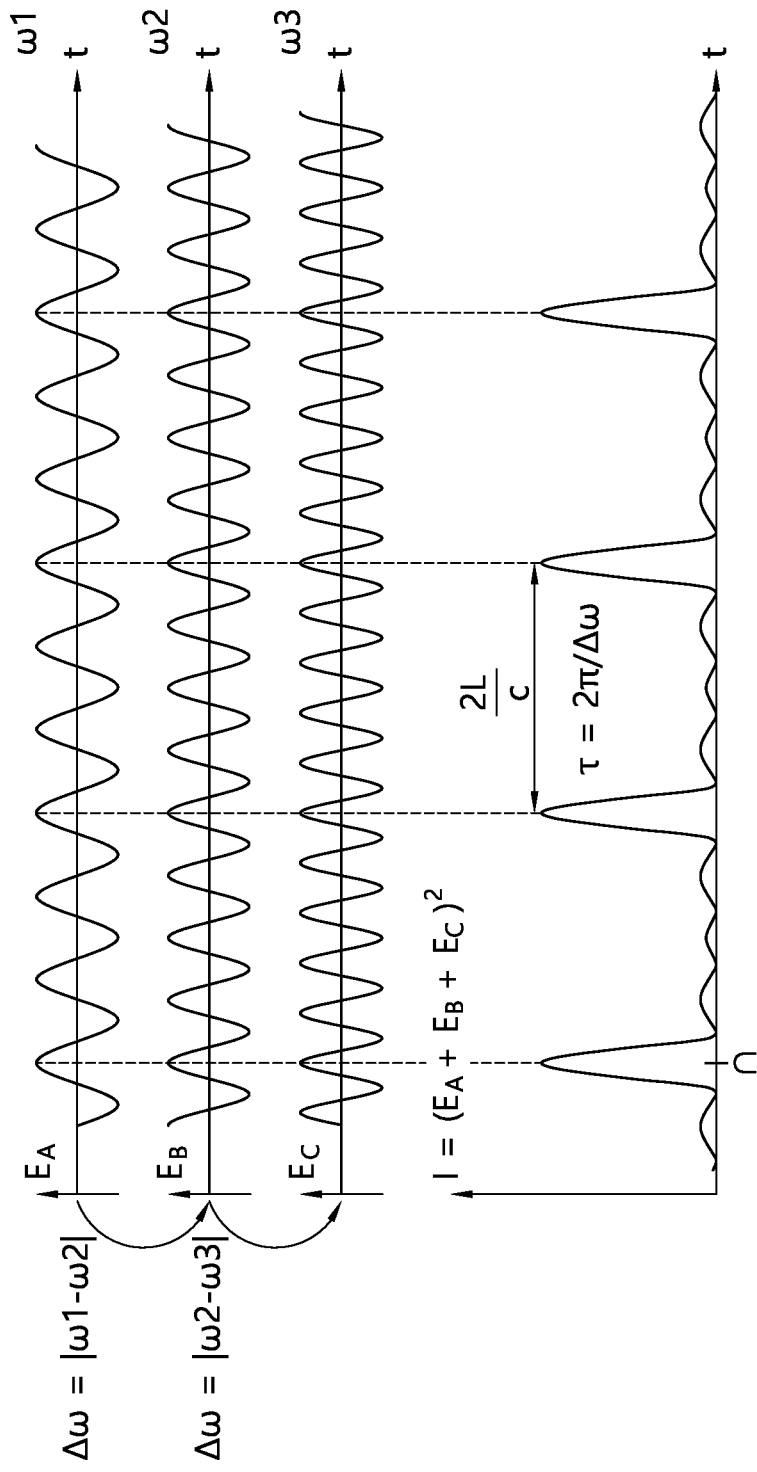
FIG. 22 schematically illustrates an example of synthesizing a sine wavelength.

FIG. 22 schematically illustrates an example of synthesizing a sine wavelength.

For example, a sine wave with three frequencies may be synthesized to produce a pulsed signal with a period τ. In this case, when each frequency difference is Δω, the period τ=2π/Δω).

Figure 23:
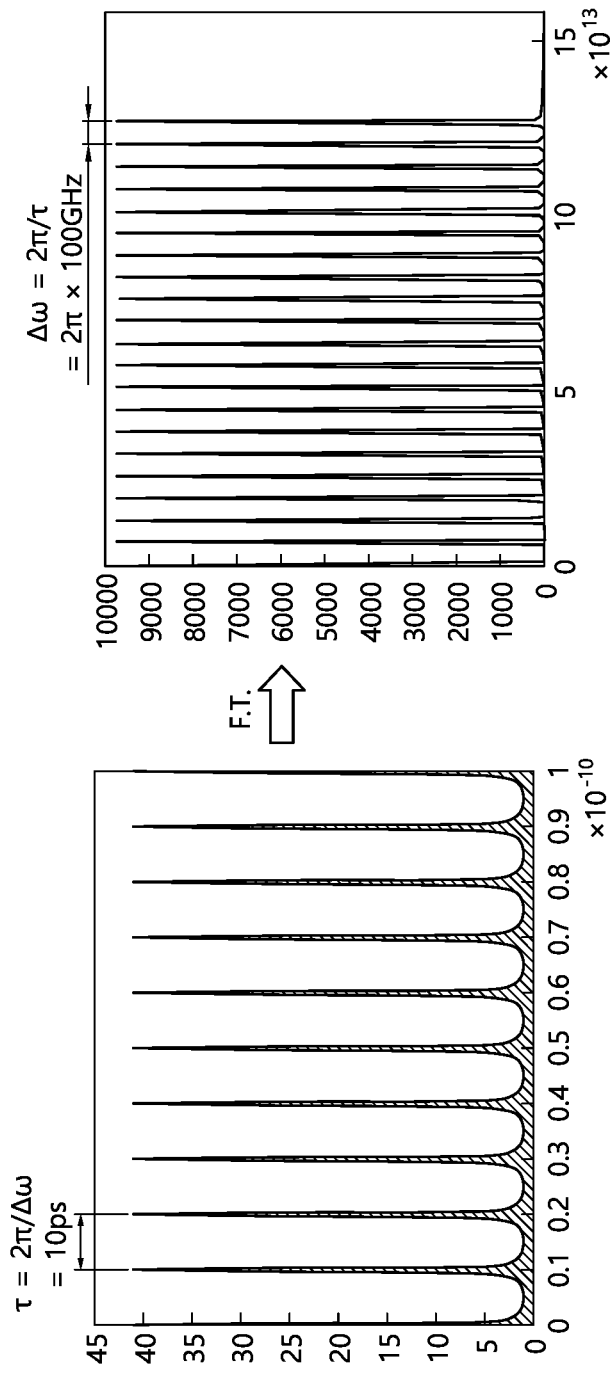
FIG. 23 schematically illustrates of an example of a Fourier transform of the signal of FIG. 22.

FIG. 23 schematically illustrates of an example of a Fourier transform of the signal of FIG. 22.

The Fourier transform of the signal in FIG. 22 is in the form of a frequency comb with pulses on the frequency axis.

Figure 24:
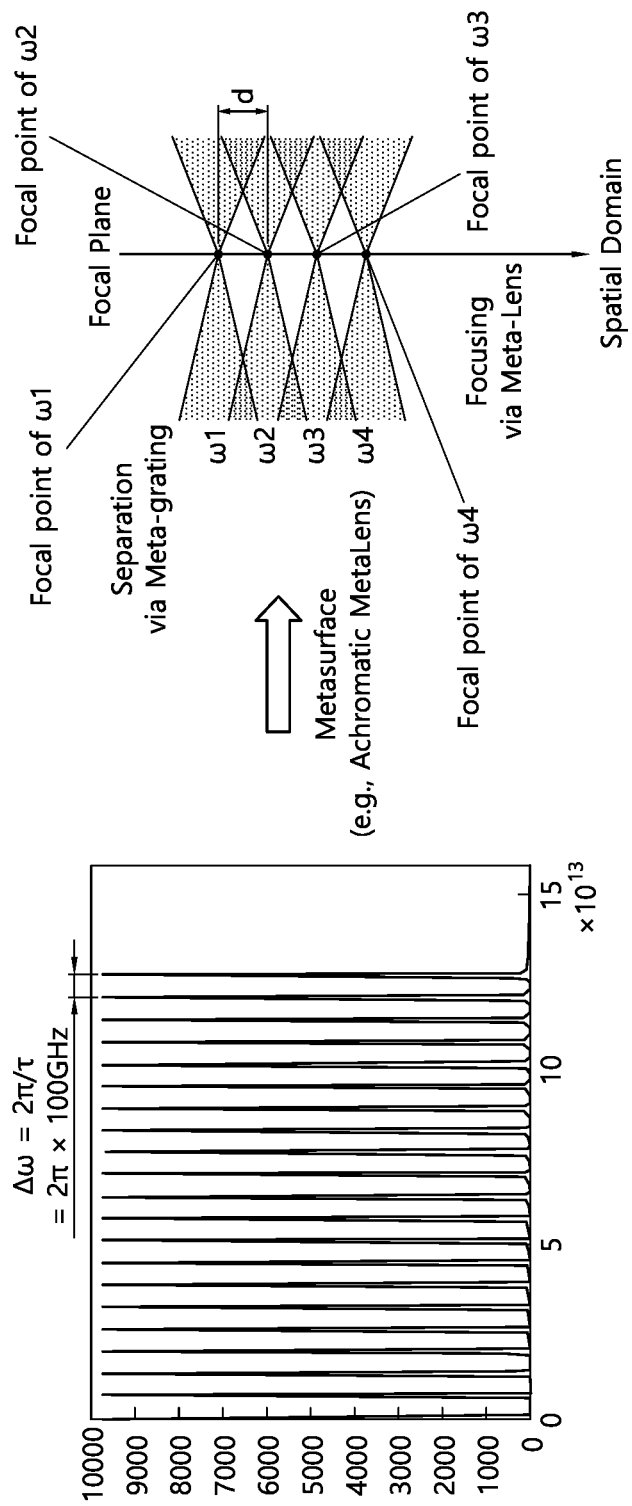
FIG. 24 schematically illustrates an example of focusing per frequency.

FIG. 24 schematically illustrates an example of focusing per frequency.

When the above signal is incident on a metasurface that simultaneously performs the functions of a meta-grating and a meta-lens, the meta-grating causes different refractive directions per frequency, and the meta-lens causes different focus per frequency. A schematic representation of this concept is shown in the figure.

In other words, as a frequency comb for the laser signal passes through the metasurface, energy is focused at different focuses in the spatial domain by the Achromatic meta-lens effect. The different focuses exist in the same focal plane, and each focus is again shaped like a slit. The different frequencies passing through each slit are recombined to create a virtual shape of a frequency gradient array antenna, where the location of energy gathering changes over time. Thus, each focus in the focal plane described above becomes a virtual antenna in space, and the entire array of focuses is defined as a virtual antenna array.

1. Tx Structure Design

Figure 25:
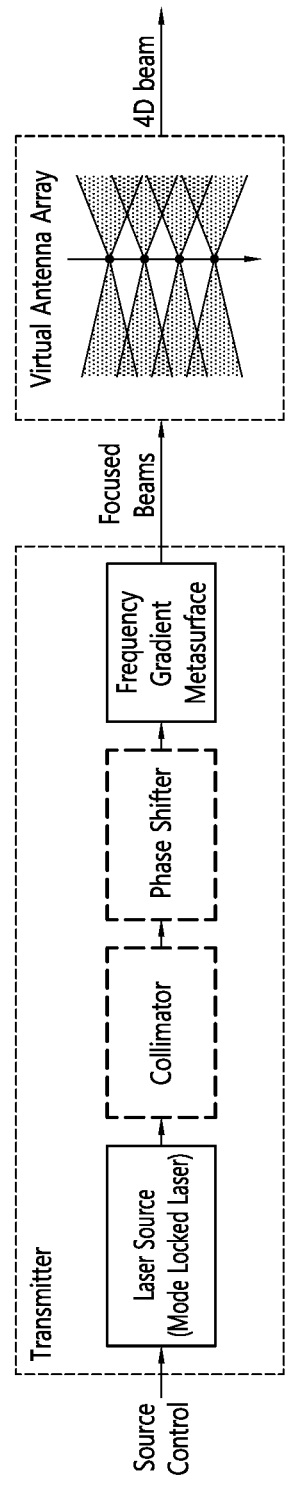
FIG. 25 schematically illustrates an example of a transmitting device according to an example of the present disclosure.

FIG. 25 schematically illustrates an example of a transmitting device according to an example of the present disclosure.

A transmitter structure for fast beam steering is proposed by controlling a laser source and designing a frequency gradient metasurface. The overall transmitter structure for fast beam steering is described in the figure.

To control the laser source, the source control information is received, a pulsed laser signal is generated by the laser source, and a collimator is used to limit the beam width while maintaining the plane wave characteristics. After passing through the collimator, the signal is incident on the frequency gradient metasurface at a pre-designed angle via a phase shifter. The signal is emitted by focusing beam per wavelength through the pre-designed frequency gradient metasurface. This creates a virtual antenna array in space in close proximity to the transmitter, and as the signal is synthesized, a 4D beam is delivered to the receiving end where the direction of the beam changes over time. Here, 4D beam means that the direction of the beam changes with time in three-dimensional space.

Figure 26:
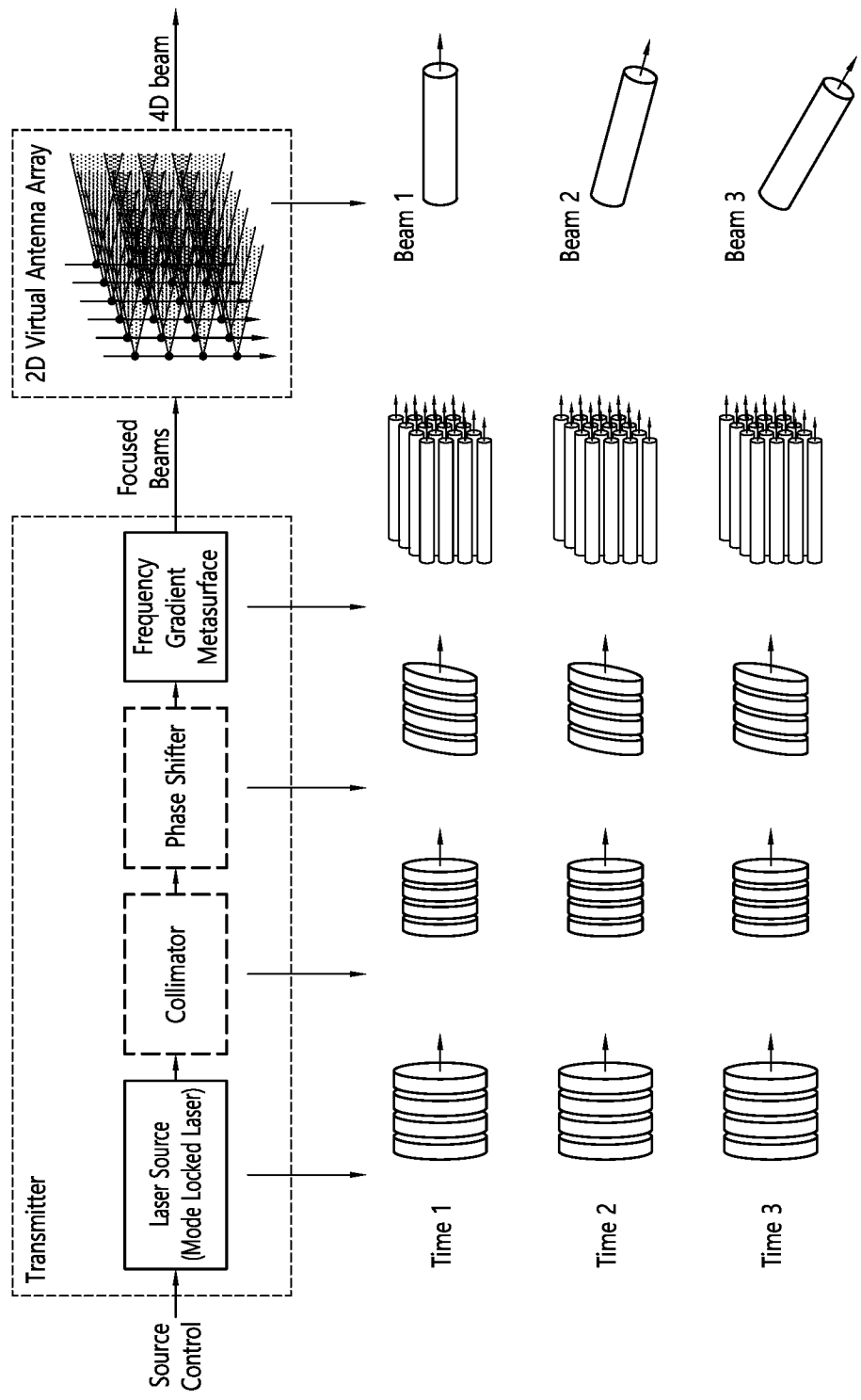
FIG. 26 schematically illustrates an example of a beam direction in a transmitting device according to another example of the present disclosure.

FIG. 26 schematically illustrates an example of a beam direction in a transmitting device according to another example of the present disclosure.

In this case, when beam is emitted by 2D focusing beam per wavelength in a frequency gradient metasurface, a two-dimensional (2D) virtual antenna array is created in space in close proximity to the transmitter, and as the signal is synthesized, a 4D beam with a time-varying beam direction is delivered to the receiving end.

In the above, the transmitting device receives source control information to control the laser source, and generates a pulsed laser signal through the laser source, which may have a frequency comb characteristic such as a Mode Locked Laser.

To qualitatively optimize the signal, a collimator and phase shifter may be utilized, and the collimator limits the beam width while maintaining the plane wave characteristics.

After passing through the collimator, the signal is incident on the frequency gradient metasurface at a pre-designed angle through the phase shifter. The signal is emitted by focusing beam per wavelength through the pre-designed frequency gradient metasurface.

This creates a 2D virtual antenna array in space in close proximity to the transmitter, and a 4D beam (with the direction of the beam changing over time as the signal is synthesized) is delivered toward the receiving end. Here, 4D beam means that the direction of the beam changes with time in three-dimensional space.

In the above, the frequency gradient metasurface is a metasurface reflecting a frequency gradient characteristic, comprising a frequency gradient array of antennas, which may replace the frequency gradient metasurface and the 2D virtual antenna array.

In the above, if the frequency comb signal generated by the laser source is not further processed, it may be represented as follows.

$$i(t) = \sum_{n=-N}^{n=N} \sum_{m=-M}^{m=M} a_{mn} e^{-j(\omega_{mn}t - \varphi_{mn})}$$

Here, m and n correspond to the frequency component indices of the generated frequency comb signal, which in turn correspond to the x- and y-axis antenna indices, respectively. This may be expressed as ω_mn=ω_0+m*Δω_m+n*Δω_n=2π*(f_0+m*Δf_m+n*Δf_n), where ω_0 is the angular frequency for the center frequency of the source signal, Δω_m is the spacing of the angular frequency comb corresponding to the x-axis antenna index, and Δω_n is the spacing of the angular frequency comb corresponding to the y-axis antenna index.

Therefore, f_0 is the frequency for the center frequency of the source signal, Δf_m is the spacing of the frequency comb corresponding to the x-axis antenna index, and Δf_n is the spacing of the frequency comb corresponding to the y-axis antenna index. a_mn is the amplitude of incident signal, ω_mn is the frequency of angular incident signal, and φ_mn is the phase of incident signal. In other words, all frequency signals including frequency indexes from −N to N and frequency indexes from −M to M are synthesized, so the total number of frequency comb is (2N+1)^2. If no processing is applied to the signal above, the phase of all frequency signals generated by the laser source is the same, so φ_mn=0.

When the signal i(t) is focused per frequency in the 2D virtual antenna array space by the meta-grating effect of the metasurface, it may be reexpressed as follows.

$$a(t) = \sum_{n=-N}^{n=N} \sum_{m=-M}^{m=M} V_{mn}$$

Here, V_mn=a_mn*e^(−j(ω_mn*t−φ_mn)), where m and n correspond to the x- and y-axis antenna indices, respectively, a_mn is the amplitude of the incident signal at antenna (m,n), ω_mn is the angular frequency of the incident signal at antenna (m,n), and φ_mn is the phase of the incident signal at antenna (m,n). If each of all of he frequency comb signals were focused onto the metasurface, there would be (2N+1)^2 virtual antennas in the 2D virtual antenna array space.

Figure 27:
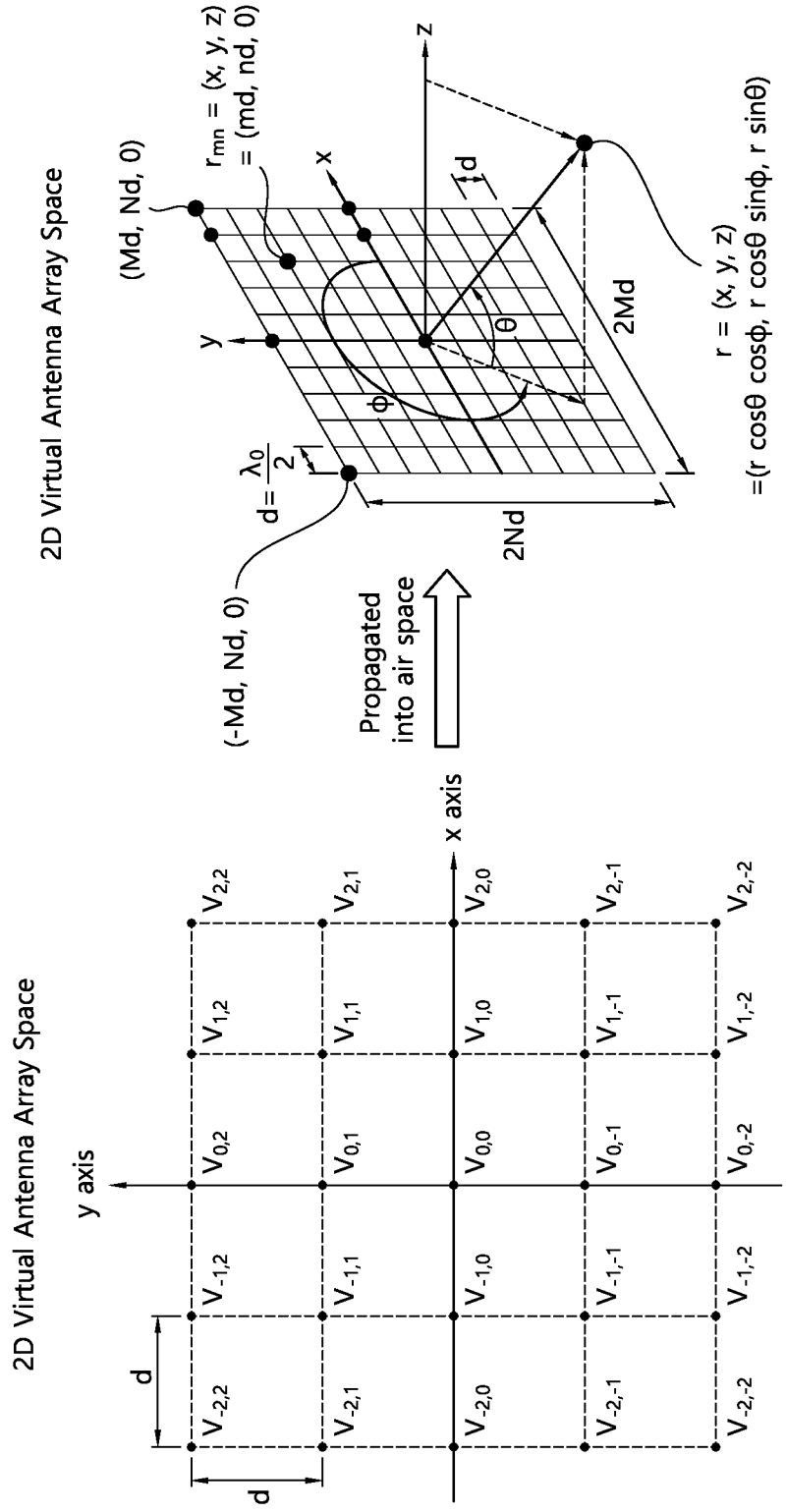
FIG. 27 illustrates an example of a 2D virtual antenna array space.

FIG. 27 illustrates an example of a 2D virtual antenna array space.

In other words, due to the meta-grating and meta-lens effects of the metasurface, a signal corresponding to V_mn is focused at coordinate r_mn in the 2D virtual antenna array space. If all the signals in the 2D virtual antenna array space are synthesized for time t and radiated as coordinates $\bar{r}$ in three-dimensional space, they may be expressed as b(x, y, z, t), which may be converted to a spherical coordinate system and expressed as follows.

$$b(r, \theta, \phi, t) = b(\bar{r}, t) = \sum_{n=-N}^{n=N} \sum_{m=-M}^{m=M} a_{mn} G(\bar{r} - \bar{r}_{mn}) e^{j(K_{mn} \cdot D_{mn} - \omega_{mn} t + \varphi_{mn})}$$

Here, r is the distance from the origin, $\varphi$ is the angle rotated about the x-axis in the xy plane, $\theta$ is the angle rotated in the z-axis direction in the xy plane, and $G(\bar{r}-\bar{r}_{mn})$ is change in gain due to propagation from the (m,n) virtual antenna $\bar{r}_{mn}$=(md, nd, 0) to the coordinates $\bar{r}$=(x, y, z)=(r cos $\theta$ cos $\phi$, r cos $\theta$ sin $\phi$, r sin $\theta$). In this case, since the spacing d between the antennas relative to the distance r is very small (r>>Nd or Md in the far-field), it may be approximated by $G(\bar{r}-\bar{r}_{mn}) \cong G(\bar{r})$.

Also, K_mn=$\omega$_mn/c=1/c*($\omega$_0+m+$\Delta\omega$_m+n$\Delta\omega$_n)= K_0+m$\Delta$K_m+n$\Delta$K_n, where $D_{mn}$=|$\bar{r}-\bar{r}_{mn}$|, and is the distance between two coordinates. In this case, for the spherical coordinate system, $$b(\bar{r}, t) = G(\bar{r})e^{-j\omega_0 t}$$

$$\sum_{n=-N}^{n=N} \sum_{m=-M}^{m=M} a_{mn} e^{j((K_0+m\Delta K_m+n\Delta K_n)\cdot(r-(m\cos\theta\cos\phi+n\cos\theta\sin\phi)d)-m\Delta\omega_m t-n\Delta\omega_n t)} e^{j\varphi_{mn}}$$

it may be approximated by $D_{mn} \approx r-(m \cos \theta \cos \phi+n \cos \theta \sin \phi)d$. Based on the above approximation, this may be rephrased as follows.

$$|\bar{r}-\bar{r}_{mn}| = \sqrt{(r \cos \theta \cos \phi - md)^2 + (r \cos \theta \sin \phi - nd)^2 + (r \sin \theta - 0)^2},$$

In other words, the intensity of the beam at the coordinates $\bar{r}$ according to time t is formed by the combination of each component r, $\theta$, $\phi$ of the coordinates $\bar{r}$ and the frequency $\omega$_mn formed by the frequency comb of the laser source, given the gain $G(\bar{r})$ and the phase term e^(-j*$\omega$_0*t) by the center frequency. Therefore, by controlling $\phi$_mn appropriately, the intensity of the beam at the coordinates $\bar{r}$ according to time t can be controlled.

A detailed description of each device is given below.

1.1. Laser Source

Figure 28:
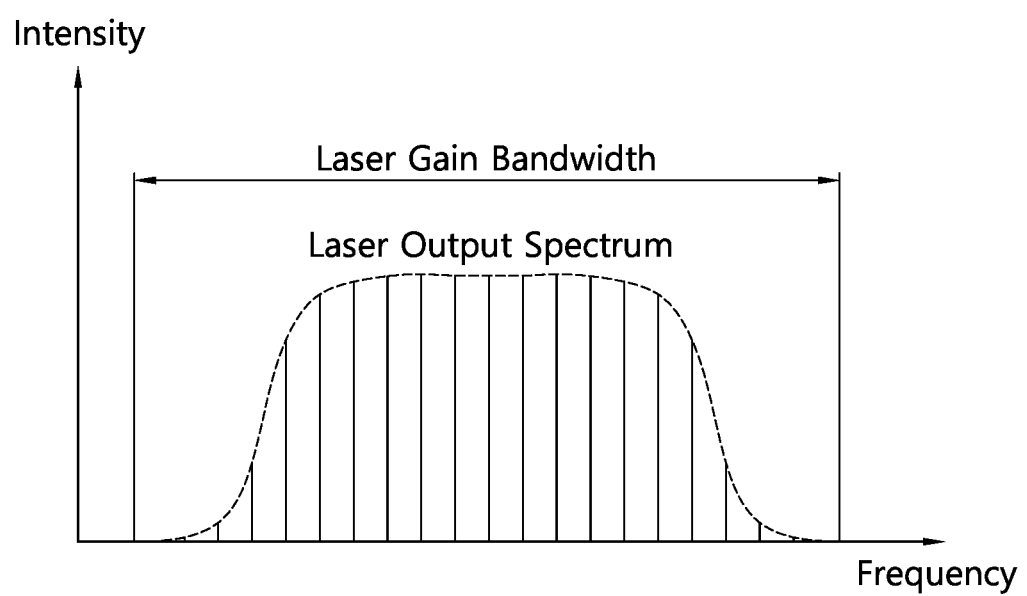
FIG. 28 schematically illustrates an example of a laser gain bandwidth.

FIG. 28 schematically illustrates an example of a laser gain bandwidth.

In this structure, the laser source may consist of a pulsed laser (e.g., a mode-locked laser) with a specific period. Since a pulsed laser cannot produce an idealized delta pulse, it has a laser gain bandwidth when observed along the frequency axis.

For laser sources with controllable pulse duration, pulse repetition period $\tau$, and gain bandwidth B for pulsed lasers (e.g., active mode locked lasers, hybrid mode locked lasers), the repetition rate of the beam emitted from the virtual antenna array and the number of antennas N can be controlled by the values of $\tau$ and B. Thus, depending on the system environment, the 4D beam can be controlled by source control information.

The above design is described as a laser source, but may be implemented as a device that generates any electromagnetic waves (radio frequency, infrared, visible light, ultraviolet, x-rays, gamma rays, etc.) with time/frequency characteristics.

1.2. Collimator

In the above structure, if the laser source and the frequency gradient metasurface are in close proximity, and the laser source generates the signal without significant beam divergence, the design may be made without a collimator.

1.3. Phase Shifter

In the meta-grating design of the frequency gradient metasurface in the above structure, the transmitter may be configured through a phase shifter design, an optical system design, or a meta-grating design depending on the design of the incident angle facing the metasurface.

Figure 29:
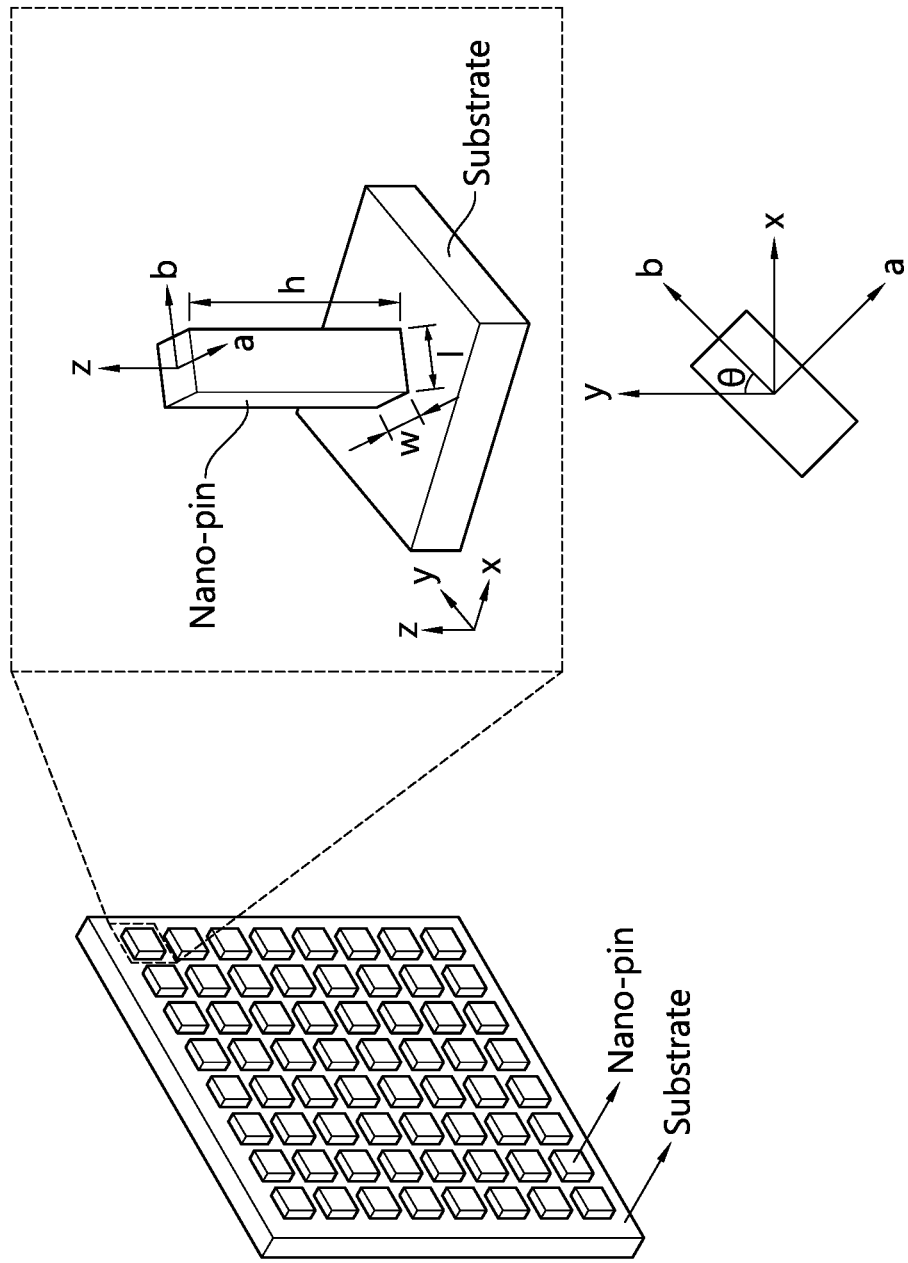
FIG. 29 schematically illustrates an example of a metasurface.

FIG. 29 schematically illustrates an example of a metasurface.

According to FIG. 29, the frequency gradient metasurface needs to design the length 1, width w, height h and relative angle $\theta$ with the substrate of the nanopins, in order to perform the functions of a meta-grating and a meta-lens simultaneously.

In the above design, the design of each nanopin may be designed differently depending on the frequency within the gain bandwidth of the laser source. The relative angle $\theta$ of each nanopin to the substrate may be configured differently individually, and is implemented in a predetermined way to fulfill the functions of the meta-grating and meta-lens. The substrate is made of a highly permeable material, e.g., silicon dioxide such as SiO2. The spacing between the nanopins in the substrate is configured to be smaller than the wavelength corresponding to a frequency within the gain bandwidth of the laser source, and the number of nanopins is a trade-off between the performance of the meta-grating and meta-lens and the size of the overall metasurface. For example, increasing the number of nanopins may focus a larger amount of signal energy into a targeted focal point, but at the expense of increasing the size of the overall metasurface.

The above designs describe the same morphology of nanopins, but may be implemented with different types of nanopins (e.g., different shapes of l, w and h for different nanopins) within a single metasurface.

In the above design, the shape of the nanopin is described as a cuboid, but it may also be realized as a polyhedron or curved body, depending on the design method.

In the above design, a single metasurface is described, but multiple metasurfaces may be used to realize the functions of meta-gratings and meta-lenses.

The above design is described as a metasurface, but the functionality may also be implemented through diffractive grating elements that function as meta-gratings and optical lenses that function as meta-lenses.

In the above designs, the metasurface may be designed such that the nanopins are fixed at the time of design (passive metasurface) or the nanopins are dynamically controlled (active metasurface). For example, the relative angle $\theta$ of the nanopins may be dynamically varied by control.

In the above design, the physical form of the nanopin is described above, but it may also be implemented to perform the function by applying an electric field based on a diode that acts as a nanopin. In this case, by dynamically controlling how (or how much) the field is applied, or whether or not each diode is activated, the meta-grating and meta-lensing functions of the metasurface may be dynamically controlled.

1.5. Virtual Antenna Arrays

Virtual antenna arrays exist in space by the transmitter and are not implemented device-wise. The structure of the virtual antenna array is determined by the design parameters of the transmitter. Therefore, the space between the transmitter device and the virtual antenna array should be free of obstacles, and the distance may be controlled by the metasurface design.

1.6. Design Parameter(s)

A mathematical description of the operation of the above transmitter is as follows. The pulsed signal from the laser source in 2.1 may be represented by $$a(t) = \sum_{-N}^{N} a_n e^{-i\omega_n t} = e^{-i\omega_0 t} \sum_{-N}^{N} a_n e^{-in\Delta\omega t} = A(t)e^{-i\omega_0 t}.$$

Here, $\omega\_0$ is the angular frequency to the center frequency of the source signal, and N relates to the number of frequency combs within the gain bandwidth relative to the center frequency. That is, since frequency signals from $-N$ to N are synthesized, the total number of frequency comb is $2N+1$. $a\_n$ is the amplitude of the nth frequency signal, and $\omega\_n=\omega\_0+n\Delta\omega$ is the nth angular frequency signal. Here, $\Delta\omega$ is the spacing of the frequency comb.

Therefore, the entire pulsed signal may be represented as a Fourier transform of the entire frequency signal as shown above. In this case, it may be expressed as the product of the time-varying phase change term $e^{\wedge}(-i*\omega\_0*t)$ dominant at the center frequency and the envelope $A(t)$ of the pulsed signal. In other words, $$A(t) = \sum_{-N}^{N} a_n e^{-in\Delta\omega t},$$

and it may be understood that the peak of the synthesized pulse is time-shifted by $\Delta\omega$ as a function of time t.

Figure 30:
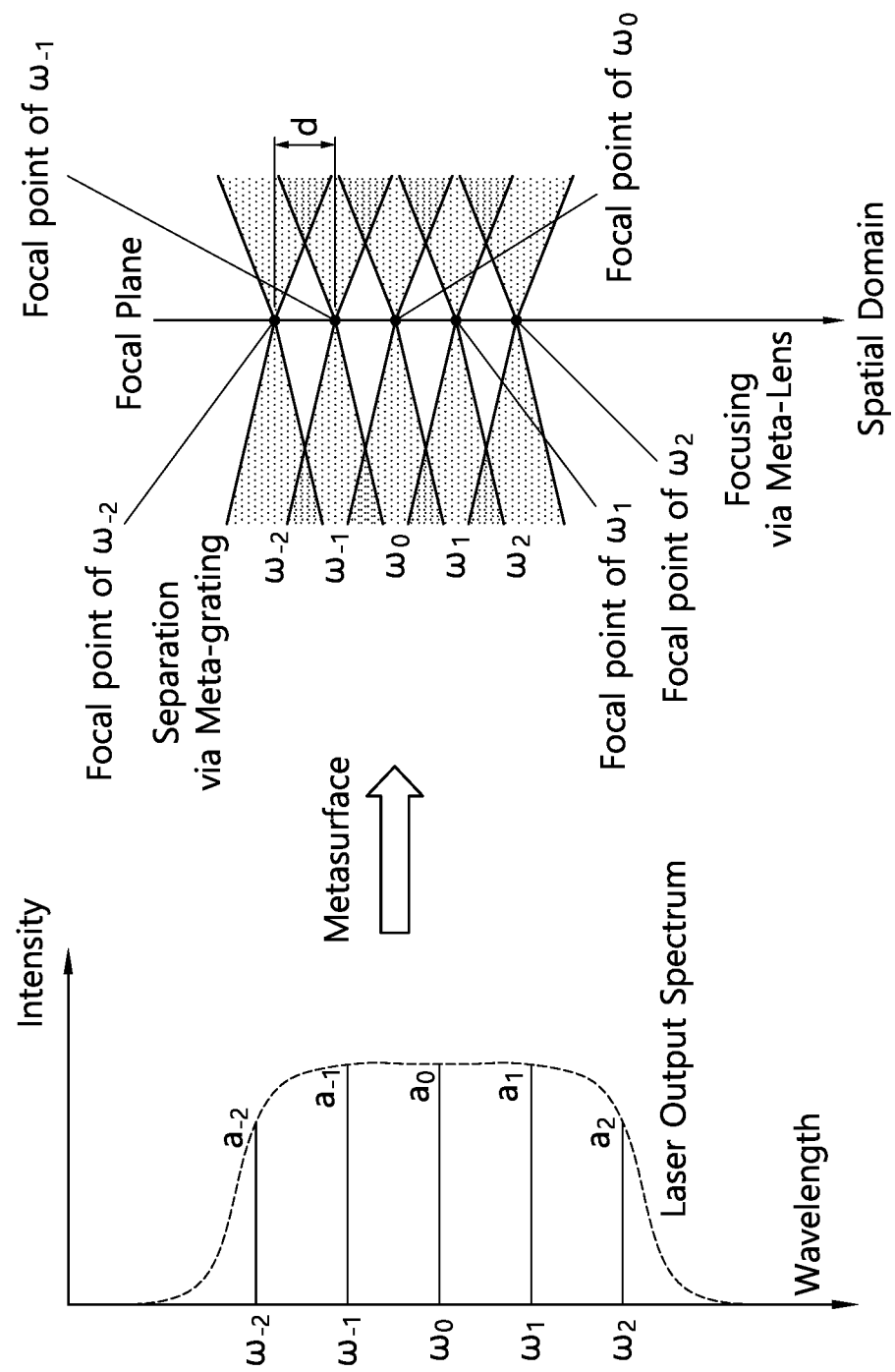
FIG. 30 schematically illustrates an example of a virtual antenna array.

FIG. 30 schematically illustrates an example of a virtual antenna array.

When a pulsed signal is passed through the structure described above, it is subjected to meta-grating and meta-lensing effects on the metasurface to form a virtual antenna array. For the sake of simplicity, the following description is based on (N=2) and a total of five frequency comb sources.

This means that there are different focal points for each angular frequency within a single focal plane in space, with a spacing of d between each focal point. Each focus becomes a virtual antenna through which only one angular frequency is passed.

Throughout the following description, the angular frequencies are expressed as frequencies for ease of explanation.

Figure 31:
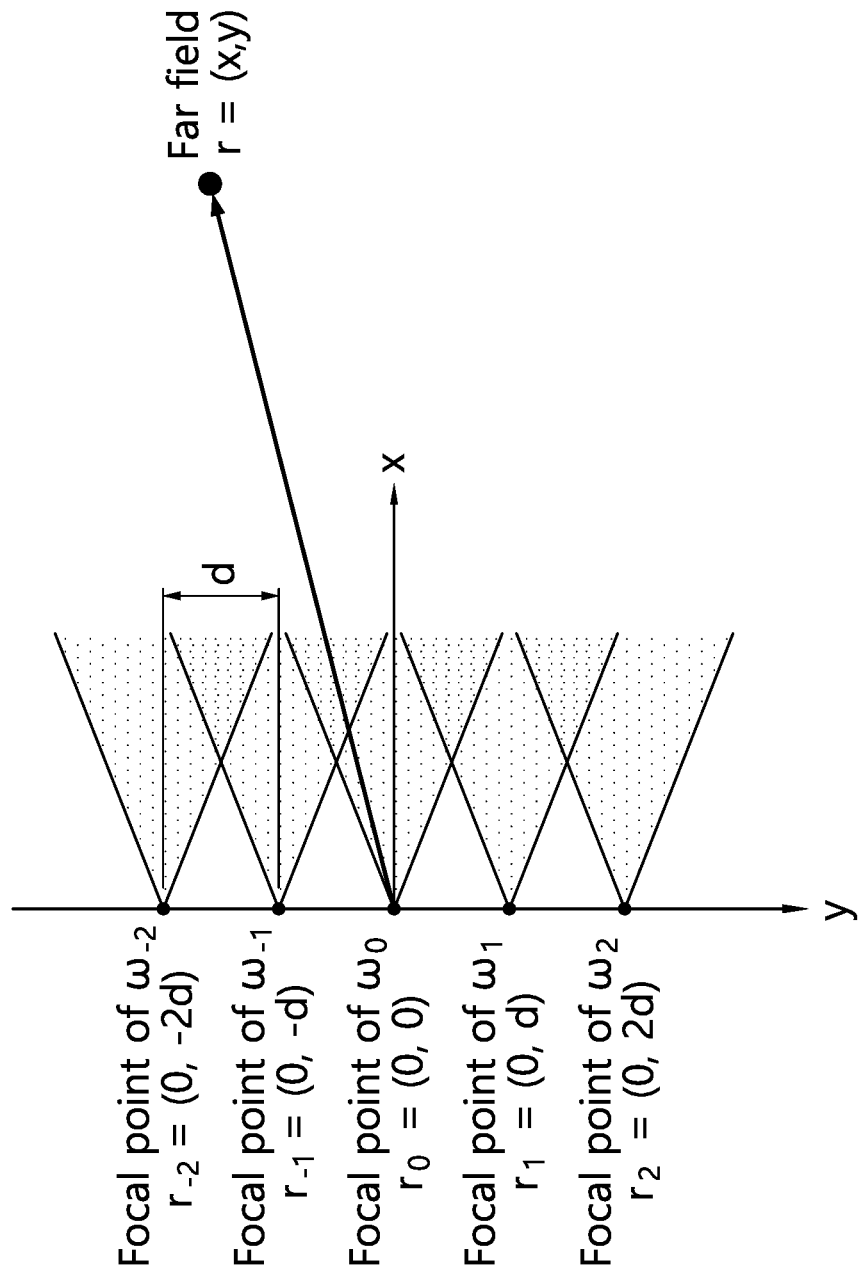
FIG. 31 schematically illustrates of an example of a signal passing through a virtual antenna.

FIG. 31 schematically illustrates of an example of a signal passing through a virtual antenna.

The signal arriving at arbitrary Far-field coordinates $r=(x, y)=(r \cos \theta, -r*\sin \theta)$ after passing through the virtual antenna may be expressed as $b\_n(r)=a\_n*G(r-r\_n)e^{\wedge}(-i*k\_n*(|r-r\_n|))$. Here, $G(r-r\_n)$ is the gain change due to propagation from the nth virtual antenna $r\_n=(0,nd)$ to coordinate $r=(x,y)$, $|r-r\_n|$ is the distance between the two coordinates, and $k\_n=\omega\_n/c=k\_0+n*\Delta k$. For the entire signal received at coordinate r considering a time change t, it may be written as $$b(r, t) = \sum_{-N}^{N} b_n(r) e^{-i\omega_n t} = \sum_{-N}^{N} a_n G(r - r_n) e^{-i(k_n|r-r_n|-\omega_n t)}.$$

That is, at time t, at coordinate r, it refers the sum of the gain and phase of each wave passed from each virtual antenna when it reaches r.

In this case, since r>>Nd in the Far-field, the difference between |r| and |r\_n| is relatively small enough that it may be approximated by $G(r-r_n)\approx G$ (r), and when expressed in circular coordinates, it may be approximated by $|r-r_n|= \sqrt{(r\sin\theta+nd)^2+r^2\cos^2\theta} \approx r+nd \sin \theta$. To summarize, it may be expressed as $$b(r, t) \approx G(r)e^{-i(k_0 r-\omega_0 t)} \sum_{-N}^{N} a_n e^{-in(\Delta k r + k_0 d \sin\theta - \Delta\omega t)}.$$

To summarize the representation of a pulsed signal, it may be expressed as follows by the product of the time-varying phase change term $e^{\wedge}(-i*\omega\_0*t)$ dominated by the center frequency and the envelope $A(t)$ of the pulsed signal, and the gain.

$$b(r, t) \approx A\left(t - \frac{k_0 d}{\Delta\omega}\sin\theta - \frac{r}{c}\right) G(r) e^{-i(k_0 r - \omega_0 t)}$$

Here, when $$A(t) = \sum_{-N}^{N} a_n e^{-in\Delta\omega t},$$

it may be understood that the peak of the synthesized pulse of the signals radiated from the virtual antenna array is time-shifted, according to the relationship of $(k\_0*d)/\Delta\omega$ at a location corresponding to the distance r and angle $\theta$ with respect to time t. Therefore, the speed and period at which the beam rotates changes with time, depending on the term k\_0, which reflects the time change caused by the center frequency, the virtual antenna spacing d, and the spacing $\Delta\omega$ of the frequency comb. The characteristics are summarized below. In the following description, scanning velocity means the speed at which the beam rotates relative to the reference rotation angle, and repetition time means the time it takes for the beam to rotate and return to its original position.

Effect of $\Delta\omega$

Regardless of the center frequency $\omega\_0$, it determines the repetition time $\tau=2\pi/\Delta\omega$ Assuming the center frequency $\omega\_0$ is fixed, the effect of d is as follows. (In the following, the wavelength $\lambda\_0=c/f\_0=2\pi-c/\omega\_0$ and c is the speed of light, which is about $3\times10^{\wedge}8$ m/s.)

If $d=\lambda\_0/2$, it has a reference scanning speed, and the entire radiation space is rotated by the virtual antenna during the repetition time.

If $d<\lambda\_0/2$, the beam rotates faster than the reference scanning speed, covering the entire radiation space in less time than the repetition time, resulting in a blank beam time (where the beam disappears).

If $d>\lambda\_0/2$, the beam rotates slower than the reference scanning speed, rotating the entire radiation space in a time longer than the repetition time, so that while one beam is rotating, the next beam appears to be rotating, creating the phenomenon of multiple beams in the entire radiation space.

In addition, as the size of 2N+1, which corresponds to the number of frequency combs in the above design, increases, the sharpness of the envelope A(t) of the pulse increases and the beam width decreases because multiple waves are superimposed.

Therefore, based on the above characteristics, the metasurface should be designed according to the center frequency $\omega\_0$, virtual antenna spacing d, frequency comb spacing $\Delta\omega$, and N, which determines the number of virtual antennas.

Metasurface Design for 4D Beamforming (l, w, h, $\theta$, ... )=$f(\omega_0, d, N)$.

In the above, l, w, h, $\theta$, etc., are the nanopin design parameters described above, and other parameters may be considered depending on the shape of the nanopin. Each parameter may be different for different nanopins.

For ease of explanation, the above is described from a 2D perspective, but it is self-evident that the same applies to 3D applications.

In the above, laser sources and metasurfaces are described, but it is apparent that the same may be applied to devices capable of generating pulsed signals and devices that function as meta-gratings and meta-lenses.

2. 4D Beamforming Transmitter Design

Figure 32:
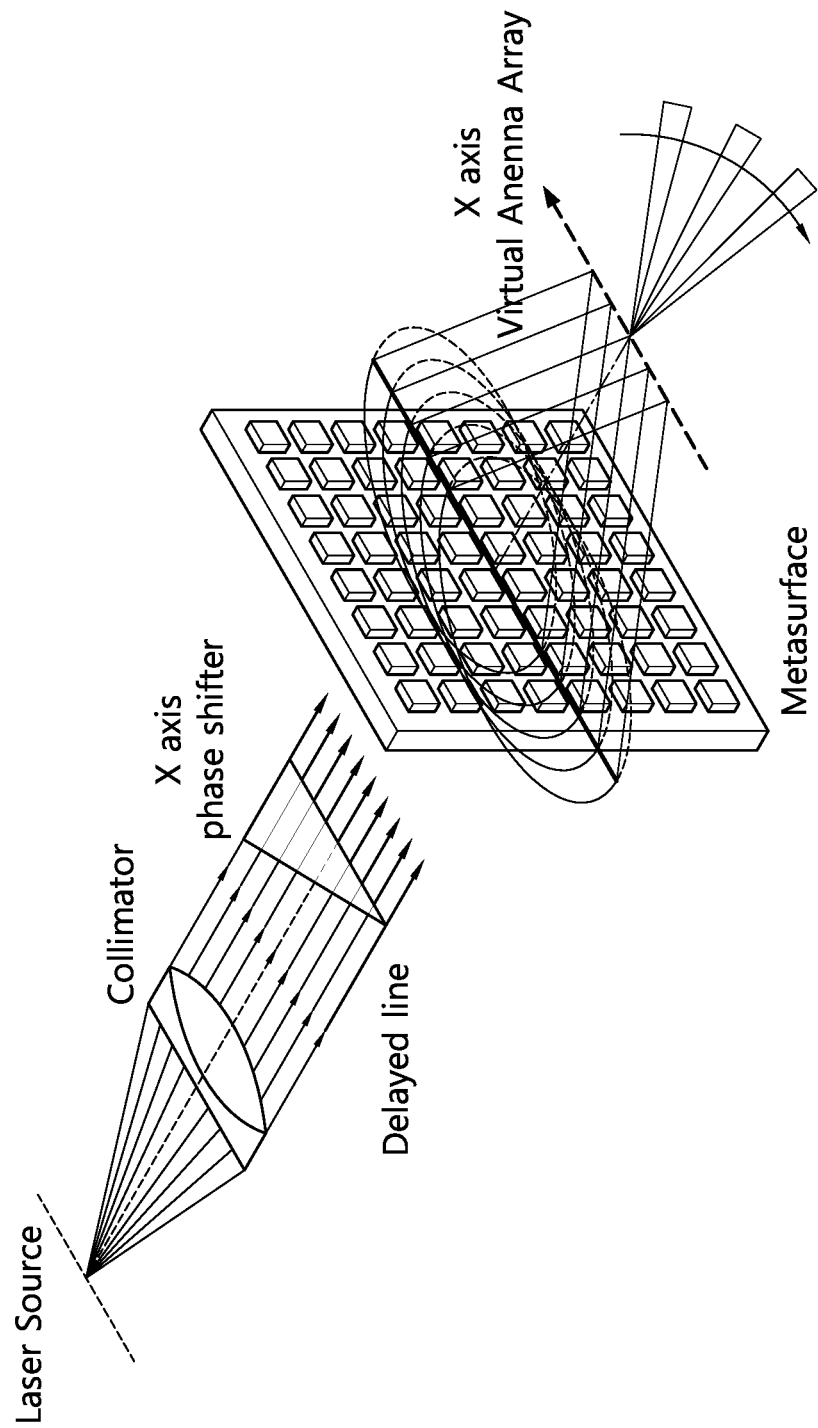
FIGS. 32 and 33 schematically illustrate an example of a beam's axis of rotation.
Figure 33:
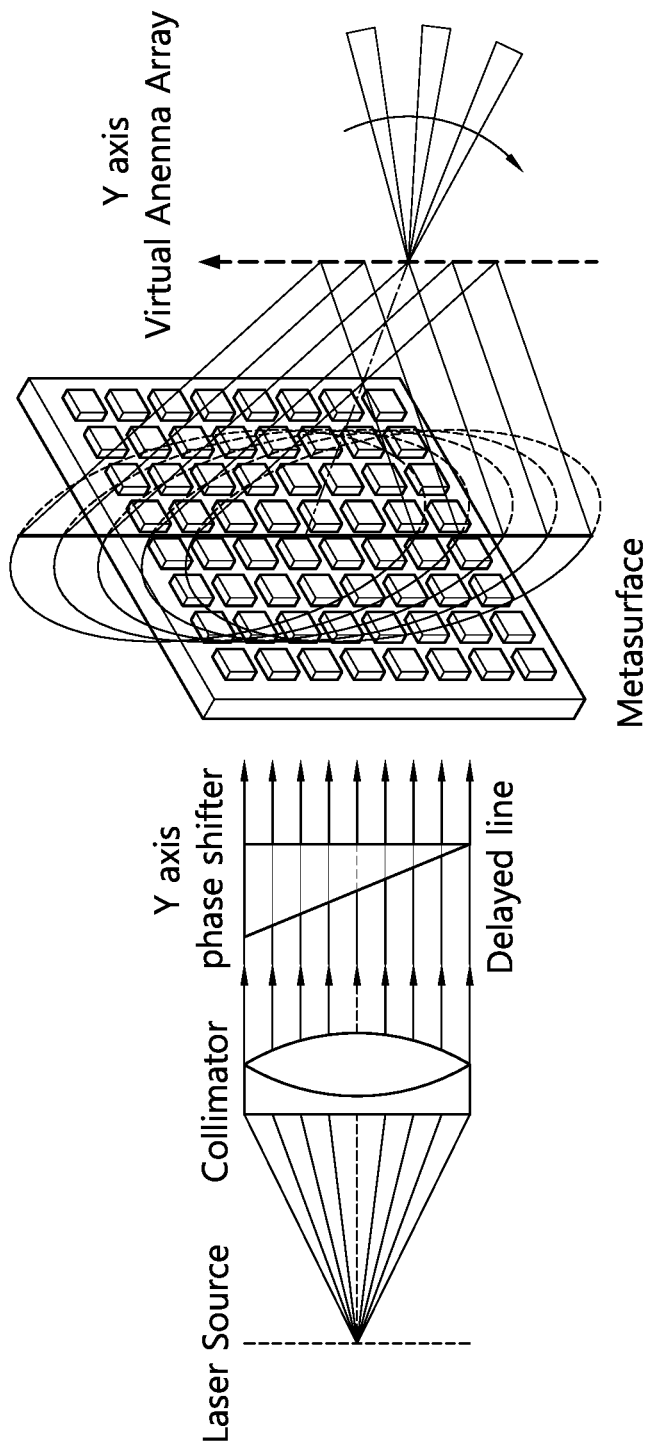

FIGS. 32 and 33 schematically illustrate an example of a beam's axis of rotation.

When performing a Tx structure design based on the frequency gradient metasurface principle described above, the direction of rotation of the beam may have two axes of rotation when steering and delivering the beam in time to a target location in three-dimensional space.

These are typically expressed in 3D beamforming as an azimuth angle and an elevation angle, which may be understood as an x-axis rotation and a y-axis rotation, respectively. Beam steering along the time axis, based on two rotation axes in three-dimensional space, is referred to as 4D beamforming. The following methods are proposed to support the above operation.

2.1. 4D Beamforming Based Virtual Antenna Control

Figure 34:
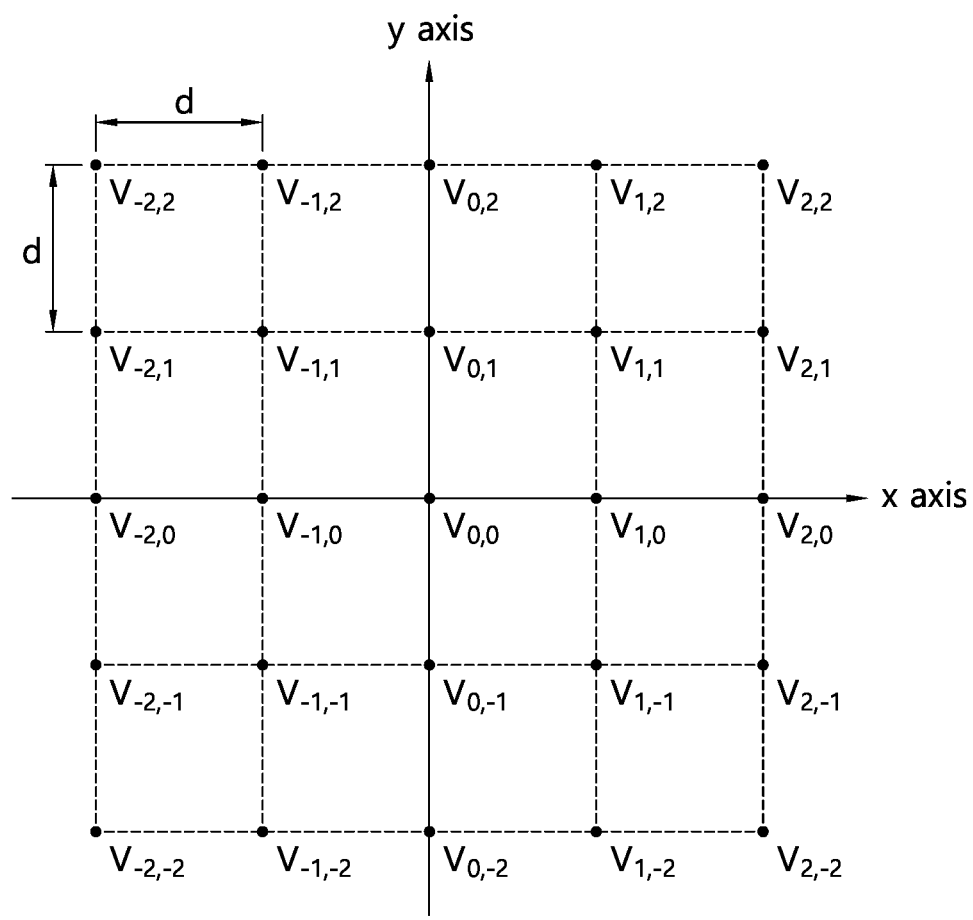
FIG. 34 schematically illustrates an example of a virtual antenna array space.

FIG. 34 schematically illustrates an example of a virtual antenna array space.

For forming 4D beam, the virtual antenna array space is represented by each virtual antenna V\_(m,n) as shown in the figure. In the figure, m=2 and n=2 are illustrated.

In the above, the signal radiated through each virtual antenna V\_(m,n) may be defined as V\_(m,n) (t)=a\_(m,n)*e^(-i*($\omega$\_(m,n)*t+$\varphi$\_(m,n))). Here, for each virtual antenna, a\_(m,n) is the amplitude, $\omega$\_(m,n) is the angular frequency, and $\varphi$\_(m,n) is the phase. Here, each of the control variables a\_(m,n), $\omega$\_(m,n), and $\varphi$\_(m,n) should be fed to the virtual antenna by the metasurface design. In addition, $\Delta\omega$\_x, $\Delta\omega$\_y, corresponding to the frequency spacings of the pulsed signal that make up $\omega$\_(m,n)=$\omega$\_0+m$\Delta\omega$\_x+n$\Delta\omega$\_y, should be provided by the laser source performing the signal generation.

2.1.1. 1-Dimensional Frequency Gradient Based 4D Beamforming 2.1.1.1. A 4D beamforming method that sequentially iterates a 1-dimensional frequency gradient along the x and y axes is proposed.

2.1.1.2. Single 1D-Array Based 4D Beamforming 2.1.1.2.1. For x-axis rotation, V\_(m,0) is activated.

In this case, $$a_{m,n} = \begin{cases} a_{m,n}, & \text{for } n = 0 \\ 0, & \text{for } n \neq 0 \end{cases},$$

$$\omega\_(m,n) = \omega\_0 + m * \Delta\omega\_x,$$

and $\varphi\_(m,n) = 0.$

Figure 35:
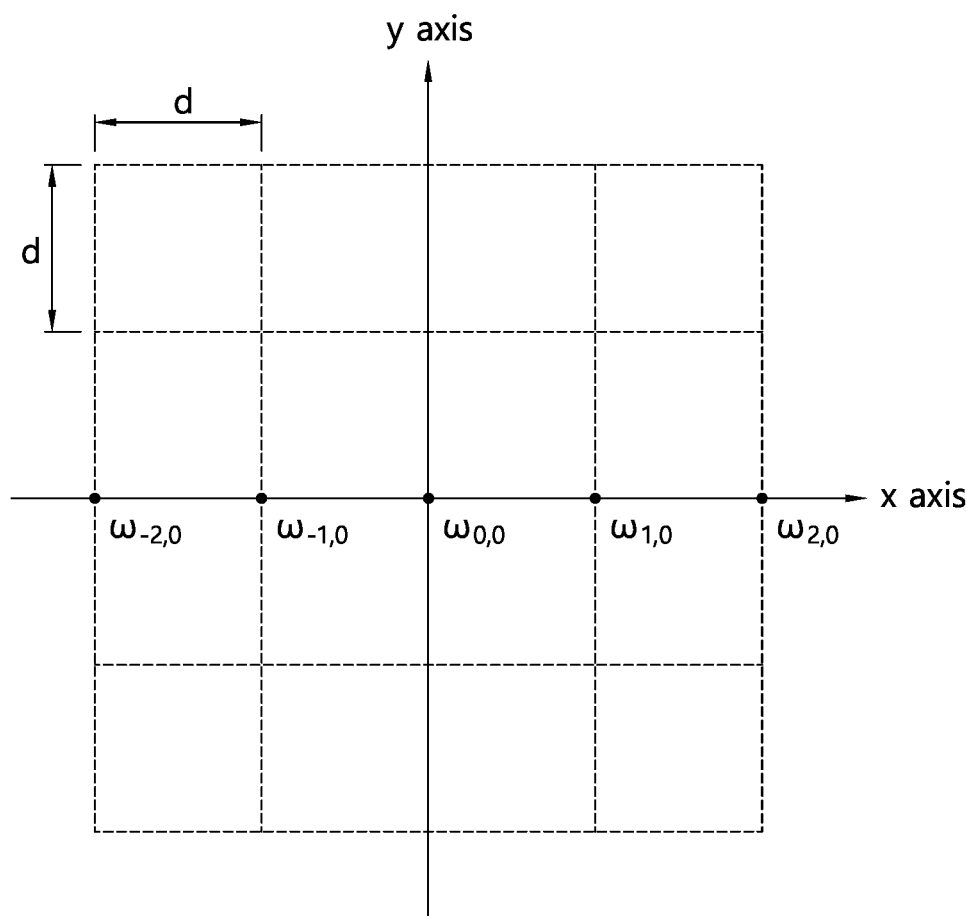
FIG. 35 schematically illustrates another example of virtual antenna array space.

FIG. 35 schematically illustrates another example of virtual antenna array space.

2.1.1.2.2. For example, a virtual antenna may be activated for a virtual antenna array with m=2 and n=2.

Figure 36:
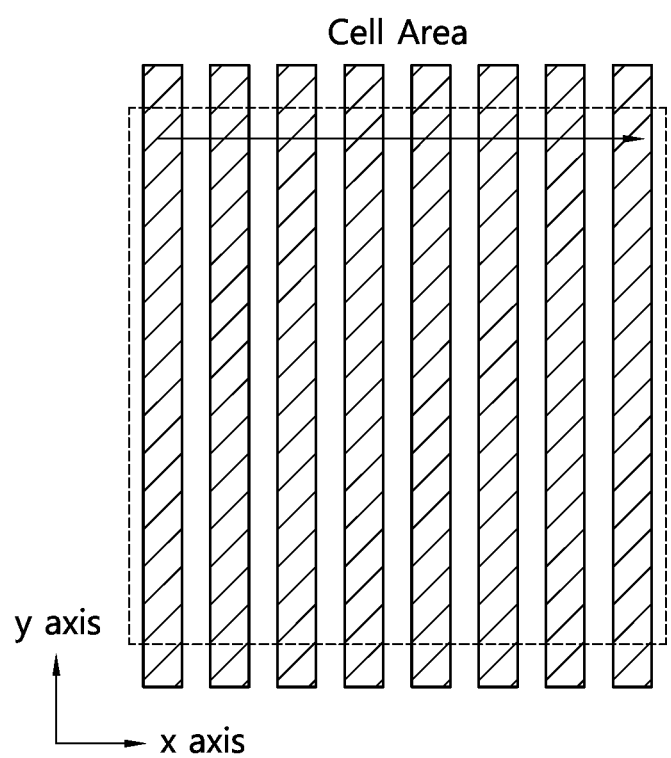
FIG. 36 schematically illustrates an example of transmission of a beam in the example of FIG. 35.

FIG. 36 schematically illustrates an example of transmission of a beam in the example of FIG. 35.

2.1.1.2.3. With the above method, there is only x-axis steering, so that the beam arrives in the cell area where the receiving end is located, rotating with time in the x-axis, but spreading out in the y-axis as a line beam.

2.1.1.2.4. After the above procedure, for y-axis rotation, V\_(0,n) is activated.

In this case, $$a_{m,n} = \begin{cases} a_{m,n}, & \text{for } m = 0 \\ 0, & \text{for } m \neq 0 \end{cases},$$

$$\omega\_(m,n) = \omega\_0 + n * \Delta\omega\_y, \text{ and}$$

$$\varphi\_(m,n) = 0.$$

Figure 37:
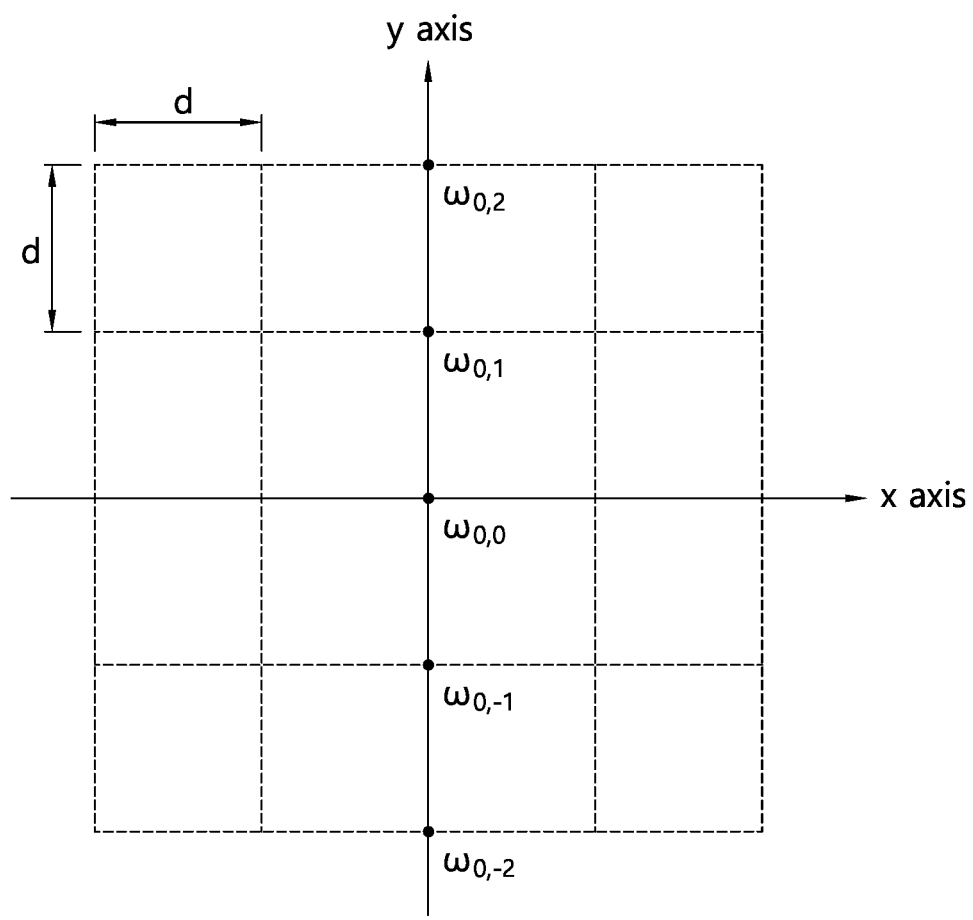
FIG. 37 schematically illustrates another example of a virtual antenna array space.

FIG. 37 schematically illustrates another example of a virtual antenna array space.

2.1.1.2.5. For example, a virtual antenna may be activated for a virtual antenna array with m=2 and n=2.

Figure 38:
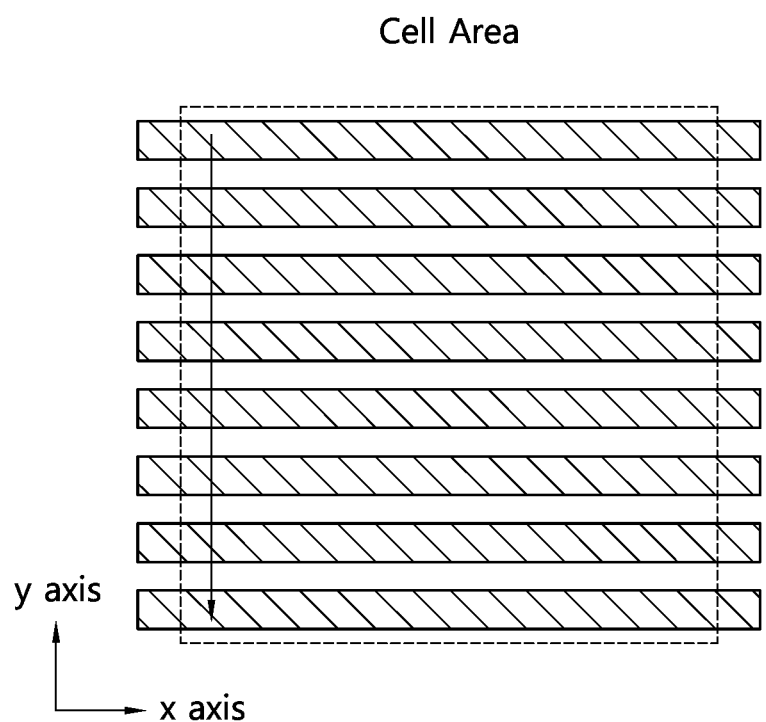
FIG. 38 schematically illustrates an example of transmission of a beam in the example of FIG. 37.

FIG. 38 schematically illustrates an example of transmission of a beam in the example of FIG. 37.

2.1.1.2.6. With the above method, there is only y-axis steering, so that the beam arrives in the cell area where the receiving end is located, rotating with time in the y-axis, but spreading out in the x-axis as a line beam.

Figure 39:
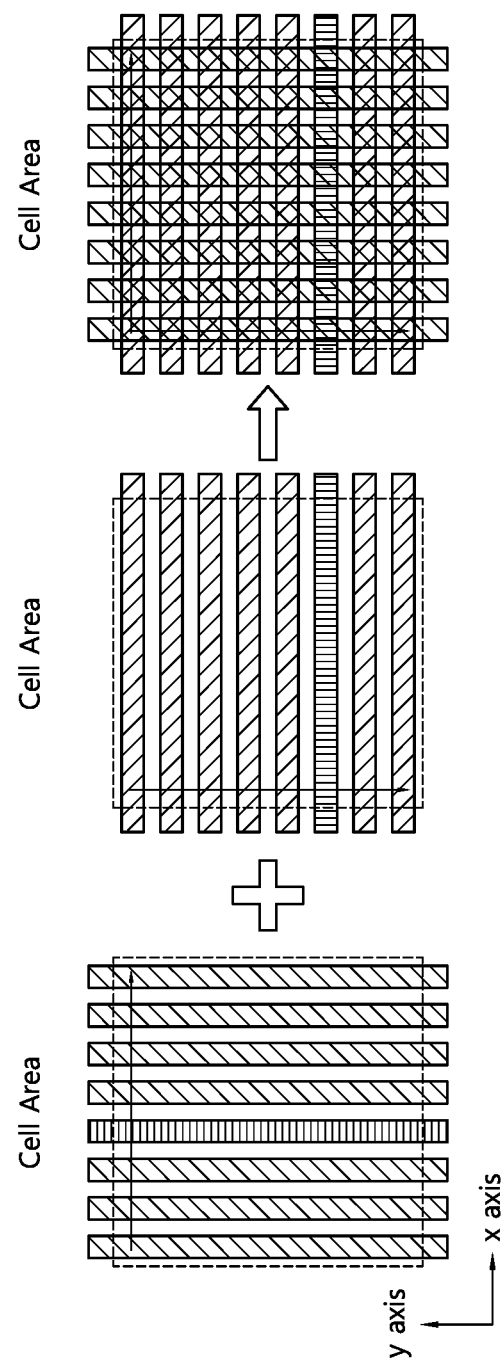
FIG. 39 schematically illustrates an example of transmission of a beam.

FIG. 39 schematically illustrates an example of transmission of a beam.

2.1.1.2.7. With the above steering for each axis, the receiving end can recognize the x-axis beam and the y-axis beam, and the direction of the beam can be recognized by the intersection of the x- and y-axes.

2.1.1.2.8. With the above method, beam tracking can be performed as the sum of the scanning time for the x-axis rotation and the scanning time for the y-axis rotation. However, due to the formation of a line beam, there may be a loss in terms of received SNR at a single receiving point.

Therefore, based on the above characteristics, the metasurface should be designed according to the center frequency $\omega\_0$, virtual antenna spacing d, frequency comb spacing $\Delta\omega$\_x, and N, which determines the number of virtual antennas.

Metasurface Design for 4D Beamforming (l, w, h, $\theta$, ... )=$f(\omega_0, d, \Delta\omega_x, N)$.

In this case, the configuration of the virtual antenna array through the metasurface should be designed to satisfy $\omega$\_(m, n), a\_(m,n), and $\varphi$\_(m,n) described above.

2.1.1.3. Multiple 1D-Array Based 4D Beamforming 2.1.1.3.1. For x-axis rotation, all or multiple V\_(m,n) are activated. In this case, a\_(m,n)=a\_(m,n), $\omega$\_(m,n)=$\omega$\_0+m*$\Delta\omega$\_x, and $\varphi$\_(m,n)=0.

2.1.1.3.2. That is, all or multiple V_(m,n) are activated, but since ω_(m,n)=ω_(m,0) for all n, the y-axis does not rotate, only the y-axis beamwidth decreases.

Figure 40:
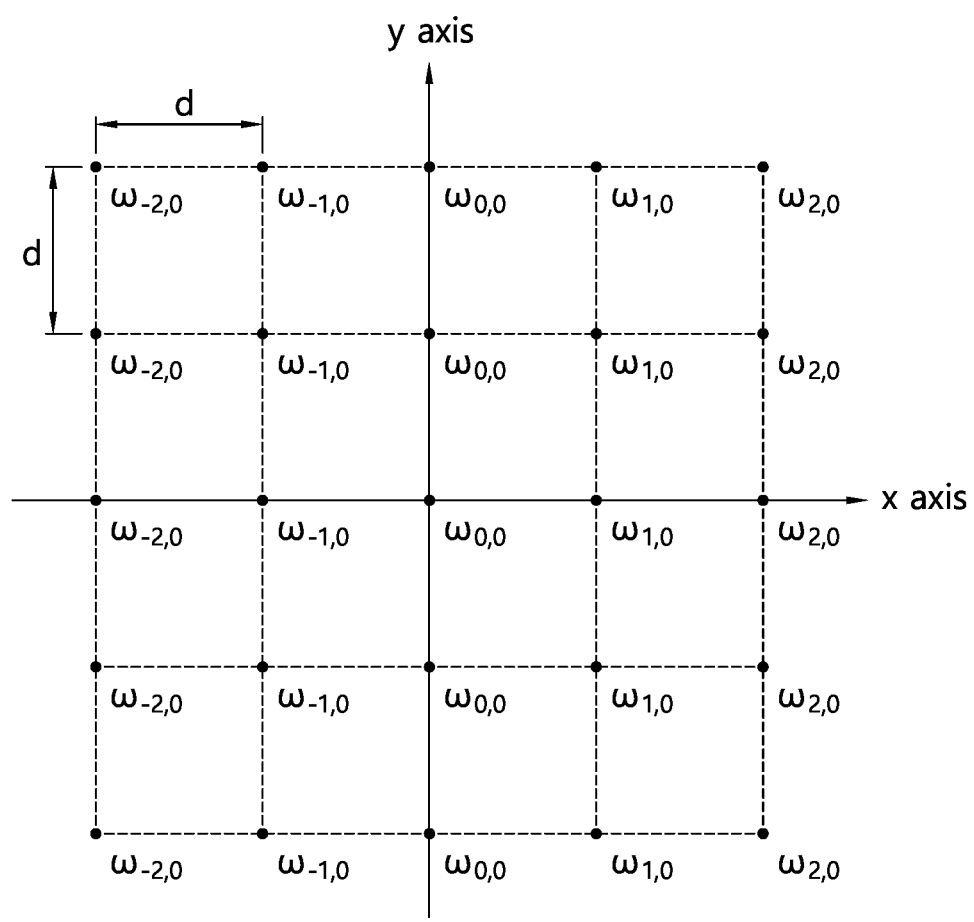
FIG. 40 schematically illustrates another example of a virtual antenna array space.

FIG. 40 schematically illustrates another example of a virtual antenna array space.

For example, virtual antennas may be activated for a virtual antenna array with m=2 and n=2.

Figure 41:
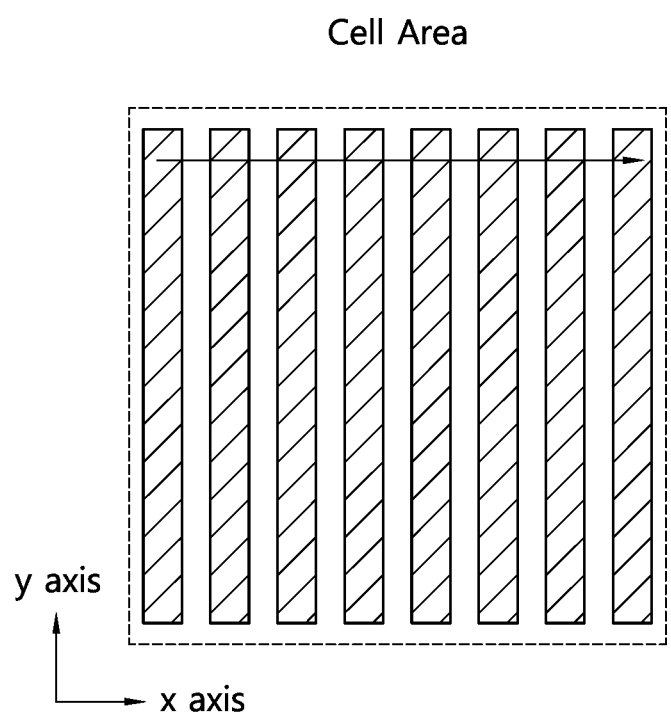
FIG. 41 schematically illustrates an example of transmission of a beam in the example of FIG. 40.

FIG. 41 schematically illustrates an example of transmission of a beam in the example of FIG. 40.

2.1.1.3.4. With the above method, there is only x-axis steering, so that the beam arrives in the cell area where the receiving end is located, rotating with time in the x-axis, but in the y-axis it spreads out in the form of a line beam, the width of which is controlled by the number of y-axis virtual antenna activations.

2.1.1.3.5. The same may be done for the y-axis in the same way as the procedure in 2.1.1.2.

2.1.1.3.6. With the above method, beam tracking can be performed as the sum of the scanning time for the x-axis rotation and the scanning time for the y-axis rotation. However, due to the formation of a line beam, there may be a loss in terms of received SNR at a single receiving point.

Therefore, based on the above characteristics, the metasurface should be designed according to the center frequency ω_0, virtual antenna spacing d, frequency comb spacing Δω_x, and N, which determines the number of virtual antennas.

Metasurface Design for 4D Beamforming (l, w, h, θ, . . . )=f(ω_0, d, Δω_x, N).

In this case, the configuration of the virtual antenna array through the metasurface should be designed to satisfy ω_(m, n), a_(m,n), and φ_(m,n) described above.

2.1.2. 2-D Frequency Gradient Based 4D Beamforming 2.1.2.1. 4D beamforming that steers the x and y axes simultaneously via a 2-dimensional frequency gradient is proposed.

2.1.2.2. For the simultaneous rotation of the x and y axes, all or multiple V_(m,n) are activated. In this case, a_(m,n)= a_(m,n), ω_(m,n)=ω_0+m*Δω_x+n*Δω_y, and φ_(m,n)=0.

Figure 42:
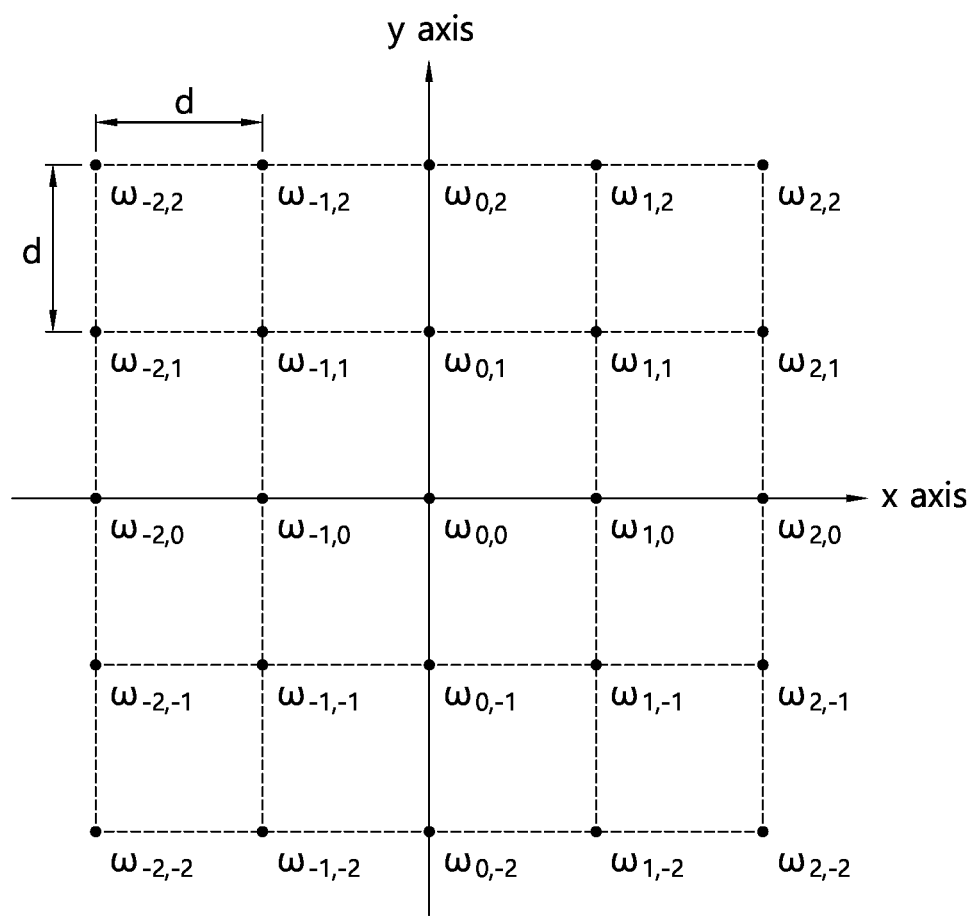
FIG. 42 schematically illustrates another example of a virtual antenna array space.

FIG. 42 schematically illustrates another example of a virtual antenna array space.

2.1.2.3. For example, for a virtual antenna array with m=2 and n=2, the virtual antennas may be activated as shown in FIG. 41.

Figure 43:
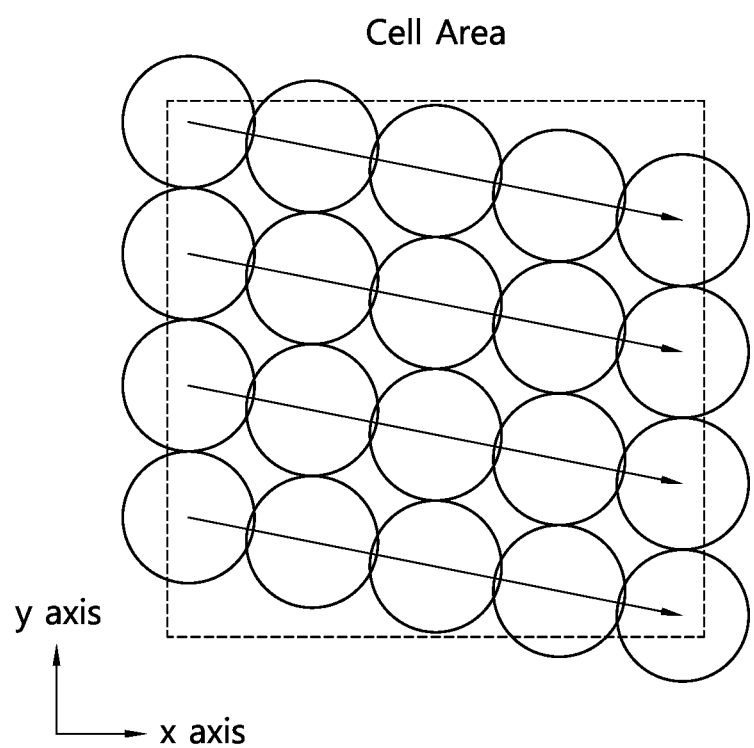
FIG. 43 schematically illustrates an example of transmission of a beam in the example of FIG. 42.

FIG. 43 schematically illustrates an example of transmission of a beam in the example of FIG. 42.

2.1.2.4. With the above method, the x-axis steering and the y-axis steering are simultaneously present by Δω_x and Δω_y, so that the beam arrives in the cell area where the receiving end is located, rotating with time in the x-axis and also rotating with time in the y-axis.

2.1.2.5. In this case, by controlling Δω_x and Δω_y, the cell area can be steered in two dimensions by configuring the x-axis rotation time and the y-axis rotation time differently. For example, if Δω_x=K*Δω_y, the repetition time for x-axis rotation will be K times faster than the repetition time for y-axis rotation.

2.1.2.6. With the above simultaneous steering of the two axes, the receiving end can recognize the target beam at once.

2.1.2.7. Through the above method, beam tracking can be performed with a scanning time that sweeps the entire cell area with x-axis rotation and y-axis rotation. In this case, the received SNR at a single receiving point can be maximized by forming a pencil beam.

Therefore, based on the above characteristics, a metasurface should be designed according to the center frequency ω_0, virtual antenna spacing d, frequency comb spacing Δω_x, Δω_y, and N, which determines the number of virtual antennas. Metasurface Design for 4D Beamforming (l, w, h, θ, . . . )=f(ω_0, d, Δω_x, Δω_y, N).

In this case, the configuration of the virtual antenna array through the metasurface should be designed to satisfy ω_(m, n), a_(m,n), and φ_(m,n) described above.

Hereinafter, the present disclosure will be described in more detail.

Figure 44:
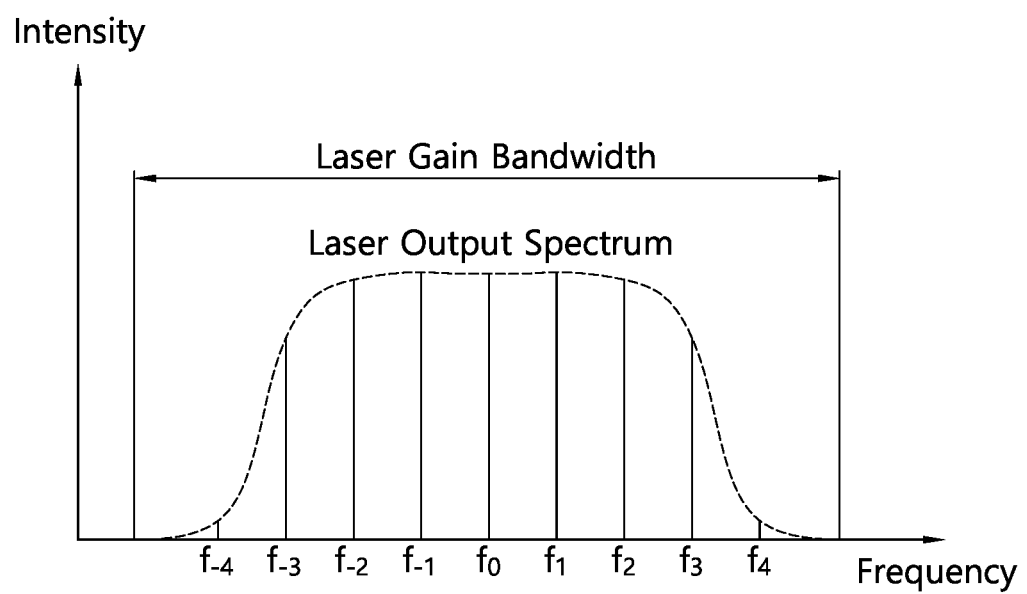
FIG. 44 schematically illustrates an example of a frequency comb.

FIG. 44 schematically illustrates an example of a frequency comb.

When implementing 4D beamforming in a wireless optical communication system using the methods described above, the laser source generally has a frequency comb characteristic as shown in FIG. 44.

Figure 45:
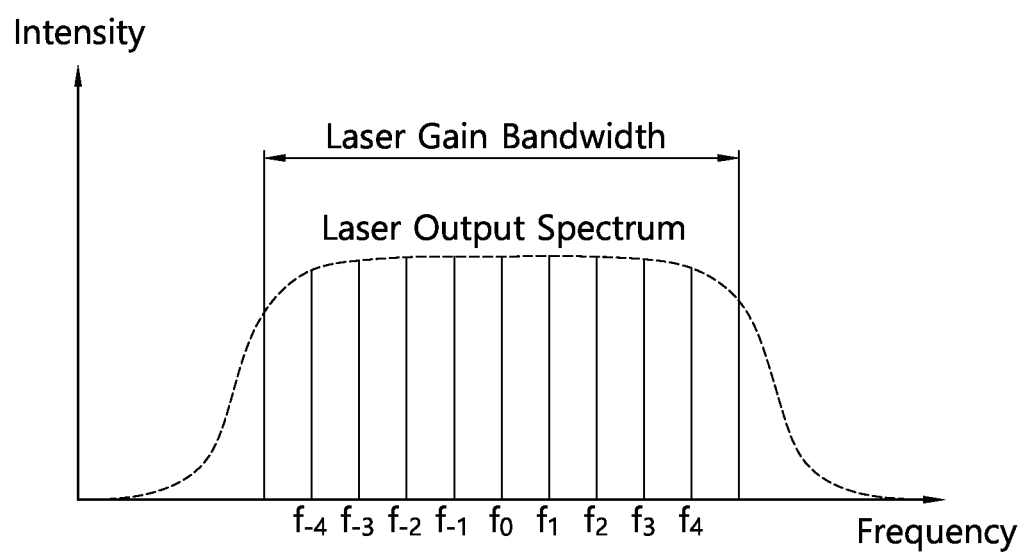
FIG. 45 schematically illustrates an example of selecting an effective frequency comb signal.

FIG. 45 schematically illustrates an example of selecting an effective frequency comb signal.

In the above structure, the laser source consists of a pulsed laser (e.g., Mode Locked Laser) with a specific period, which has a laser gain bandwidth when observed along the frequency axis, since the pulsed laser cannot produce an idle delta pulse. The magnitude of the frequency comb signal within the laser gain bandwidth is determined by the laser characteristics. If only a frequency comb signal with uniform power is selected, an effective frequency comb signal can be selected within the effective laser gain bandwidth, such as by a bandpass filter, as shown in FIG. 45.

Figure 46:
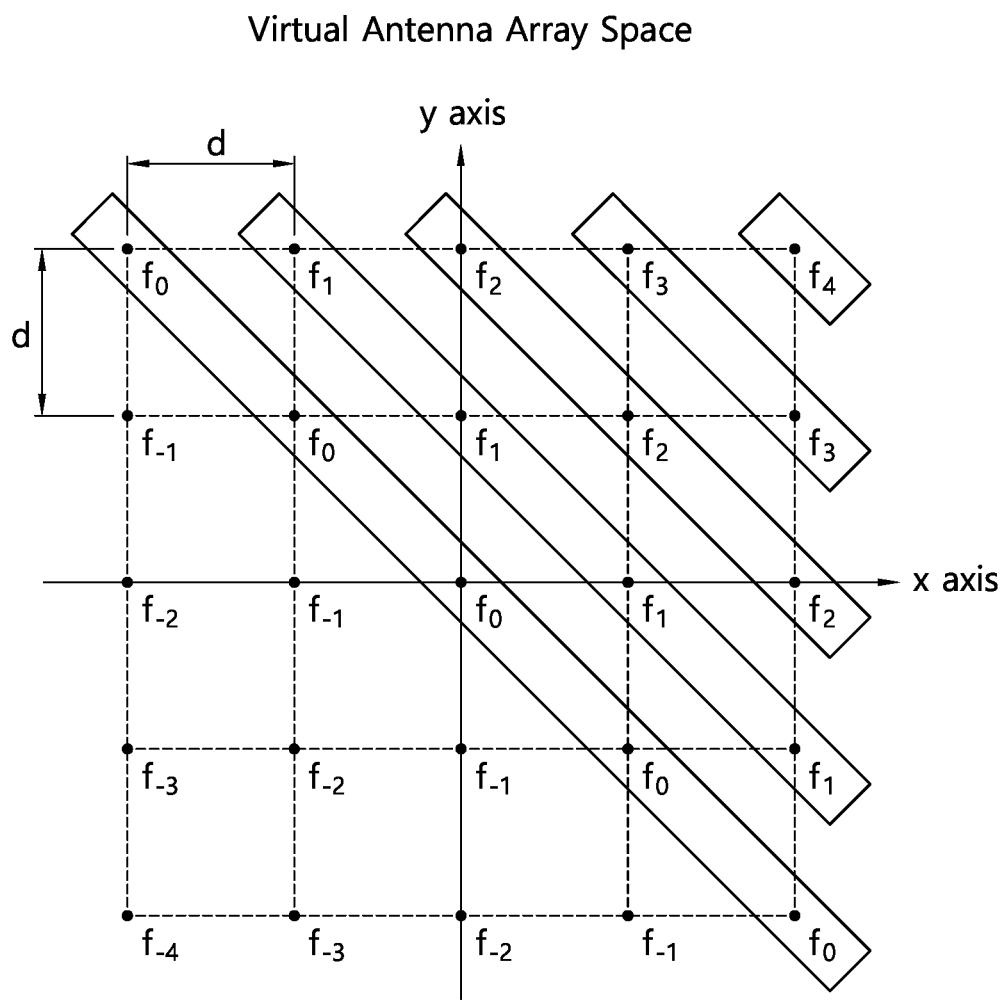
FIG. 46 illustrates an example of a frequency arrangement.

FIG. 46 illustrates an example of a frequency arrangement.

Here, when 4D beamforming is applied in a wireless optical communication system, each frequency may not be used the same number of times in a 2D antenna array due to frequency gradient characteristics. For example, the frequencies may be arranged as shown in FIG. 46.

Figure 47:
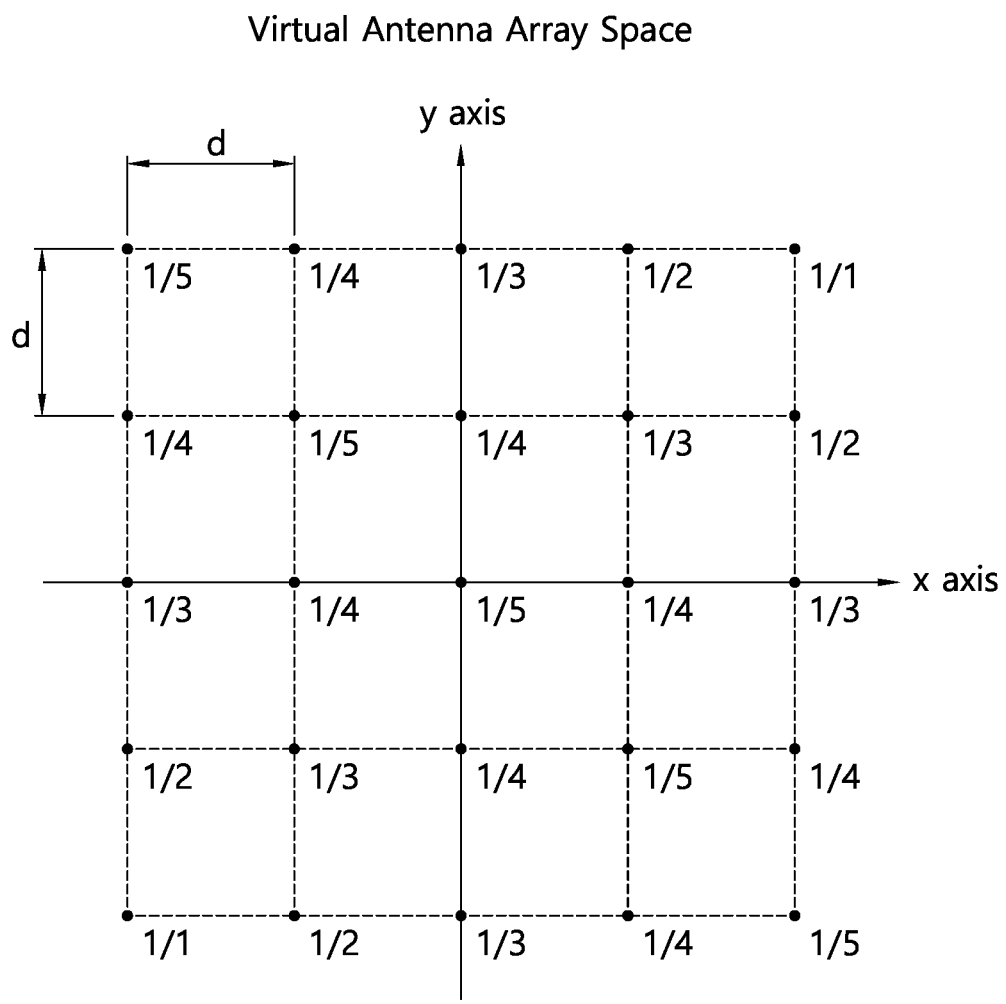
FIG. 47 schematically illustrates an example of an amplitude of an incident signal at an antenna.

FIG. 47 schematically illustrates an example of an amplitude of an incident signal at an antenna.

In the above, the magnitude of the signal applied to each antenna may vary due to the difference in the number of times each frequency is used. That is, when the signal i(t) generated by the laser source is focused per each frequency in the 2D virtual antenna array space by the meta-grating effect of the metasurface, it may be summarized as $$a(t) = \sum_{n=-N}^{n=N} \sum_{m=-M}^{m=M} V_{mn},$$

and V_mn=a_mn*e^(-j(ω_mn t-φ_mn)), where m and n correspond to the x- and y-axis antenna indices, respectively, and a_mn is the amplitude of the incident signal at antenna (m, n). In this case, a_mn is different for each frequency. When a_mn is the same for all m and n, the optimal beam can be formed. However, in the above example, the a_mn at the antenna position corresponding to f_0 is ⅕ of the size of the signal at f_0 from the laser source, since the signal is divided into five antennas. The relative size of a_mn for the above example is shown in FIG. 47.

Figure 48:
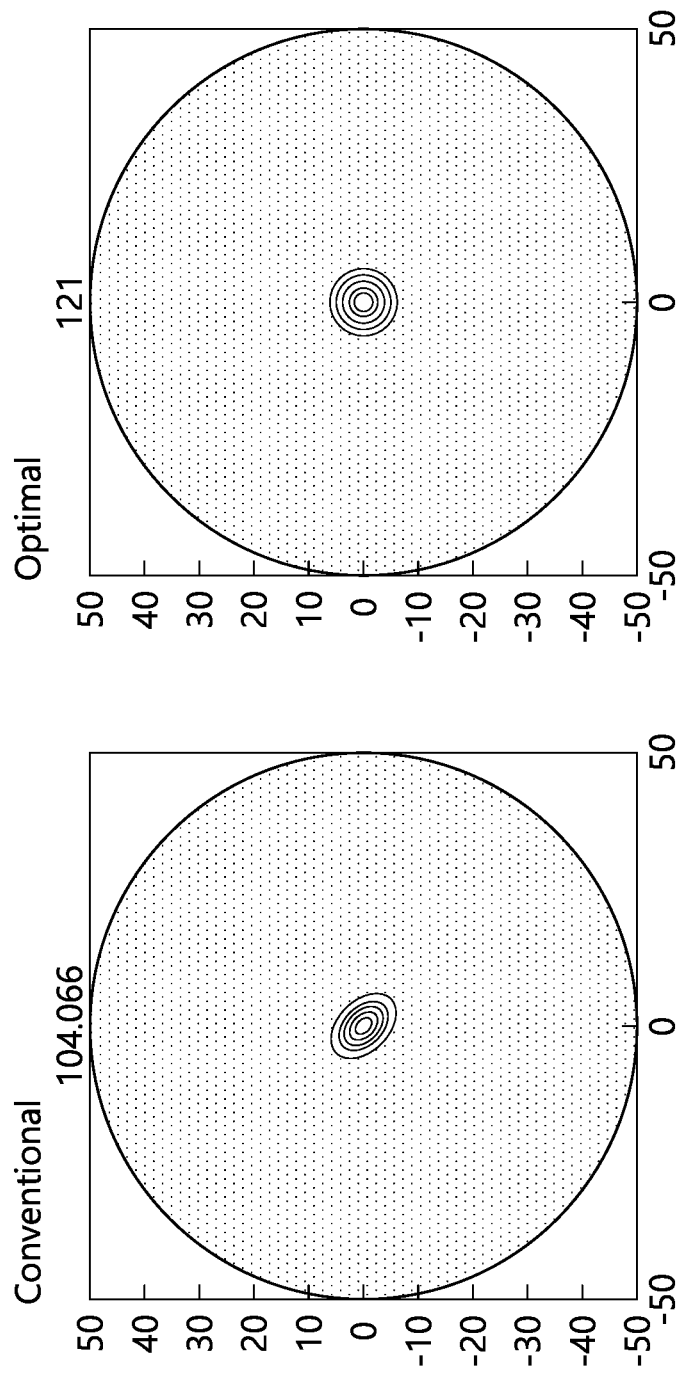
FIG. 48 schematically illustrates characteristics of a beam formed by 4D beam.

FIG. 48 schematically illustrates characteristics of a beam formed by 4D beam.

When the power is distributed unevenly as described above, the characteristics of the beam formed by the 4D beam are as shown in FIG. 48.

In the above, the antenna array has a size of 11×11, and the shape of the beam is not uniform due to uneven power distribution in the conventional case, and the sidelobe size is relatively large compared to the optimal case in areas other than the center main beam. In addition, the peak gain of the main beam is 104.66 (20.17 dB) in the conventional case, and the peak gain=121 (20.67 dB) in the case of optimal power distribution.

In other words, when 4D beamforming is performed without consideration of the power distribution of the frequency comb, the shape of the main beam is not uniform, which makes it difficult to operate the steering for beam tracking uniformly, and interference problems due to increased sidelobes and peak gain loss of the main beam occur. Therefore, a method and device for controlling the power of the frequency comb of a laser source is needed to reflect the frequency repetition characteristics of a 2D antenna array.

The present disclosure proposes a method and device for controlling the power of a frequency comb signal source so that a beam of signals generated by a device utilizing the aforementioned frequency gradient array characteristics optimally gathers energy.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 49:
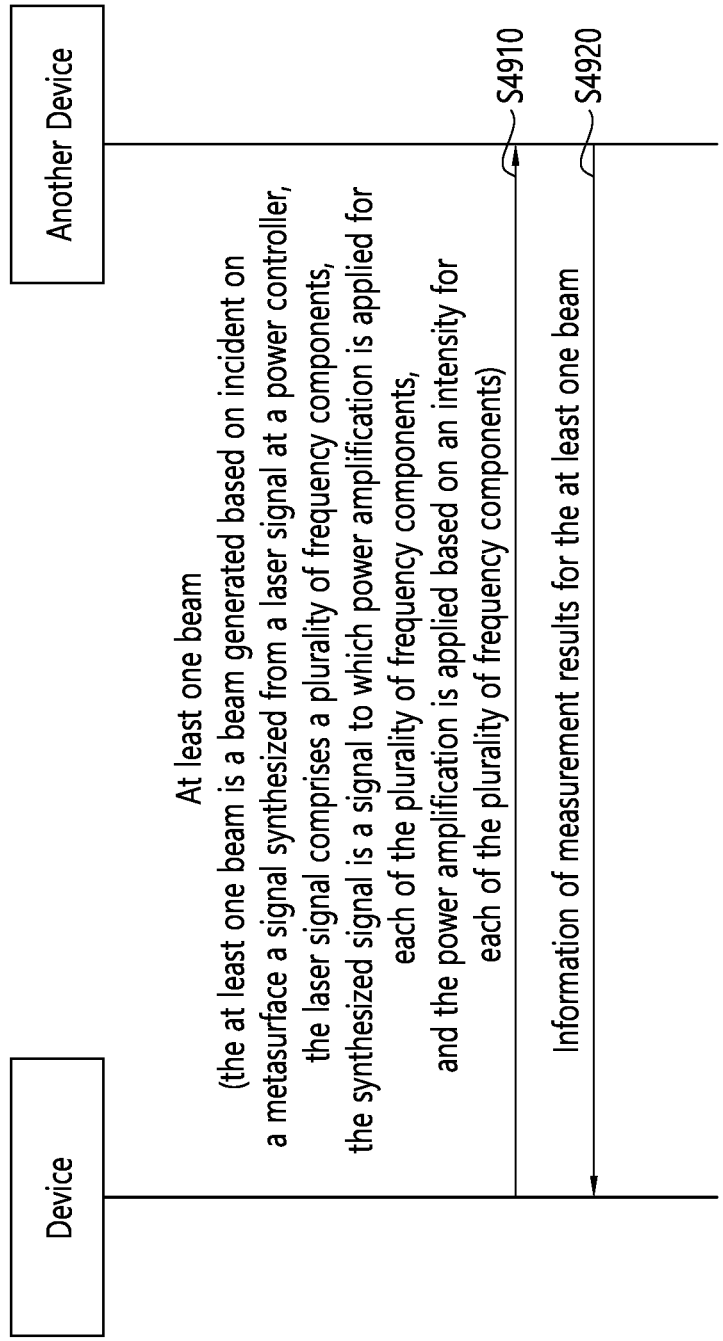
FIG. 49 is a flowchart of a method of transmitting at least one beam according to an embodiment of the present disclosure.

FIG. 49 is a flowchart of a method of transmitting at least one beam according to an embodiment of the present disclosure.

According to FIG. 49, a device may transmit at least one beam to another device (S4910). Hereinafter, more specific embodiments of the present disclosure will be described later (or earlier) for ease of explanation.

Here, the at least one beam may be a beam generated based on incident on a metasurface a signal synthesized from a laser signal at a power controller, the laser signal may comprise a plurality of frequency components, the synthesized signal may be a signal to which power amplification is applied for each of the plurality of frequency components, and the power amplification may be applied based on an intensity for each of the plurality of frequency components. Hereinafter, more specific embodiments of the present disclosure will be described later (or earlier) for ease of explanation.

The device may receive information of measurement results for the at least one beam from the another device (S4920). Hereinafter, more specific embodiments of the present disclosure will be described later (or earlier) for ease of explanation.

For example, the laser signal may be generated by a laser source of the device. Hereinafter, more specific embodiments of the present disclosure will be described later (or earlier) for ease of explanation.

For example, the device may comprise the laser source, the metasurface, and the power controller. Hereinafter, more specific embodiments of the present disclosure will be described later (or earlier) for ease of explanation.

For example, the plurality of frequency components may be categorized into L frequency components. Hereinafter, more specific embodiments of the present disclosure will be described later (or earlier) for ease of explanation.

For example, the power controller may branch the laser signal into L signals based on a 1:L coupler, where L is a natural number, select, based on L filters, L components from each of the L signals corresponding to a frequency component of each of the L filters, apply the power amplification to each of the L components, and generate the synthesized signal from the L components whose power is amplified based on the L:1 coupler. Hereinafter, more specific embodiments of the present disclosure will be described later (or earlier) for ease of explanation.

In another example, the power controller may extract the laser signal into L components with different frequency components based on an Arrayed Waveguide Grating (AWG), where L is a natural number, apply the power amplification to each of the L components, and generate the synthesized signal from the L components whose power is amplified based on an L:1 coupler. Hereinafter, more specific embodiments of the present disclosure will be described later (or earlier) for ease of explanation.

In another example, the power controller may extract the laser signal into L components having different frequency components based on an AWG, where L is a natural number, apply a phase shift to each of the L components, apply power amplification to each of the phase-shifted L components, and generate the synthesized signal from the L components whose power is amplified based on an L:1 coupler. Hereinafter, more specific embodiments of the present disclosure will be described later (or earlier) for ease of explanation.

For example, the device may be a base station, and the another device may be a UE. Hereinafter, more specific embodiments of the present disclosure will be described later (or earlier) for ease of explanation.

Although not shown, the example of FIG. 49 may be expressed in another way as follows.

A device may generate a laser signal from a laser source of the device. Hereinafter, more specific embodiments of the present disclosure will be described later (or earlier) for ease of explanation.

The device may then generate a synthesized signal (at the power controller) based on the laser signal being input to the power controller. Here, generating the synthesized signal may mean generating the synthesized signal from L components whose power is amplified based on an L:1 coupler. Hereinafter, more specific embodiments of the present disclosure will be described later (or earlier) for ease of explanation.

The device may then generate the at least one beam and transmit the at least one beam to another device based on the synthesized signal being incident on the metasurface. Hereinafter, more specific embodiments of the present disclosure will be described later (or earlier) for ease of explanation.

Here, as previously described, the laser signal may comprise a plurality of frequency components, the synthesized signal may be a signal to which power amplification is applied for each of the plurality of frequency components, and the power amplification may be applied based on an intensity for each of the plurality of frequency components. Hereinafter, more specific embodiments of the present disclosure will be described later (or earlier) for ease of explanation.

Hereinafter, embodiments of the present disclosure will be described in more detail.

1) Receiver (Entity A):

Based on the method and transmitting device proposed in the present disclosure, a receiving device may refer to a device capable of receiving at least one beam transmitted via an embodiment of the present disclosure.

2) Transmitter (Entity B):

The present disclosure proposes a method and a transmitting device for controlling the power of a frequency comb signal source of a device utilizing frequency gradient array characteristics.

Figure 50:
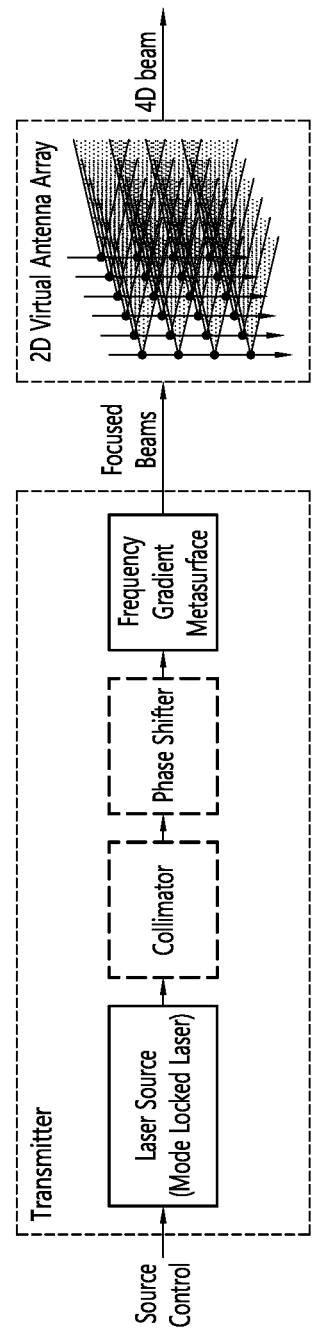
FIG. 50 schematically illustrates an example of a device for controlling power of a frequency comb signal source.

FIG. 50 schematically illustrates an example of a device for controlling power of a frequency comb signal source.

In the above device, if the frequency comb signal generated by the laser source has not undergone any processing, it may be expressed as follows.

$$i(t) = \sum_{n=-N}^{n=N} \sum_{m=-M}^{m=M} a_{mn} e^{-j(\omega_{mn} t - \varphi_{mn})}$$

Here, m and n correspond to the frequency component indices of the generated frequency comb signal, which in turn correspond to the x-axis and y-axis antenna indices, respectively. This may be expressed as $\omega\_mn = \omega\_0 + m^*\Delta\omega\_m + n^*\Delta\omega\_n = 2\pi(f\_0 + m^*\Delta f\_m + n^*\Delta f\_n)$, where $\omega\_0$ is the angular frequency for the center frequency of the source signal, $\omega\_m$ is the spacing of the angular frequency comb corresponding to the x-axis antenna index, and $\omega\_n$ is the spacing of the angular frequency comb corresponding to the y-axis antenna index.

Therefore, f_0 is the frequency for the center frequency of the source signal, Δf_m is the spacing of the frequency comb corresponding to the x-axis antenna index, and Δf_n is the spacing of the frequency comb corresponding to the y-axis antenna index. a_mn is the amplitude of the incident signal, ω_mn is the angular frequency of the incident signal, and φ_mn is the phase of the incident signal. In other words, all frequency signals including frequency indices from −N to N and frequency indices from −M to M are synthesized, so the total number of frequency combs is (2N+1)^2. If no processing is applied to the signal above, the phase of all frequency signals generated by the laser source is the same, so φ_mn=0.

When the signal i(t) is focused per each frequency in the 2D virtual antenna array space by the meta-grating effect of the metasurface, it may be rephrased as follows.

$$a(t) = \sum_{n=-N}^{n=N} \sum_{m=-M}^{m=M} V_{mn}$$

Here, V_mn=a_mn e^(−j(ω_mn t−φ_mn)), where m and n correspond to the x- and y-axis antenna indices, respectively, a_mn is the amplitude of the incident signal at antenna (m, n), ω_mn is the angular frequency of the incident signal at antenna (m, n), and φ_mn is the phase of the incident signal at antenna (m, n). If all the frequency comb signals are each focused by a metasurface, there are (2N+1)^2 virtual antennas in the 2D virtual antenna array space.

The diagram of the 2D virtual antenna array space is shown below.

Figure 51:
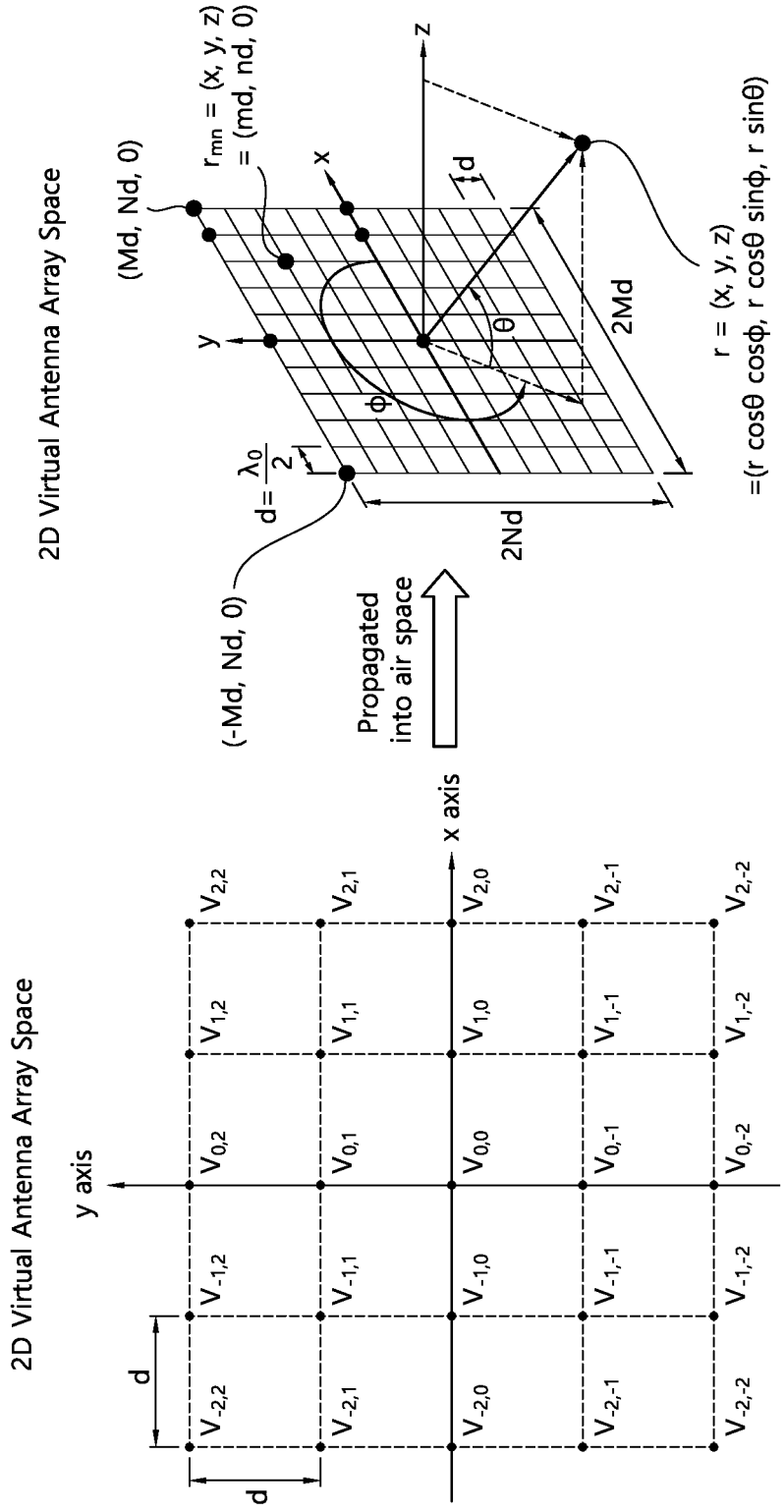
FIG. 51 schematically illustrates a 2D virtual antenna array.

FIG. 51 schematically illustrates a 2D virtual antenna array.

In other words, due to the meta-grating and meta-lensing effects of the metasurface, a signal corresponding to V_mn is focused at coordinate r_mn in the 2D virtual antenna array space. If all the signals in the 2D virtual antenna array space are synthesized at time t and radiated as coordinates r̄ in three-dimensional space, they may be expressed as b(x, y, z, t), which may be converted to a spherical coordinate system and expressed as follows.

$$b(r, \theta, \phi, t) = b(\bar{r}, t) = \sum_{n=-N}^{n=N} \sum_{m=-M}^{m=M} a_{mn} G(\bar{r} - \bar{r}_{mn}) e^{j(K_{mn} \cdot D_{mn} - \omega_{mn} t + \varphi_{mn})}$$

Here, r is the distance from the origin, φ is the angle rotated about the x-axis in the xy plane, θ is the angle rotated in the z-axis direction in the xy plane, and $G(\bar{r}-\bar{r}_{mn})$ is the gain change value due to propagation from the (m, n)th virtual antenna $\bar{r}_{mn}$=(md, nd, 0) to the coordinates $\bar{r}$=(x, y, z)=(r cos θ cos φ, r cos θ sin φ, r sin θ). In this case, the spacing d between the antennas is very small relative to the distance r (r>>N_d or M_d in the far-field), so it may be approximated by $G(\bar{r}-\bar{r}_{mn}) \cong G(\bar{r})$. Also, K_mn=ω_mn/c=(1/c)*(ω_0+m*Δω_m+n*Δω_n)=K_0+m*ΔK_m+n*ΔK_n, where $D_{mn}=|\bar{r}-\bar{r}_{mn}|$ is the distance between two coordinates. In this case, since $$|\bar{r} - \bar{r}_{mn}| = \sqrt{(r\cos\theta\cos\phi - md)^2 + (r\cos\theta\sin\phi - nd)^2 + (r\sin\theta - 0)^2}$$

for the spherical coordinate system, it may be approximated by $D_{mn} \approx r-(m \cos θ \cos \phi + n \cos θ \sin \phi)d$. Based on the above approximation, it may be rephrased as follows.

$$b(\bar{r}, t) = G(\bar{r}) e^{-j\omega_0 t}$$

$$\sum_{n=-N}^{n=N} \sum_{m=-M}^{m=M} a_{mn} e^{j((K_0+m\Delta K_m+n\Delta K_n)\cdot(r-(m\cos\theta\cos\phi+n\cos\theta\sin\phi)d)-m\Delta\omega_m t-n\Delta\omega_n t)} e^{j\varphi_{mn}}$$

In other words, the intensity of the beam at a coordinate r̄ at time t is formed by the combination of each component r, θ, φ of the coordinate r̄ and the angular frequency ω_mn formed by the frequency comb of the laser source, given the gain G(r̄) and the phase term e^(−jω_0 t) by the center frequency.

1) Laser source control

In the above device, the angular frequency ω_mn for 4D beam formation is 2π(f_0+m*Δf_m+n*Δf_n), so for ease of explanation, the frequency f_mn=f_0+m*Δf_m+n*Δf_n is used. Here, f_0 is the frequency for the center frequency of the source signal, Δf_m is the spacing of the frequency combs corresponding to the x-axis antenna index, and Δf_n is the spacing of the frequency combs corresponding to the y-axis antenna index. Assuming a system where the x-axis rotation speed is equal to or faster than the y-axis rotation speed, it may have the relationship of Δf_m=αΔf_n, where a may be assumed to be a positive value (α≥1).

In this case, if a is assumed to be an integer value to unify the frequency comb units of the laser source, it may be a positive integer value with α≥1.

Therefore, the pattern of the frequency comb signal applied to the 2D antenna array for 4D beam formation may be expressed as f_mn=f 0+(a*m+n)*Δf_n. In other words, the basic unit of the frequency comb of the laser source is Δf_n, and the repetition rate for the pulsed signal of the mode-locked laser, which is a laser source, is configured as τ=1/Δf_n.

In this case, with the conditions of antenna indexes−N≤n≤N, −M≤m≤M, the frequency comb signal incident pattern matrix for the entire 2D antenna array is defined as follows.

$$\overline{F} = \begin{bmatrix} f_{-M,N} & \cdots & f_{M,N} \\ \vdots & \ddots & \vdots \\ f_{-M,-N} & \cdots & f_{M,-N} \end{bmatrix} = [f_{mn}] = f_0 + \overline{K}\Delta f_n = f_0 +$$

$$\begin{bmatrix} -M\alpha+N & \cdots & -2\alpha+N & -\alpha+N & N & \alpha+N & 2\alpha+N & \cdots & M\alpha+N \\ \vdots & \ddots & & \vdots & \vdots & \vdots & & \ddots & \vdots \\ \vdots & & \ddots & -\alpha+2 & 2 & \alpha+2 & \ddots & & \vdots \\ -M\alpha+1 & \cdots & -2\alpha+1 & -\alpha+1 & 1 & \alpha+1 & 2\alpha+1 & \cdots & M\alpha+1 \\ -M\alpha & \cdots & -2\alpha & -\alpha & 0 & \alpha & 2\alpha & \cdots & M\alpha \\ -M\alpha-1 & \cdots & -2\alpha-1 & -\alpha-1 & -1 & \alpha-1 & 2\alpha-1 & \cdots & M\alpha-1 \\ \vdots & & \ddots & -\alpha-2 & -2 & \alpha-2 & \ddots & & \vdots \\ \vdots & \ddots & & \vdots & \vdots & \vdots & & \ddots & \vdots \\ -M\alpha-N & \cdots & -2\alpha-N & -\alpha-N & -N & \alpha-N & 2\alpha-N & \cdots & M\alpha-N \end{bmatrix} \Delta f_n$$

That is, for M and N, which determine the size of a given 2D antenna array, $\overline{K}$ is the matrix for f coefficients of $\Delta f\_n$ which is the fundamental unit of the frequency comb of the laser source. Therefore, the minimum value of the coefficients is $-M*\alpha-N$, and the maximum value of the coefficients is $M*\alpha+N$. The effective bandwidth of the laser source for 4D beam formation may then be configured as follows.

Effective BW of the laser source: BW_e=2*($\alpha$*M+N)*$\Delta$f_n

Figure 52:
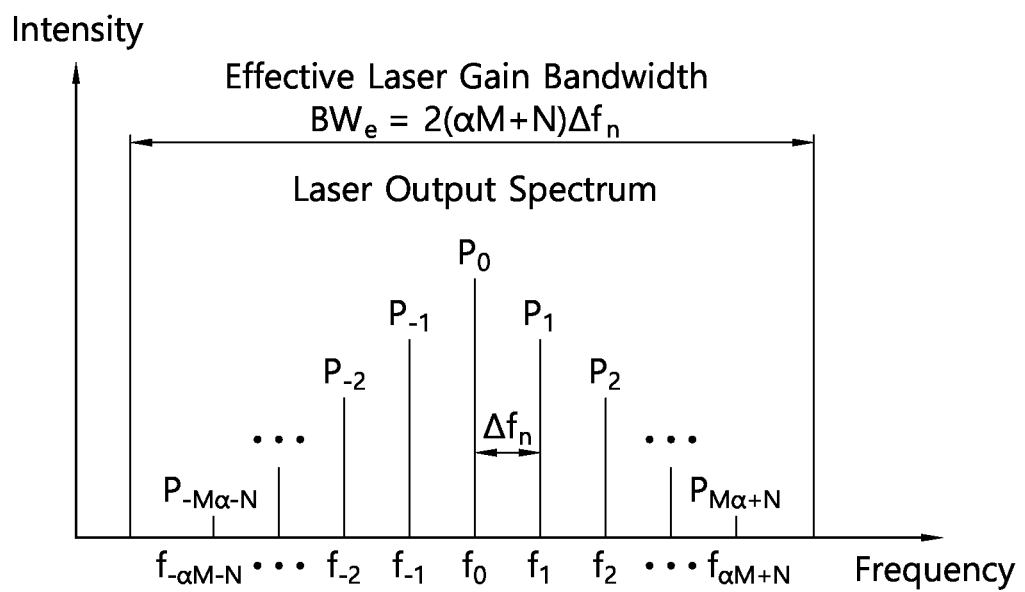
FIG. 52 schematically illustrates an example of a laser output spectrum.

FIG. 52 schematically illustrates an example of a laser output spectrum.

The laser output spectrum along the frequency axis of a laser source that satisfies the above conditions may be schematized as shown in FIG. 52.

The coefficient of $\Delta$f_n expressed above in terms of k is summarized as follows. f_k=f_0+k$\Delta$f_n, for $-M*\alpha-N \leq k \leq M*\alpha+N$. (Note: In the above, f_mn refers to the frequency comb signal incident pattern by antenna indices m and n in the 2D antenna array, and f_k refers to the frequency comb signal generated by the laser source. That is, the $\overline{K}$ matrix expresses the coefficient of $\Delta$f_n of the frequency comb signal generated by the laser source by antenna indices m and n in the 2D antenna array).

In the above, the power of the frequency comb signal generated by the laser source is distributed by the number of times each coefficient k in the matrix $\overline{K}$ is repeated. Since optimal beamforming is possible when uniform power is applied to all the coefficient points within $\overline{K}$, it is necessary to apply more power to each coefficient k within $\overline{K}$ by the number of times it is repeated. Therefore, the power of each frequency comb signal is configured as P_k=count($\overline{K}$=k) for $-M*\alpha-N \leq k \leq M*\alpha+N$. Here, the meaning of count($\overline{K}$=k) is the number of coefficients k in the matrix $\overline{K}$ formed by $\alpha$, M, and N, which is determined by the system environment.

Example 1. $\alpha$=1, M=N=2
Effective BW of laser source: BW_e=8*$\Delta$f_n
P_k=count($\overline{K}$=k), for $-4 \leq k \leq 4$ FIG. 53 schematically illustrates of an example of a coefficient matrix, and FIG. 54 schematically illustrates of a laser output spectrum thereof.

Figure 54:
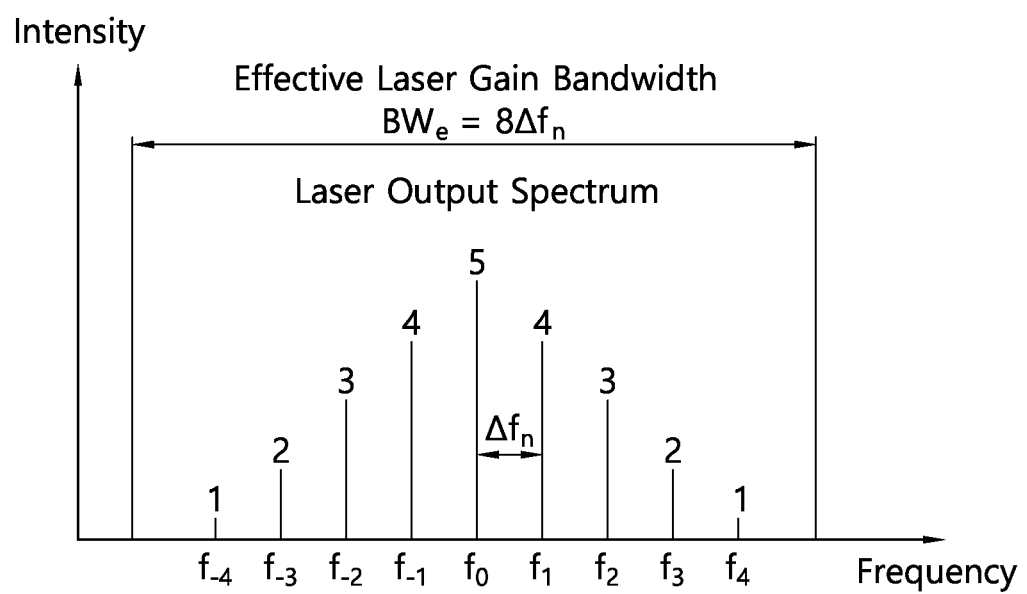

In Example 1, the coefficient matrix K may be as shown in FIG. 53, and the laser output spectrum thereof may be as shown in FIG. 54.

Example 2. $\alpha$=2, M=N=2
Effective BW of laser source: BW_e=8*$\Delta$f_n
P_k=count($\overline{K}$=k), for $-4 \leq k \leq 4$ FIG. 55 schematically illustrates another example of a coefficient matrix, and FIG. 56 schematically illustrates a laser output spectrum thereof.

Figure 56:
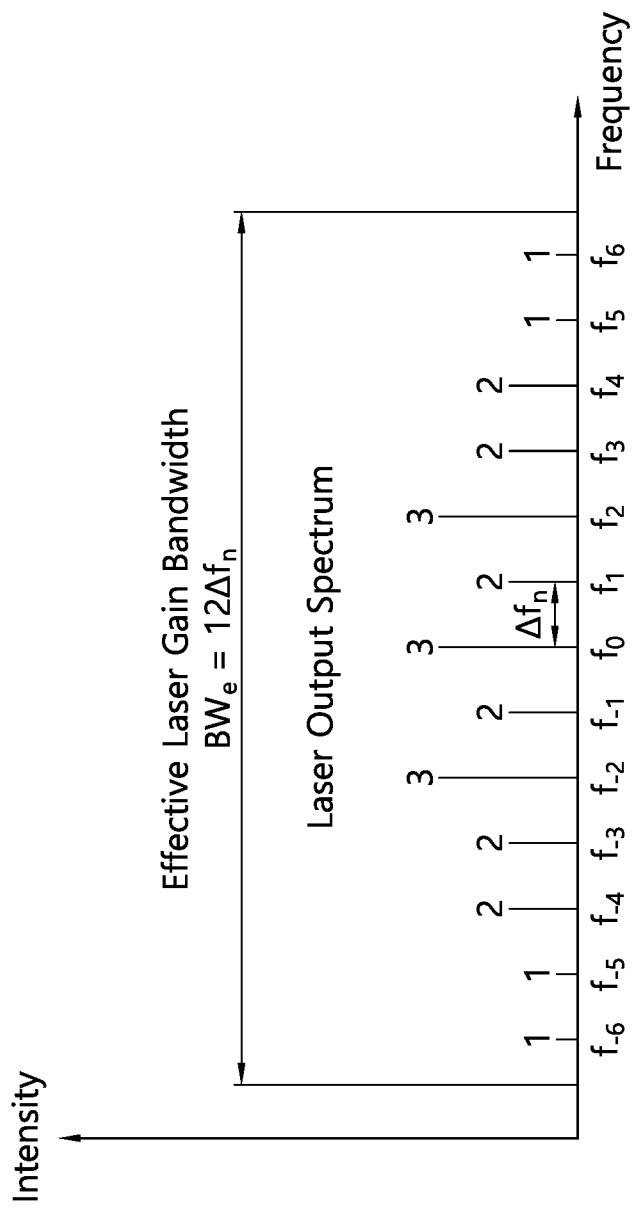

In Example 2, the coefficient matrix K may be as shown in FIG. 55, and the laser output spectrum thereof may be as shown in FIG. 56.

In the above, assuming a system in which the x-axis rotation speed is equal to or slower than the y-axis rotation speed, it may have the relationship of $\alpha$*$\Delta$f_m=$\Delta$f_n, in which case the basic unit of the frequency comb of the laser source is $\Delta$f_m, and the repetition rate for the pulsed signal of the mode-locked laser, which is the laser source, is configured as $\tau$=1/$\Delta$f_m. Therefore, the pattern of the frequency comb signal applied to the 2D antenna array for 4D beam forming may be expressed as f_mn=f_0+(m+$\alpha$*n)*$\Delta$f_m. Then, in the same way, the effective bandwidth of the laser source for 4D beam formation may be configured as follows.

Effective BW of laser source: BW_e=2*(M+$\alpha$*N)*$\Delta$f_m

Therefore, using the same procedure, the power of each frequency comb signal is configured as P_k=count($\overline{K}$=k) for $-M-N*\alpha \leq k \leq M+N*\alpha$. Here, the meaning of count($\overline{K}$=k) is the number of coefficients k in the matrix $\overline{K}$ formed by $\alpha$, M, and N, which is determined by the system environment.

2) Transmitter Structure for Frequency Comb Power Control

The transmitter structure with the frequency comb power control method proposed above is proposed as follows.

2-1) Transmitter Structure w/ Power Controller (1:L Coupler+Wavelength Filter+Power Amplifier+L:1 Coupler)

To perform the frequency comb power control proposed in 1), a transmitter structure that performs power changes per frequency using a power controller for the signal source from the laser source is proposed.

Figure 57:
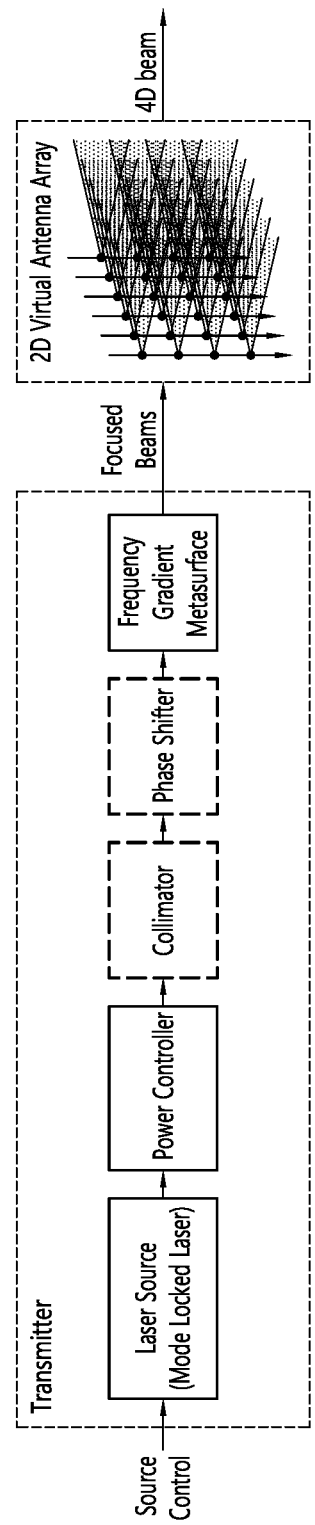
FIG. 57 schematically illustrates an example of a transmitter performing power change.

FIG. 57 schematically illustrates an example of a transmitter performing power change.

The power controller may branch the laser signal into L signals based on a 1:L coupler, where L is a natural number, select L components, based on L filters, from each of the L signals corresponding to frequency components of each of the L filters, apply the power amplification to each of the L components, and generate the synthesized signal from the L components whose power is amplified based on the L:1 coupler.

In this case, the detailed design of the power controller in FIG. 57 is shown below.

Figure 58:
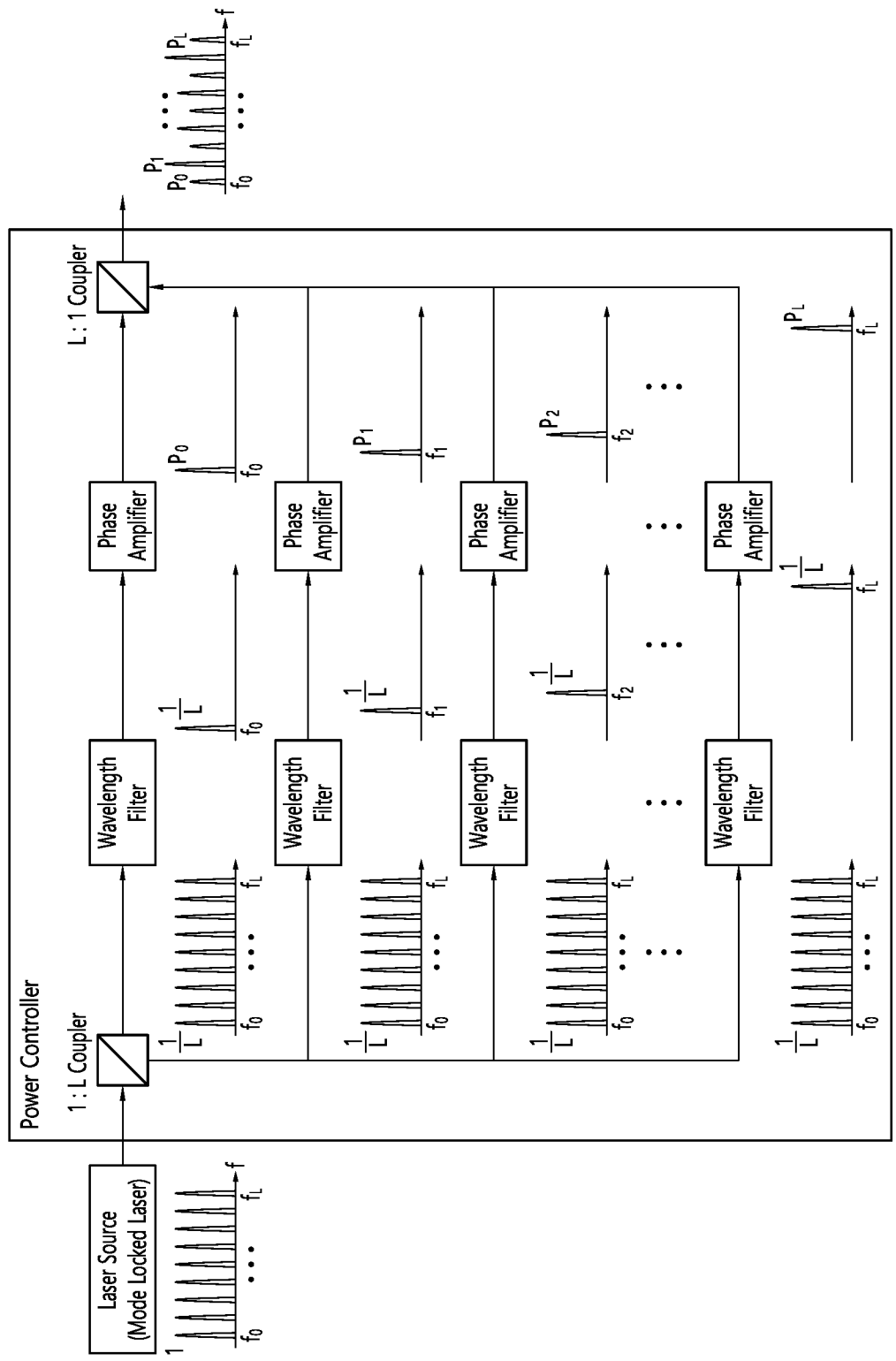
FIG. 58 illustrates a detailed design for an example of a power controller.

FIG. 58 illustrates a detailed design for an example of a power controller.

After frequencies are selected through a wavelength filter, and power control is performed through a power amplifier for each frequency, the signal is synthesized through an L:1 coupler. After passing through the power controller, the size of the signal source can be controlled by the power P_k=count($\overline{K}$=k) obtained in 1) for each frequency.

In the above, the power amplifier performs power control using the power value (P_k=count($\overline{K}$=k)) determined by the power control method per frequency proposed in 1). For the sake of simplicity, it is described as L, but for the case where $\Delta$f_m=$\alpha$*$\Delta$f_n, it should be L=2($\alpha$*M+N) to cover all ranges of k for P_k. Conversely, for the case $\alpha$*$\Delta$f_m=$\Delta$f_n, it should be L=2*(M+$\alpha$*N) to cover all ranges of k for P_k.

2-2) Transmitter Structure w/ Power Controller (AWG+Power Amplifier+L:1 Coupler)

To perform the frequency comb power control proposed in 1), a transmitter structure that performs power changes per frequency using a power controller for the signal source from the laser source is proposed.

Figure 59:
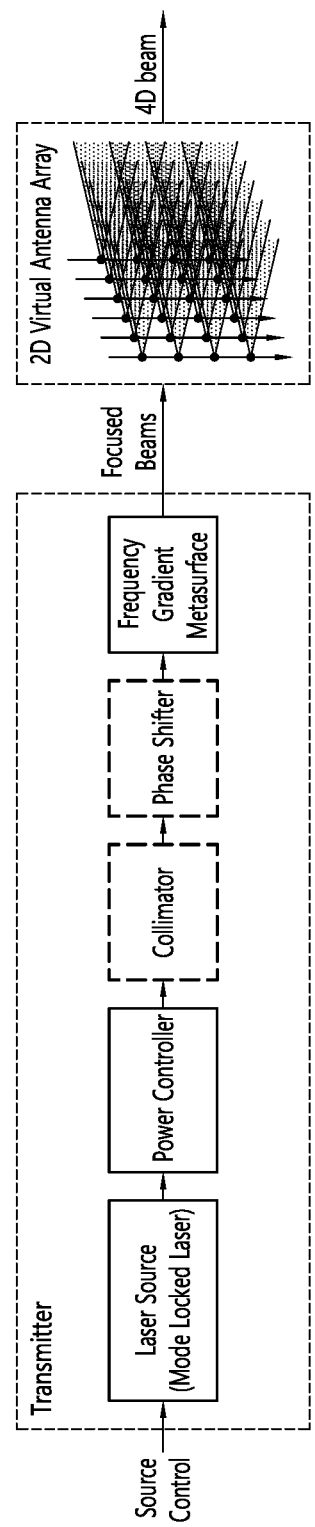
FIG. 59 schematically illustrates another example of a transmitter performing power change.

FIG. 59 schematically illustrates another example of a transmitter performing power change.

The power controller may extract the laser signal into L components having different frequency components based on an Arrayed Waveguide Grating (AWG), where L is a natural number, apply the power amplification to each of the L components, and generate the synthesized signal from the L components whose power is amplified based on an L:1 coupler.

In this case, the detailed design of the power controller in FIG. 59 is shown below.

Figure 60:
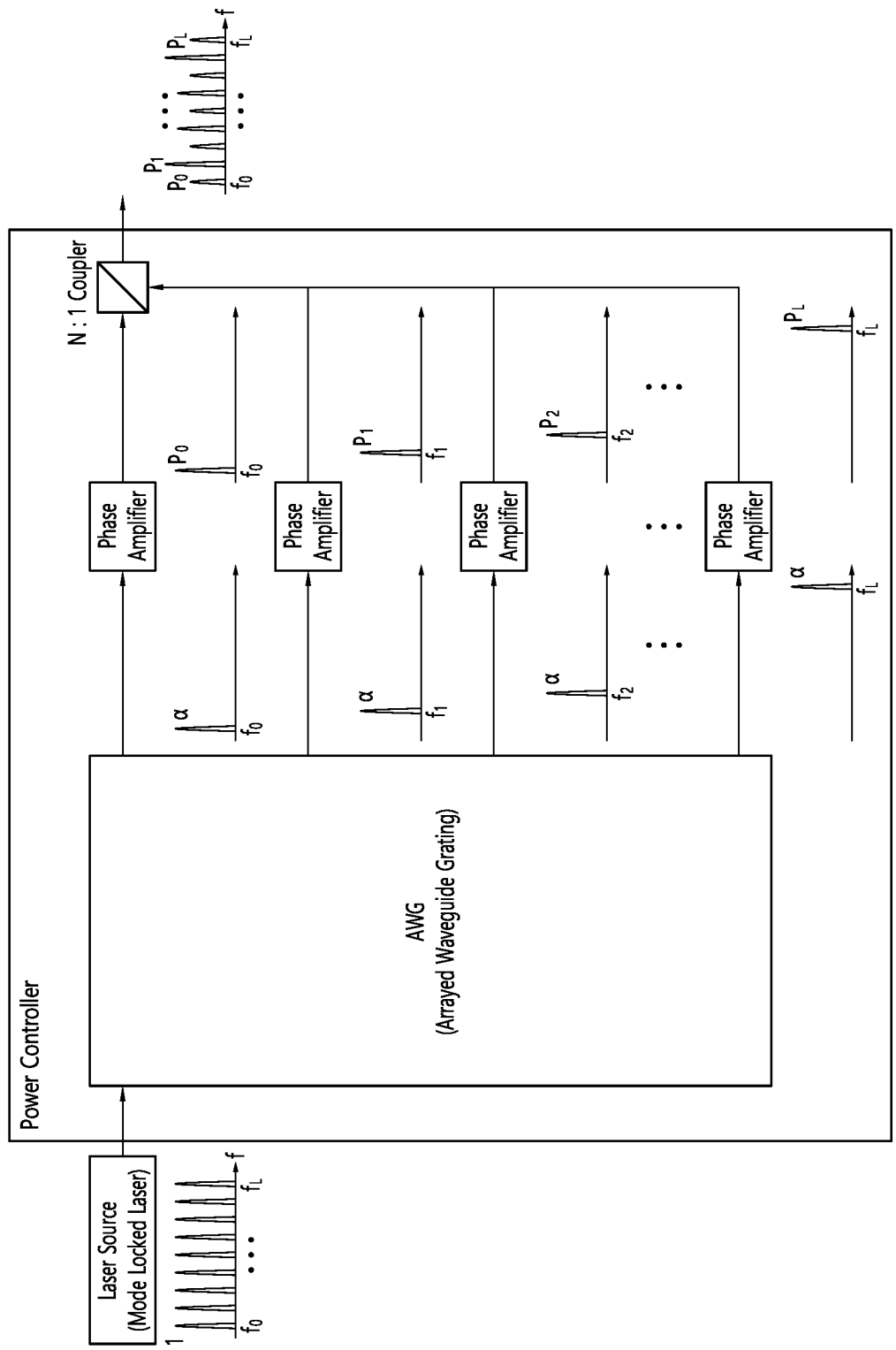
FIG. 60 illustrates a detailed design for another example of a power controller.

FIG. 60 illustrates a detailed design for another example of a power controller.

That is, a signal source from a laser source having a frequency comb characteristic is branched by an AWG, a frequency is selected by the AWG for each branch, power control is performed by a power amplifier for each frequency, and the signal is synthesized by an L:1 coupler. After passing through the power controller, the size of the signal source may be controlled by the power P_k=count($\overline{K}$=k) obtained in 1) for each frequency.

In the above, the power amplifier performs power control using the power value (P_k=count($\overline{K}$=k)) determined by the power control method per frequency proposed in 1). For the sake of simplicity, it is described as L, but for the case where $\Delta f\_m=\alpha*\Delta f\_n$, it should be L=2*($\alpha$*M+N) to cover all ranges of k with respect to P_k. Conversely, for the case $\alpha*\Delta f\_m=\Delta f\_n$, it should be L=2*(M+$\alpha$*N) to cover the range of k for P_k.

2-3) Transmitter Structure w/ Phase & Power Controller (AWG+Phase Shifter+Power Amplifier+L:1 Coupler)

When performing the frequency comb power control proposed in 1), if phase control per frequency is utilized by a special purpose (e.g., beam direction control), a transmitter structure that performs power changes per frequency using a phase and power controller for the signal source from the laser source is proposed.

Figure 61:
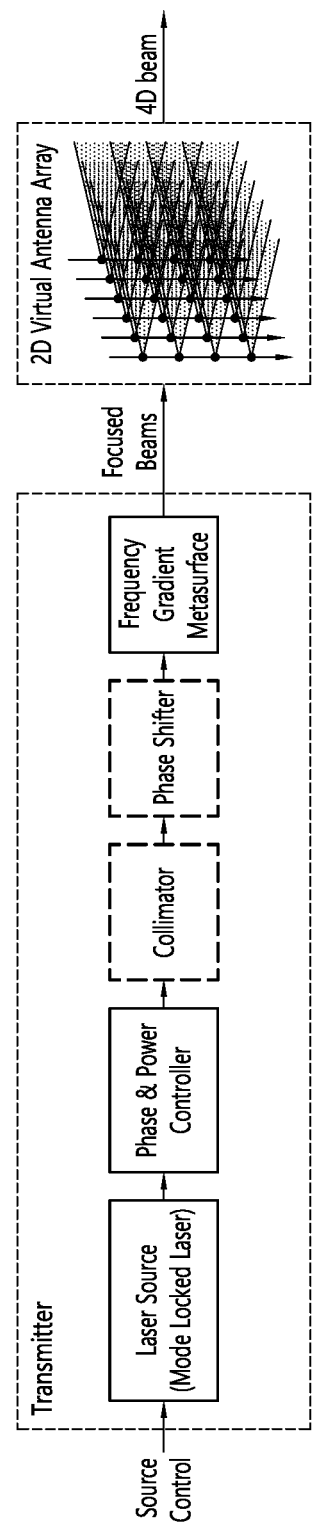
FIG. 61 schematically illustrates another example of a transmitter for performing power change.

FIG. 61 schematically illustrates another example of a transmitter for performing power change.

The power controller may extract the laser signal into L components having different frequency components based on an AWG, where L is a natural number, apply a phase shift to each of the L components, apply power amplification to each of the L phase-shifted components, and generate the synthesized signal from the L components whose power is amplified based on an L:1 coupler.

In this case, the detailed design of the power controller in FIG. 61 is shown below.

Figure 62:
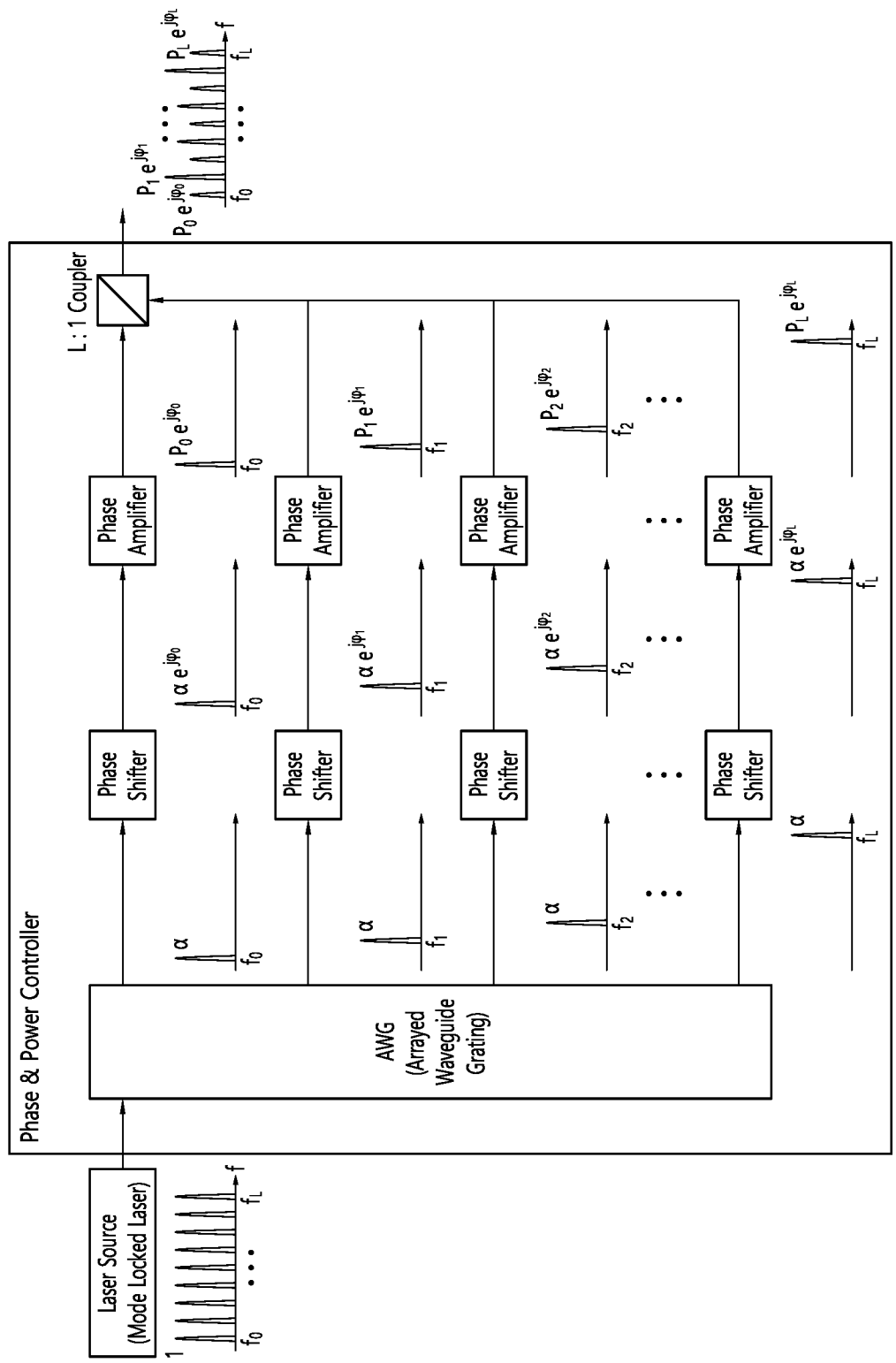
FIG. 62 illustrates a detailed design for another example of a power controller.

FIG. 62 illustrates a detailed design for another example of a power controller.

That is, a signal source from a laser source with frequency comb characteristics is branched by an AWG, a frequency is selected by the AWG for each branch, a phase control is performed by a phase shifter for each frequency, a power control is performed by a power amplifier, and a signal is synthesized by an L:1 coupler. After passing through the above phase & power controller, the size of the signal source can be controlled by the power P_k=count($\overline{K}$=k) obtained in 1) while the phase is controlled by frequency.

In the above, the phase shifter determines the phase for each frequency by a special purpose (e.g., beam direction control), and the power amplifier performs power control using the power value (P_k=count($\overline{K}$=k)) determined by the power control method per frequency proposed in 1). For the sake of simplicity, it is described as L, but for the case where $\Delta f\_m=\alpha*\Delta f\_n$, it should be L=2*($\alpha$*M+N) to cover all ranges of k with respect to P_k. Conversely, for the case $\alpha*\Delta f\_m=\Delta f\_n$, it should be L=2*(M+$\alpha$*N) to cover the range of k for P_k.

From the overall structure above, it is self-evident that the same principle can be applied even if the center frequency is changed.

From the overall structure above, it is self-evident that the same principle can be applied to devices with a different source performing the signal generation (such as RF devices based on local oscillators).

From the overall structure above, it is self-evident that the same principle can be applied to the device configuration of a 2D antenna array.

From the overall structure of the above, it is self-evident that the same principle can be applied to the RADAR device that receives the reflected wave of the radiated signal.

From the above overall structure, it is self-evident that the same principle can be applied to devices that perform communication by radiating processed signals as 4D beams for data transmission.

It is self-evident that the above overall structure can be equally applied to unlicensed bands such as WiFi/LiFi and licensed bands such as LTE/NR.

Example 3. Optimal beam performance with frequency comb power control f_0=193.5 THz ($\lambda$_0=1550 nm)
$\Delta f\_n$=440 MHz ($\Delta f\_m=\alpha\Delta f\_n$)
$\alpha$=2, M=N=5

Conventional (w/o frequency comb power control)

Figure 63:
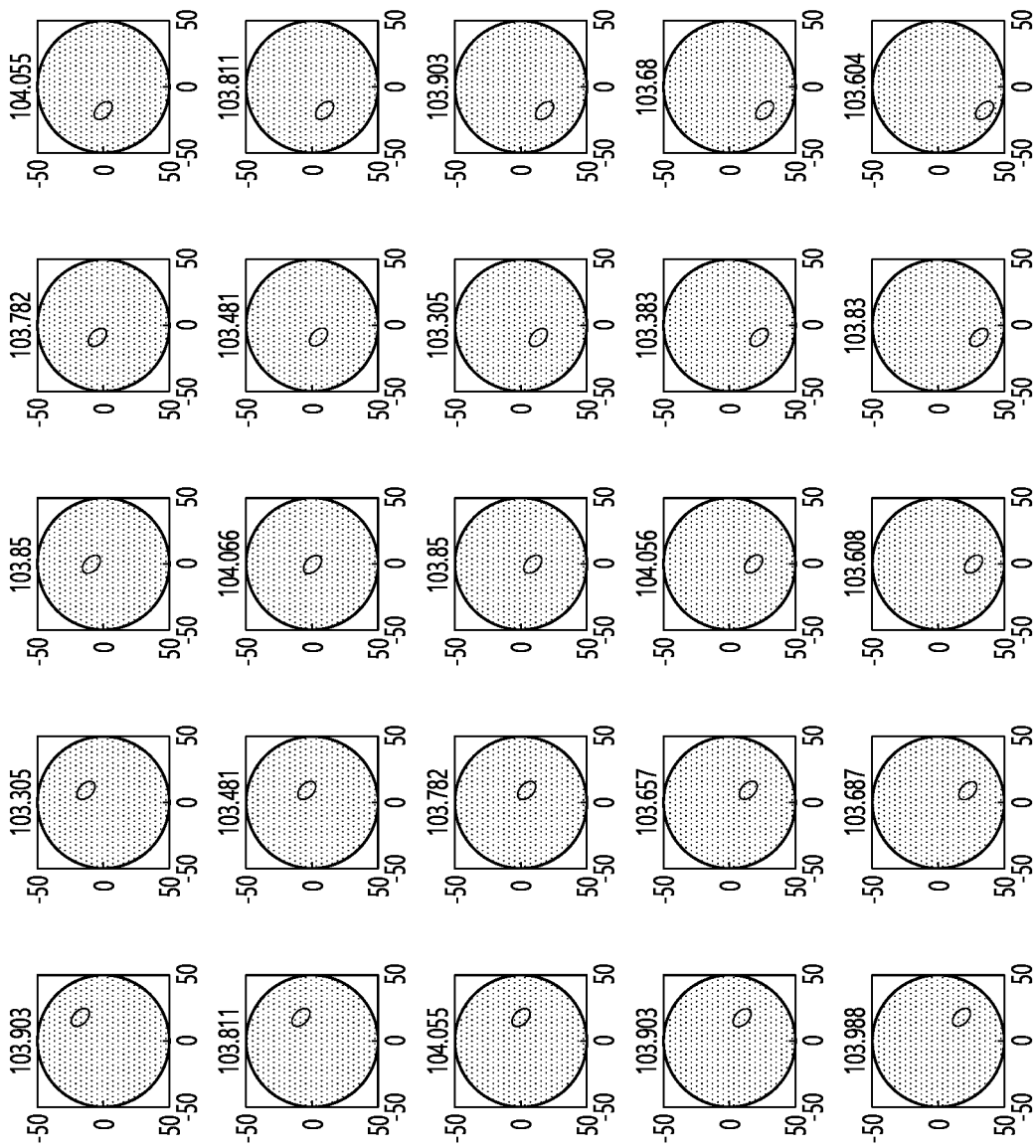
FIG. 63 schematically illustrates an example of beam change over time.

FIG. 63 schematically illustrates an example of beam change over time.

Referring to FIG. 63, the beam change over time (the top number in each figure is the peak beam size) can be seen in the figure.

Another way of expressing this is as follows.

Figure 64:
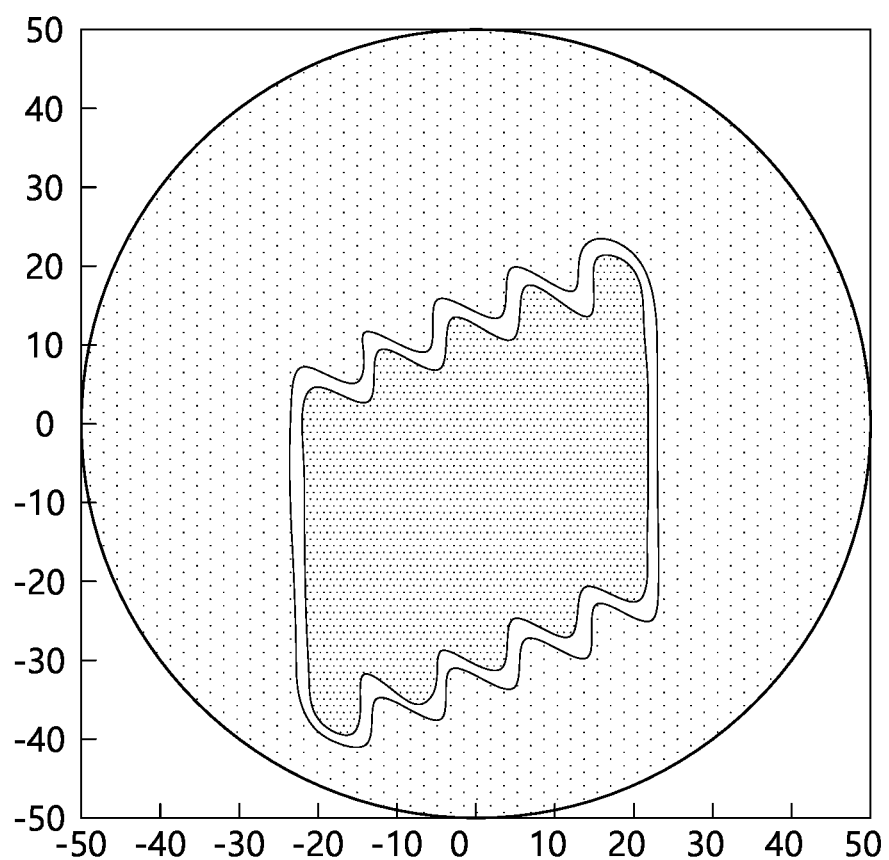
FIG. 64 illustrates a cumulative diagram of an example of beam change over time.

FIG. 64 illustrates a cumulative diagram of an example of beam change over time.

Referring to FIG. 64, a cumulative diagram of an example of a beam change over time can be seen.

Proposed Configuration (w/ frequency comb power control)

Figure 65:
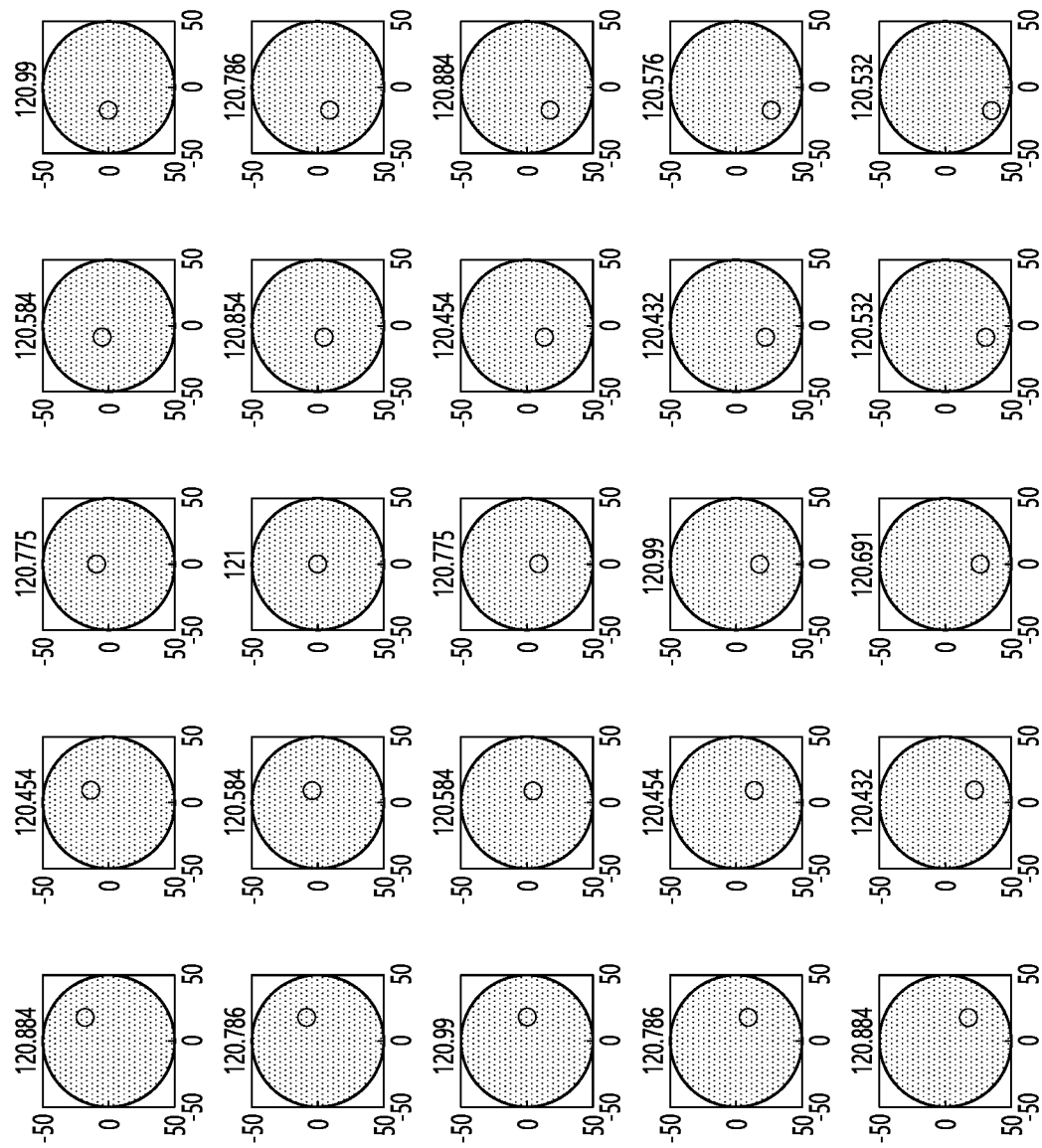
FIG. 65 schematically illustrates an example of beam change over time according to an embodiment of the present disclosure.

FIG. 65 schematically illustrates an example of beam change over time according to an embodiment of the present disclosure.

Referring to FIG. 65, the beam change over time (the top number in each figure is the peak beam size) can be seen in the figure.

Another way of expressing this is as follows.

Figure 66:
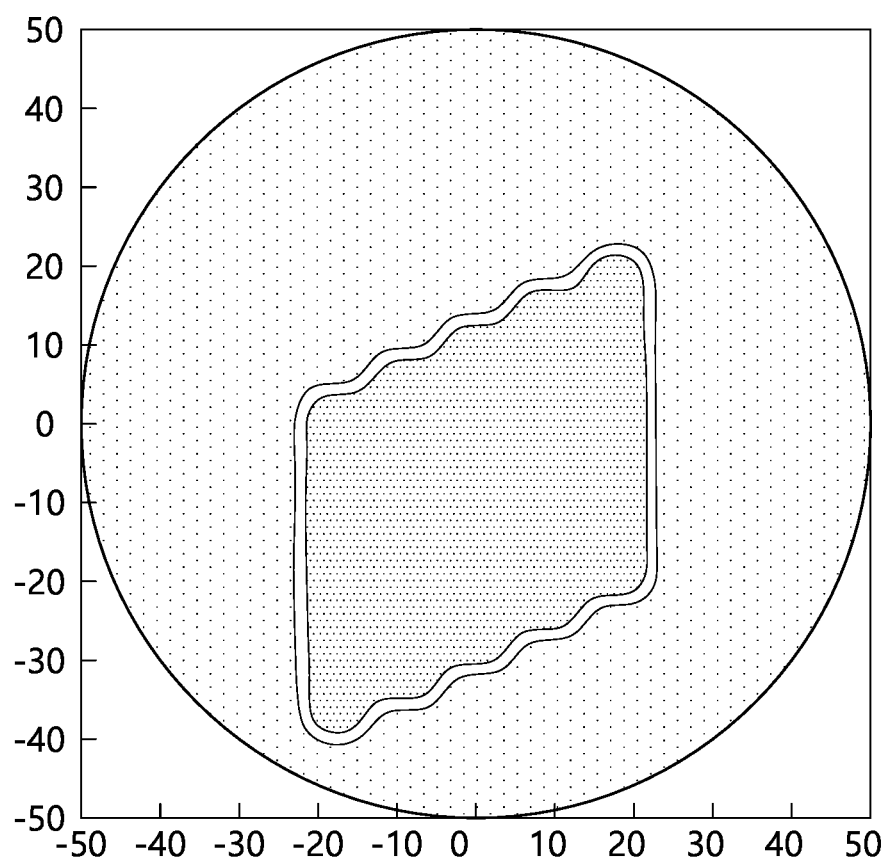
FIG. 66 illustrates a cumulative diagram of an example of beam change over time according to an embodiment of the present disclosure.

FIG. 66 illustrates a cumulative diagram of an example of beam change over time according to an embodiment of the present disclosure.

Referring to FIG. 66, a cumulative diagram of an example of a beam change over time can be seen. As can be seen from the diagram in FIG. 66, it can be seen that a more sophisticated beam shape can be formed in accordance with the embodiments of the present disclosure compared to the prior art.

3) Receiver & Transmitter (between receiver and transmitter)

Based on the method and transmitting device proposed herein, the signaling between the receiver and transmitter may be as described above.

The present disclosure provides transmitter structures and methods of operation that provide the following effects.

A beam with an optimal peak gain can be formed in a target cell area.

When performing beamforming in a target cell area, the shape of the beam can be maintained uniformly.

Interference magnitude in areas other than the target cell area can be minimized.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Hereinafter, the aforementioned examples will be described in various forms to provide a broader understanding of the configurations provided herein.

Hereinafter, for a better understanding of the examples of the present disclosure, the disclosure will be described with reference to the drawings. The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 67:
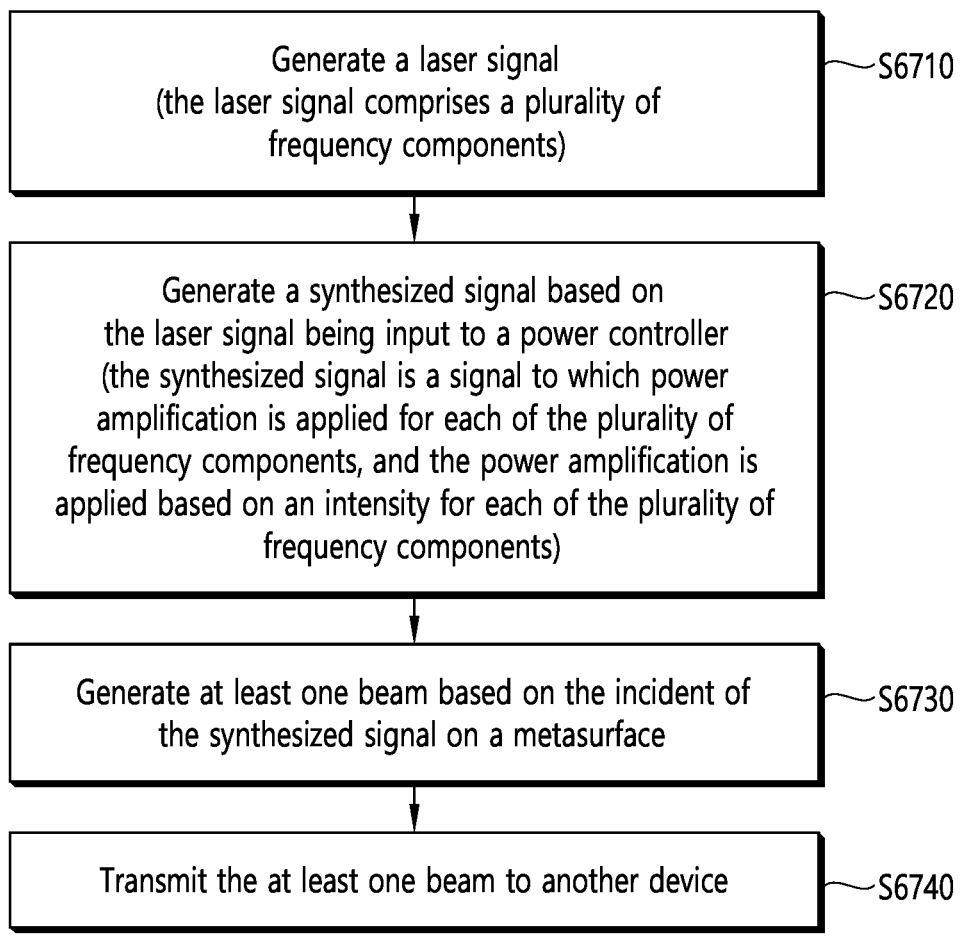
FIG. 67 is a flowchart of a method of transmitting at least one beam, performed by a device, according to an embodiment of the present disclosure.

FIG. 67 is a flowchart of a method of transmitting at least one beam, performed by a device, according to an embodiment of the present disclosure.

According to FIG. 67, the device may generate a laser signal (S6710). Here, the laser signal may comprise a plurality of frequency components. Hereinafter, more specific embodiments of the present disclosure have been described above, and redundant repetition will be omitted.

The device may generate a synthesized signal based on the laser signal being input to the power controller (S6720). Here, the synthesized signal is a signal to which power amplification is applied for each of the plurality of frequency components, and the power amplification may be applied based on an intensity for each of the plurality of frequency components. Hereinafter, more specific embodiments of the present disclosure have been described above, and redundant repetition will be omitted.

The device may generate the at least one beam based on the incident of the synthesized signal on the metasurface (S6730). Hereinafter, more specific embodiments of the present disclosure have been described above, and redundant repetition will be omitted.

The device may transmit the at least one beam to another device (S6740). Hereinafter, more specific embodiments of the present disclosure have been described above, and redundant repetition will be omitted.

Figure 68:
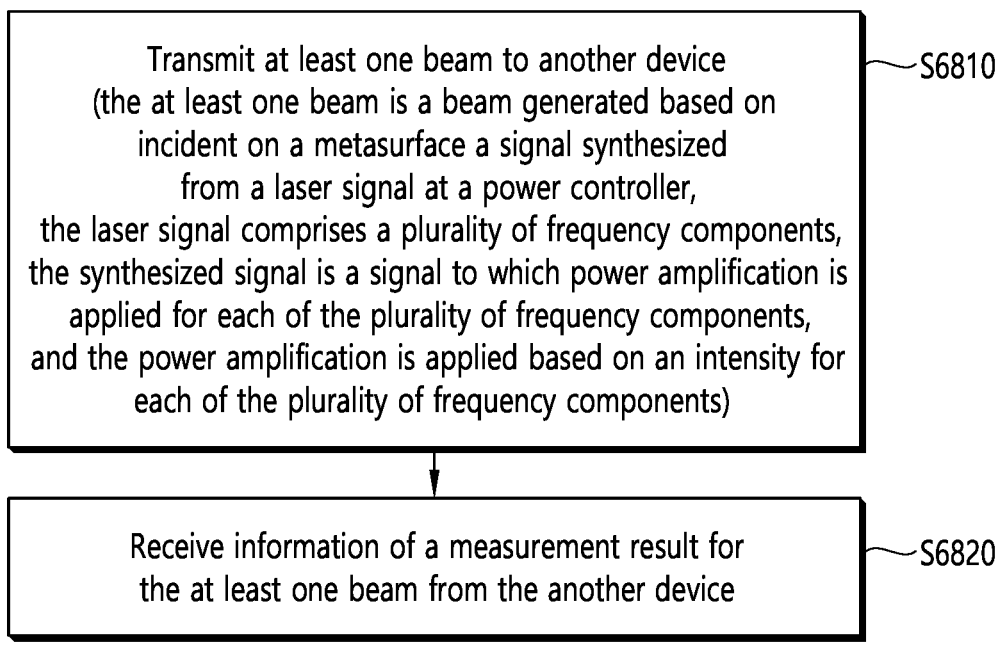
FIG. 68 is a flowchart of a method of transmitting at least one beam, performed by a device, according to another embodiment of the present disclosure.

FIG. 68 is a flowchart of a method of transmitting at least one beam, performed by a device, according to another embodiment of the present disclosure.

According to FIG. 68, the device may transmit the at least one beam to another device (S6810). Hereinafter, more specific embodiments of the present disclosure have been described above, and redundant repetition will be omitted.

Here, the at least one beam may be a beam generated based on incident on the metasurface a signal synthesized from a laser signal at a power controller, the laser signal may comprise a plurality of frequency components, the synthesized signal may be a signal to which power amplification is applied for each of the plurality of frequency components, and the power amplification may be applied based on an intensity for each of the plurality of frequency components. Hereinafter, more specific embodiments of the present disclosure have been described above, and redundant repetition will be omitted.

The device may receive information of a measurement result for the at least one beam from the another device (S6820). Hereinafter, more specific embodiments of the present disclosure have been described above, and redundant repetition will be omitted.

Figure 69:
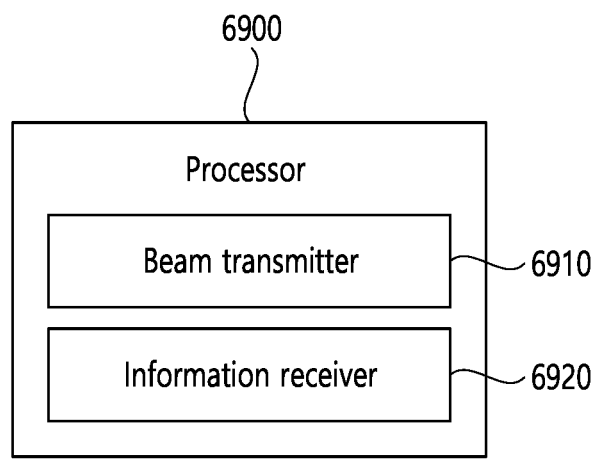
FIG. 69 is a block diagram of an example of a device for transmitting at least one beam, performed by a device, according to an embodiment of the present disclosure.

FIG. 69 is a block diagram of an example of a device for transmitting at least one beam, performed by a device, according to an embodiment of the present disclosure.

According to FIG. 69, a processor 6900 may include a beam transmitter 6910 and an information receiver 6920. The processor herein may correspond to the processor described above and/or a processor to be described later.

The beam transmitter 6910 may be configured to control a transceiver to transmit at least one beam to another device. Hereinafter, more specific embodiments of the present disclosure have been described above, and redundant repetition will be omitted.

The information receiver 6920 may be configured to control the transceiver to receive information of measurement results for the at least one beam from the another device. Hereinafter, more specific embodiments of the present disclosure have been described above, and redundant repetition will be omitted.

Here, the at least one beam may be a beam generated based on incident on the metasurface a signal synthesized from a laser signal at a power controller, the laser signal may comprise a plurality of frequency components, the synthesized signal may be a signal to which power amplification is applied for each of the plurality of frequency components, and the power amplification may be applied based on an intensity for each of the plurality of frequency components. Hereinafter, more specific embodiments of the present disclosure have been described above, and redundant repetition will be omitted.

Although not shown, the present disclosure also provides the following embodiments.

According to an embodiment, a device may be characterized in that the device includes at least one memory and at least one processor operably coupled to the at least one memory, wherein the processor is configured to control a transceiver to transmit at least one beam to another device, and is configured to control the transceiver to receive information of measurement results for the at least one beam from the another device, and wherein the at least one beam is a beam generated based on incident on the metasurface a signal synthesized from a laser signal at a power controller, the laser signal comprises a plurality of frequency components, the synthesized signal is a signal to which power amplification is applied for each of the plurality of frequency components, and the power amplification is applied based on an intensity for each of the plurality of frequency components.

According to another embodiment, at least one computer-readable medium comprising instructions based on being executed by at least one processor may be characterized being configured to control a transceiver to transmit at least one beam to another device, and being configured to control the transceiver to receive information of measurement results for the at least one beam from the another device, and wherein the at least one beam is a beam generated based on incident on the metasurface a signal synthesized from a laser signal at a power controller, the laser signal comprises a plurality of frequency components, the synthesized signal is a signal to which power amplification is applied for each of the plurality of frequency components, and the power amplification is applied based on an intensity for each of the plurality of frequency components.

Figure 70:
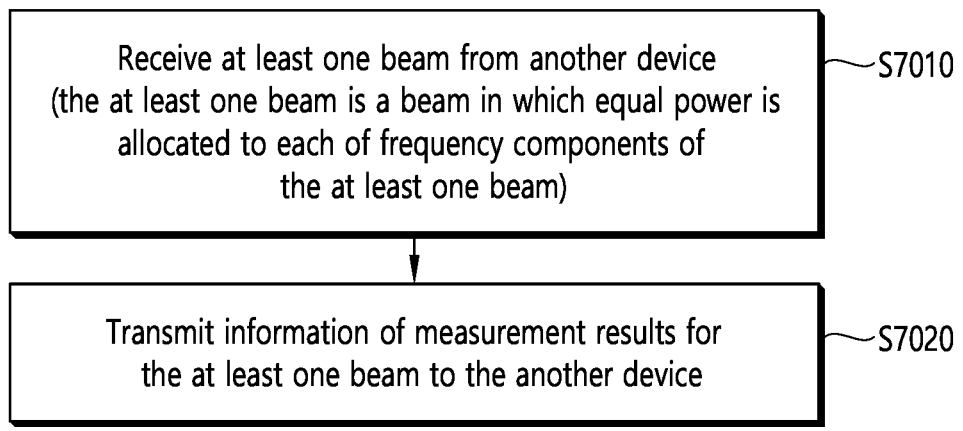
FIG. 70 is a flowchart of a method of receiving at least one beam, performed by a device, according to an embodiment of the present disclosure.

FIG. 70 is a flowchart of a method of receiving at least one beam, performed by a device, according to an embodiment of the present disclosure.

According to FIG. 70, the device may receive the at least one beam from another device (S7010). Hereinafter, more specific embodiments of the present disclosure have been described above, and redundant repetition will be omitted.

The device may transmit information of the measurement results for the at least one beam to the another device (S7020). Hereinafter, more specific embodiments of the present disclosure have been described above, and redundant repetition will be omitted.

Here, the at least one beam may be a beam in which equal power is allocated to each of the frequency components of the at least one beam. Hereinafter, more specific embodiments of the present disclosure have been described above, and redundant repetition will be omitted.

Figure 71:
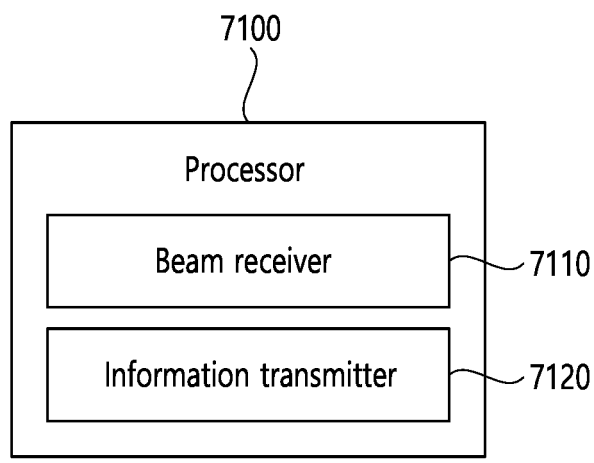
FIG. 71 is a block diagram of an example of a device for receiving at least one beam, performed by a device, according to an embodiment of the present disclosure.

FIG. 71 is a block diagram of an example of a device for receiving at least one beam, performed by a device, according to an embodiment of the present disclosure.

According to FIG. 71, a processor 7000 may include a beam receiver 7110 and an information transmitter 7120. The processor here may correspond to the previously described processor and/or a processor to be described later.

The beam receiver 7110 may be configured to control the transceiver to receive the at least one beam from another device. Hereinafter, more specific embodiments of the present disclosure have been described above, and redundant repetition will be omitted.

The information transmitter 7120 may be configured to control the transceiver to transmit information of measurement results for the at least one beam to the another device. Hereinafter, more specific embodiments of the present disclosure have been described above, and redundant repetition will be omitted.

Here, the at least one beam may be a beam in which equal power is allocated to each of the frequency components of the at least one beam. Hereinafter, more specific embodiments of the present disclosure have been described above, and redundant repetition will be omitted.

Figure 72:
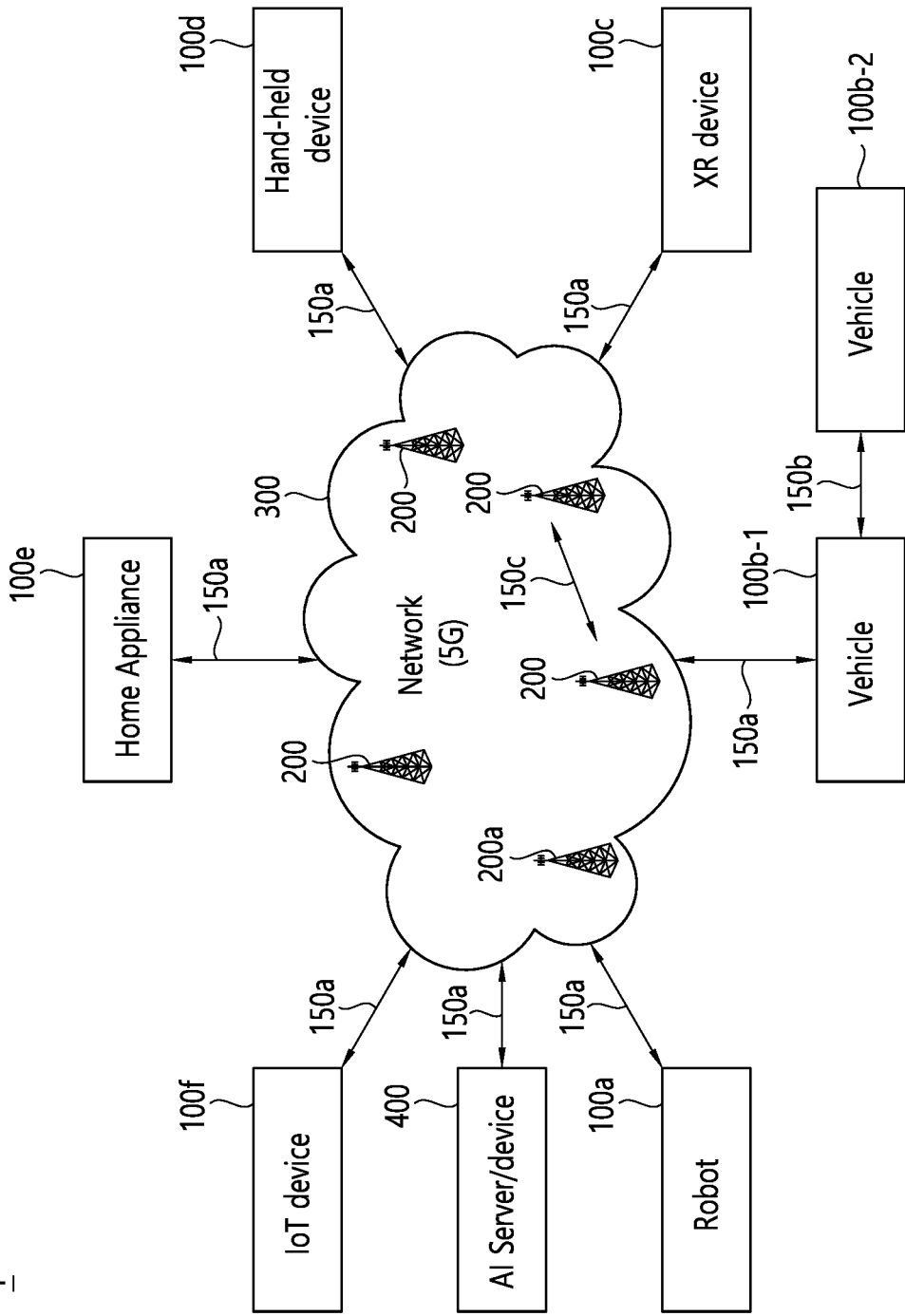
FIG. 72 illustrates a communication system 1 applied to the present disclosure.

FIG. 72 illustrates a communication system 1 applied to the present disclosure.

Referring to FIG. 72, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1, 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, the radio communication technologies implemented in the wireless devices in the present disclosure may include NarrowBand IoT (NB-IoT) technology for low-power communication as well as LTE, NR and 6G. For example, NB-IoT technology may be an example of Low Power Wide Area Network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced MTC (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate Personal Area Networks (PANs) associated with small/low-power digital communication based on various specifications such as IEEE 802.15.4 and may be called various names.

The wireless devices 100*a*-100*f* may be connected to the network 300 via the BSs 200. An AI technology may be applied to the wireless devices 100*a*-100*f* and the wireless devices 100*a*-100*f* may be connected to the AI server 400 via the network 300. The network 300 may be configured using a 3G network, a 4G (e.g., LTE) network, or a 5G (e.g., NR) network. Although the wireless devices 100*a*-100*f* may communicate with each other through the BSs 200/network 300, the wireless devices 100*a*-100*f* may perform direct communication (e.g., sidelink communication) with each other without passing through the BSs/network. For example, the vehicles 100*b*-1, 100*b*-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100*a*-100*f*.

Wireless communication/connections 150*a*, 150*b*, 150*c* may be established between the wireless devices 100*a*~100*f*/ BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a*, 150*b*. For example, the wireless communication/connections 150*a*, 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Meanwhile, NR supports a number of numerologies (or subcarrier spacing (SCS)) to support various 5G services. For example, when the SCS is 15 kHz, it supports a wide area in traditional cellular bands, when SCS is 30 kHz/60 kHz, it supports dense-urban, lower latency and wider carrier bandwidth, for SCS of 60 kHz or higher, bandwidths greater than 24.25 GHz are supported to overcome phase noise.

The NR frequency band may be defined as a frequency range of two types (FR1 and FR2). The number of frequency ranges may be changed, and for example, the frequency ranges of the two types (FR1 and FR2) may be shown in Table 3 below. For convenience of explanation, among the frequency ranges used in the NR system, FR1 may mean "sub 6 GHz range" and FR2 may mean "above 6 GHz range" and may be called millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As described above, the number of frequency ranges of the NR system can be changed. For example, FR1 may include a band of 410 MHz to 7125 MHz as shown in Table 4 below. That is, FR1 may include a frequency band of 6 GHz (or 5850, 5900, 5925 MHz, etc.) or higher. For example, a frequency band of 6 GHz (or 5850, 5900, 5925 MHz, etc.) or higher included in FR1 may include an unlicensed band.

The unlicensed band may be used for various purposes, and may be used, for example, for vehicle communication (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 73:
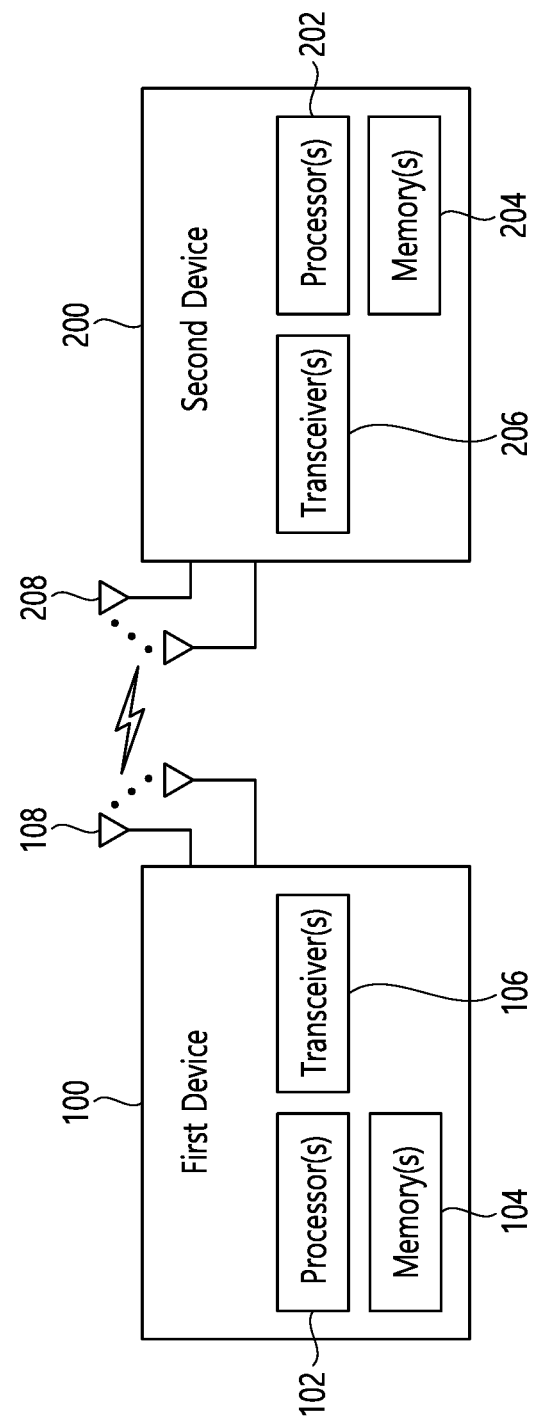
FIG. 73 illustrates an example of a wireless device that may be applicable to the present disclosure.

Hereinafter, an example of a wireless device to which the present specification is applied will be described. FIG. 73 illustrates an example of a wireless device that may be applicable to the present disclosure.

Referring to FIG. 73, a first wireless device 100 and a second wireless device 200 may transmit radio signals through a variety of RATs (e.g., LTE and NR). Herein, {the first wireless device 100 and the second wireless device 200} may correspond to {the wireless device 100x, the BS 200} and/or {the wireless device 100x, the wireless device 100x} of FIG. 72.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100, 200 will be described more specifically. One or more protocol layers may be implemented by, without being limited to, one or more processors 102, 202. For example, the one or more processors 102, 202 may implement one or more layers (e.g., functional layers such as PHY, MAC, RLC, PDCP, RRC, and SDAP). The one or more processors 102, 202 may generate one or more Protocol Data Units (PDUs) and/or one or more Service Data Unit (SDUs)

according to the descriptions, functions, procedures, proposals, methods, and/or operational flowcharts disclosed in this document. The one or more processors 102, 202 may generate messages, control information, data, or information according to the descriptions, functions, procedures, proposals, methods, and/or operational flowcharts disclosed in this document. The one or more processors 102, 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106, 206. The one or more processors 102, 202 may receive the signals (e.g., baseband signals) from the one or more transceivers 106, 206 and obtain the PDUs, SDUs, messages, control information, data, or information according to the descriptions, functions, procedures, proposals, methods, and/or operational flowcharts disclosed in this document.

The one or more processors 102, 202 may be referred to as controllers, microcontrollers, microprocessors, or microcomputers. The one or more processors 102, 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102, 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102, 202 or stored in the one or more memories 104, 204 so as to be driven by the one or more processors 102, 202. The descriptions, functions, procedures, proposals, methods, and/or operational flowcharts disclosed in this document may be implemented using firmware or software in the form of code, commands, and/or a set of commands.

The one or more memories 104, 204 may be connected to the one or more processors 102, 202 and store various types of data, signals, messages, information, programs, code, instructions, and/or commands. The one or more memories 104, 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104, 204 may be located at the interior and/or exterior of the one or more processors 102, 202. The one or more memories 104, 204 may be connected to the one or more processors 102, 202 through various technologies such as wired or wireless connection.

The one or more transceivers 106, 206 may transmit user data, control information, and/or radio signals/channels, mentioned in the methods and/or operational flowcharts of this document, to one or more other devices. The one or more transceivers 106, 206 may receive user data, control information, and/or radio signals/channels, mentioned in the descriptions, functions, procedures, proposals, methods, and/or operational flowcharts disclosed in this document, from one or more other devices. For example, the one or more transceivers 106, 206 may be connected to the one or more processors 102, 202 and transmit and receive radio signals. For example, the one or more processors 102, 202 may perform control so that the one or more transceivers 106, 206 may transmit user data, control information, or radio signals to one or more other devices. The one or more processors 102, 202 may perform control so that the one or more transceivers 106, 206 may receive user data, control information, or radio signals from one or more other devices. The one or more transceivers 106, 206 may be connected to the one or more antennas 108, 208 and the one or more transceivers 106, 206 may be configured to transmit and receive user data, control information, and/or radio signals/channels, mentioned in the descriptions, functions, procedures, proposals, methods, and/or operational flowcharts disclosed in this document, through the one or more antennas 108, 208. In this document, the one or more antennas may be a plurality of physical antennas or a plurality of logical antennas (e.g., antenna ports). The one or more transceivers 106, 206 may convert received radio signals/channels, and so on, from RF band signals into baseband signals in order to process received user data, control information, radio signals/channels, and so on, using the one or more processors 102, 202. The one or more transceivers 106, 206 may convert the user data, control information, radio signals/channels, and so on, processed using the one or more processors 102, 202 from the base band signals into the RF band signals. To this end, the one or more transceivers 106, 206 may include (analog) oscillators and/or filters.

Figure 74:
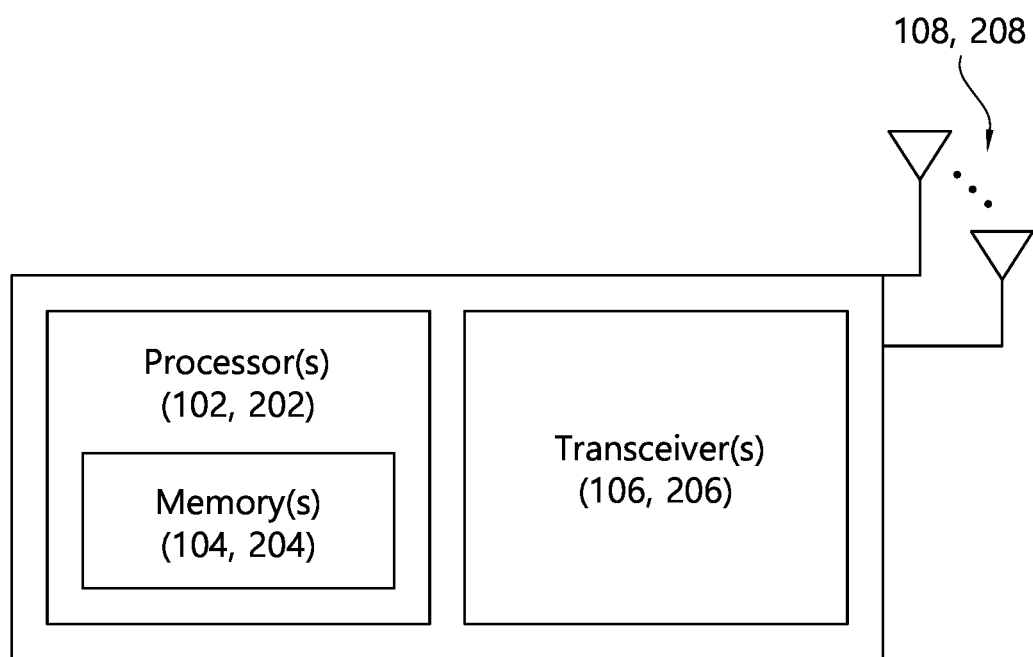
FIG. 74 illustrates another example of a wireless device that may be applicable to the present disclosure.

FIG. 74 illustrates another example of a wireless device that may be applicable to the present disclosure.

According to FIG. 74, a wireless device may include at least one processor 102, 202, at least one memory 104, 204, at least one transceiver 106, 206, and one or more antennas 108, 208.

As a difference between the example of the wireless device described above in FIG. 73 and the example of the wireless device in FIG. 74, in FIG. 73, the processors 102 and 202 and the memories 104 and 204 are separated, but in the example of FIG. 74, the memory 104, 204 is included in the processor 102, 202.

Here, the detailed description of the processors 102 and 202, the memories 104 and 204, the transceivers 106 and 206, and one or more antennas 108 and 208 is as described above, in order to avoid unnecessary repetition of description, description of repeated description is omitted.

Hereinafter, an example of a signal processing circuit to which the present specification is applied will be described.

Figure 75:
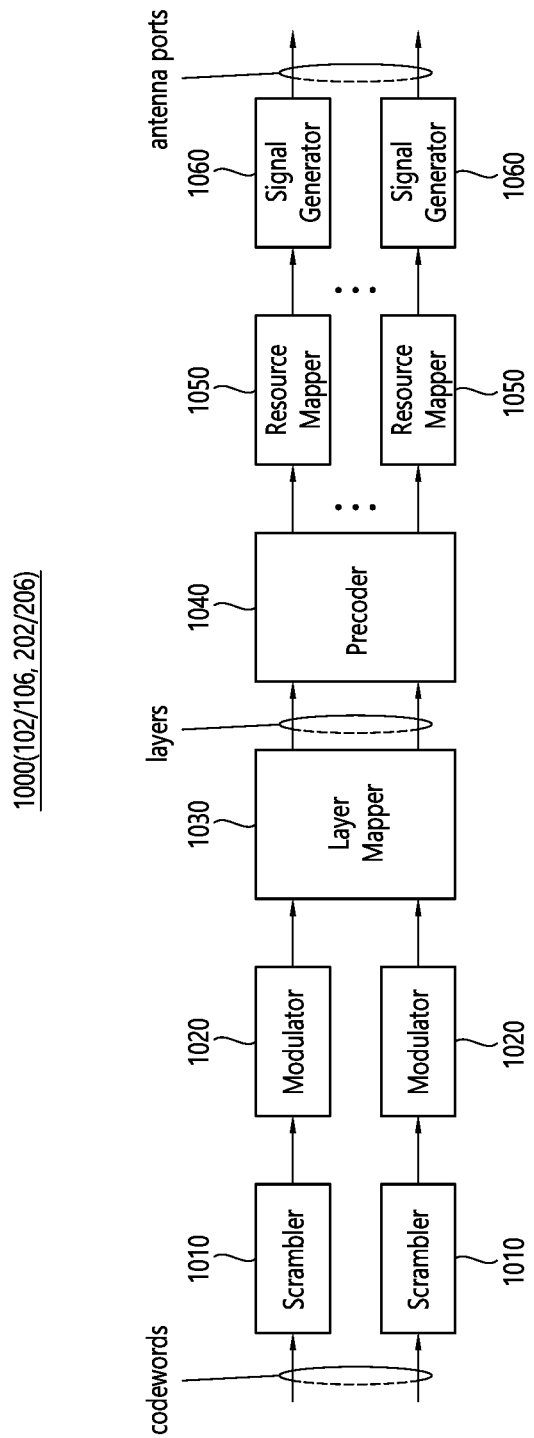
FIG. 75 illustrates an example of a signal processing circuit for a transmission signal.

FIG. 75 illustrates an example of a signal processing circuit for a transmission signal.

Referring to FIG. 75, a signal processing circuit 1000 may include scramblers 1010, modulators 1020, a layer mapper 1030, a precoder 1040, resource mappers 1050, and signal generators 1060. An operation/function of FIG. 75 may be performed, without being limited to, the processors 102, 202 and/or the transceivers 106, 206 of FIG. 73. Hardware elements of FIG. 75 may be implemented by the processors 102, 202 and/or the transceivers 106, 206 of FIG. 73. For example, blocks 1010-1060 may be implemented by the processors 102, 202 of FIG. 73. Alternatively, the blocks 1010-1050 may be implemented by the processors 102, 202 of FIG. 73 and the block 1060 may be implemented by the transceivers 106, 206 of FIG. 73.

Codewords may be converted into radio signals via the signal processing circuit 1000 of FIG. 75. Herein, the codewords are encoded bit sequences of information blocks.

The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030.

Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010-1060 of FIG. 75. For example, the wireless devices (e.g., 100, 200 of FIG. 73) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Hereinafter, an example of using a wireless device to which the present disclosure is applied will be described.

Figure 76:
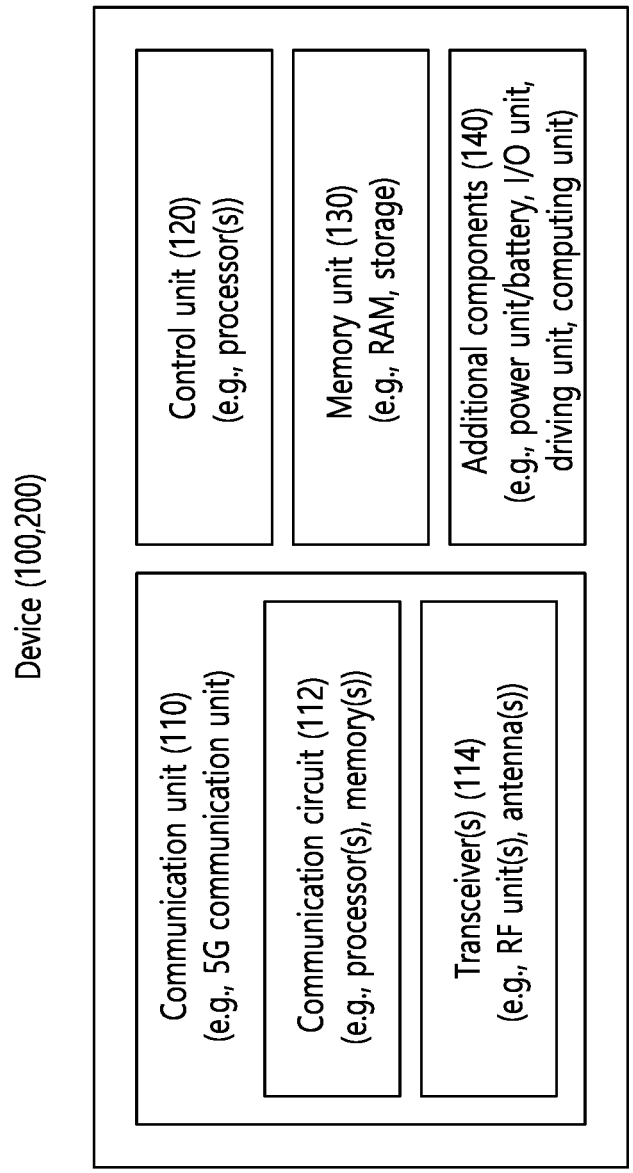
FIG. 76 illustrates another example of a wireless device applied to the present disclosure.

FIG. 76 illustrates another example of a wireless device applied to the present disclosure. The wireless device may be implemented in various forms according to a use-case/service (refer to FIG. 72).

Referring to FIG. 76, wireless devices 100, 200 may correspond to the wireless devices 100, 200 of FIG. 73 and may be configured by various elements, components, units/portions, and/or modules. For example, each of the wireless devices 100, 200 may include a communication unit 110, a control unit 120, a memory unit 130, and additional components 140. The communication unit may include a communication circuit 112 and transceiver(s) 114. For example, the communication circuit 112 may include the one or more processors 102, 202 and/or the one or more memories 104, 204 of FIG. 73. For example, the transceiver(s) 114 may include the one or more transceivers 106, 206 and/or the one or more antennas 108, 208 of FIG. 73. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 72), the vehicles (100b-1, 100b-2 of FIG. 72), the XR device (100c of FIG. 72), the hand-held device (100d of FIG. 72), the home appliance (100e of FIG. 72), the IoT device (100f of FIG. 72), a digital broadcast terminal, a hologram device, a public safety device, an MTC device, a medicine device, a fintech device (or a finance device), a security device, a climate/environment device, the AI server/device (400 of FIG. 72), the BSs (200 of FIG. 72), a network node, and so on. The wireless device may be used in a mobile or fixed place according to a use-example/service.

In FIG. 76, the entirety of the various elements, components, units/portions, and/or modules in the wireless devices 100, 200 may be connected to each other through a wired interface or at least a part thereof may be wirelessly connected through the communication unit 110. For example, in each of the wireless devices 100, 200, the control unit 120 and the communication unit 110 may be connected by wire and the control unit 120 and first units (e.g., 130, 140) may be wirelessly connected through the communication unit 110. Each element, component, unit/portion, and/or module within the wireless devices 100, 200 may further include one or more elements. For example, the control unit 120 may be configured by a set of one or more processors.

As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 76 will be described in detail with reference to the drawings.

Figure 77:
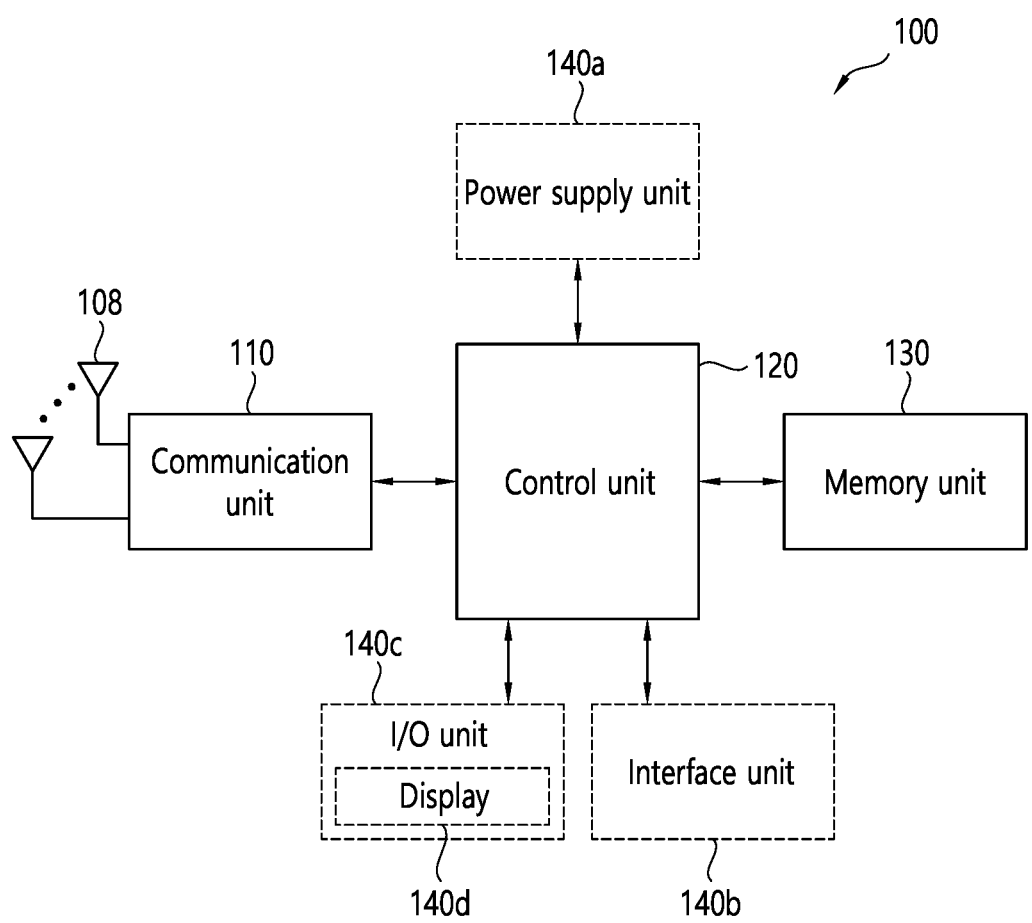
FIG. 77 illustrates an example of a hand-held device applied to the present disclosure.

FIG. 77 illustrates an example of a hand-held device applied to the present disclosure. The hand-held device may include smartphones, smartpads, wearable devices (e.g., smartwatches, smartglasses), and portable computers (e.g., laptops). A hand-held device may be referred to as a Mobile Station (MS), User Terminal (UT), Mobile Subscriber Station (MSS), Subscriber Station (SS), Advanced Mobile Station (AMS), or Wireless Terminal (WT).

Referring to FIG. 77, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110~130/140a~140c correspond to the blocks 110~130/140 of FIG. 76, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, and so on. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may obtain information/signals (e.g., touch, text, voice, images, or video) input by a user and the obtained information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 78:
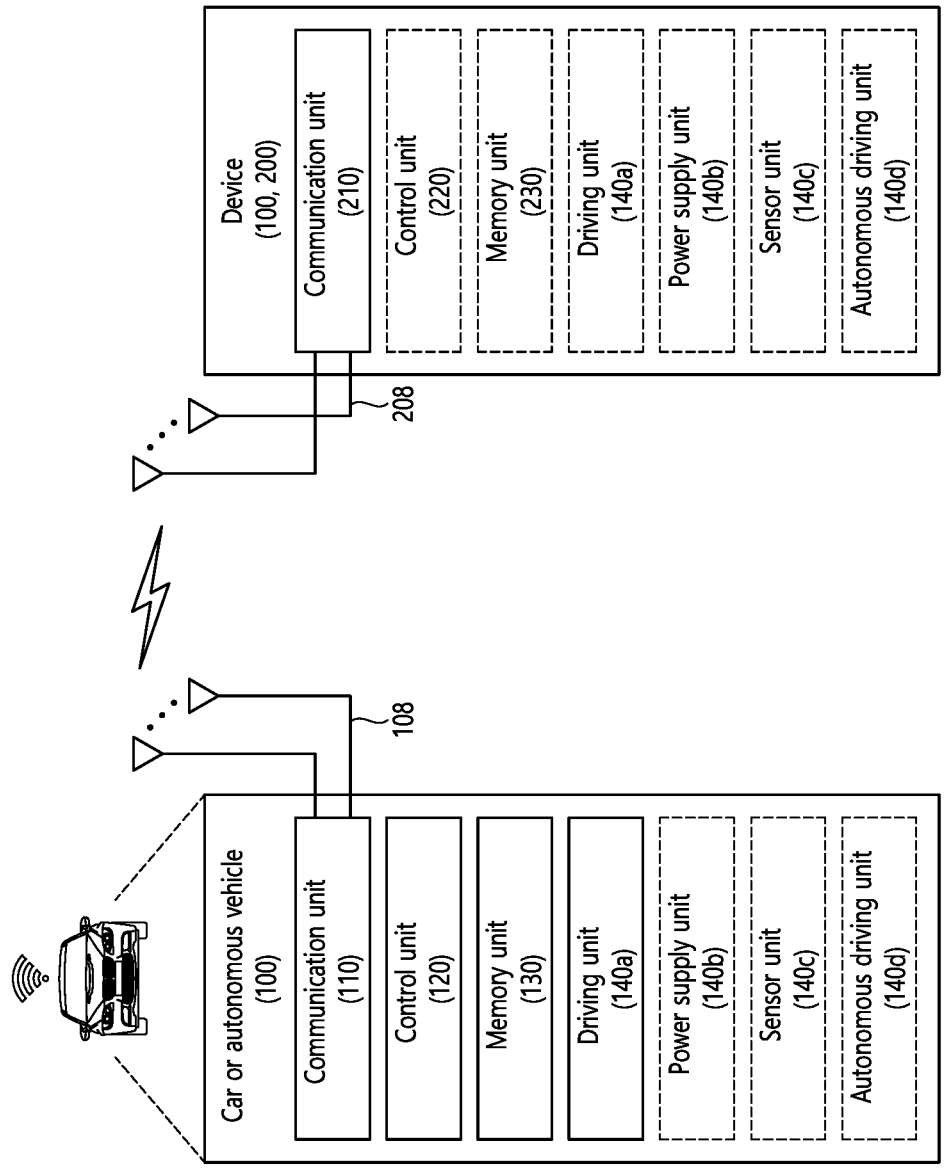
FIG. 78 illustrates an example of a vehicle or autonomous vehicle applied to the present disclosure.

FIG. 78 illustrates an example of a vehicle or autonomous vehicle applied to the present disclosure. The vehicle or autonomous vehicle may be implemented by a mobile robot, a car, a train, a manned/unmanned Aerial Vehicle (AV), a ship, and so on.

Referring to FIG. 78, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a~140d correspond to the blocks 110/130/140 of FIG. 76, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, and so on. The power supply unit 140b may supply power to the vehicle or the autonomous vehicle 100 and include a wired/wireless charging circuit, a battery, and so on. The sensor unit 140c may obtain a vehicle state, ambient environment information, user information, and so on. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, and so on, from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically obtain recent traffic information data from the external server and obtain surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Figure 79:
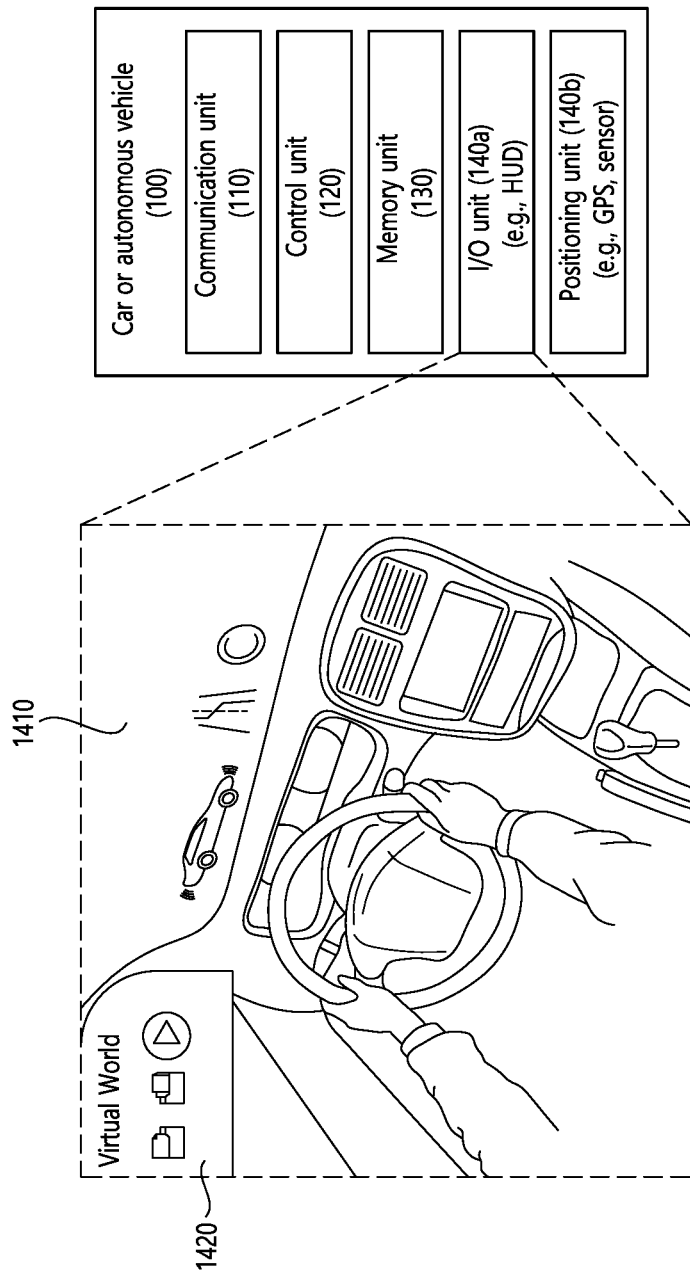
FIG. 79 illustrates an example of a vehicle applied to the present disclosure.

FIG. 79 illustrates an example of a vehicle applied to the present disclosure. The vehicle may be implemented as a transport means, an aerial vehicle, a ship, and so on.

Referring to FIG. 79, a vehicle 100 may include a communication unit 110, a control unit 120, a memory unit 130, an I/O unit 140a, and a positioning unit 140b. Herein, the blocks 110~130/140a~140b correspond to blocks 110~130/140 of FIG. 76.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may obtain information on the position of the vehicle 100. The position information may include information on an absolute position of the vehicle 100, information on the position of the vehicle 100 within a traveling lane, acceleration information, and information on the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140*b* may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle 1410, 1420. The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormity to neighboring vehicles through the communication unit 110. According to situation, the control unit 120 may transmit the vehicle position information and the information on driving/vehicle abnormality to related organizations.

Figure 80:
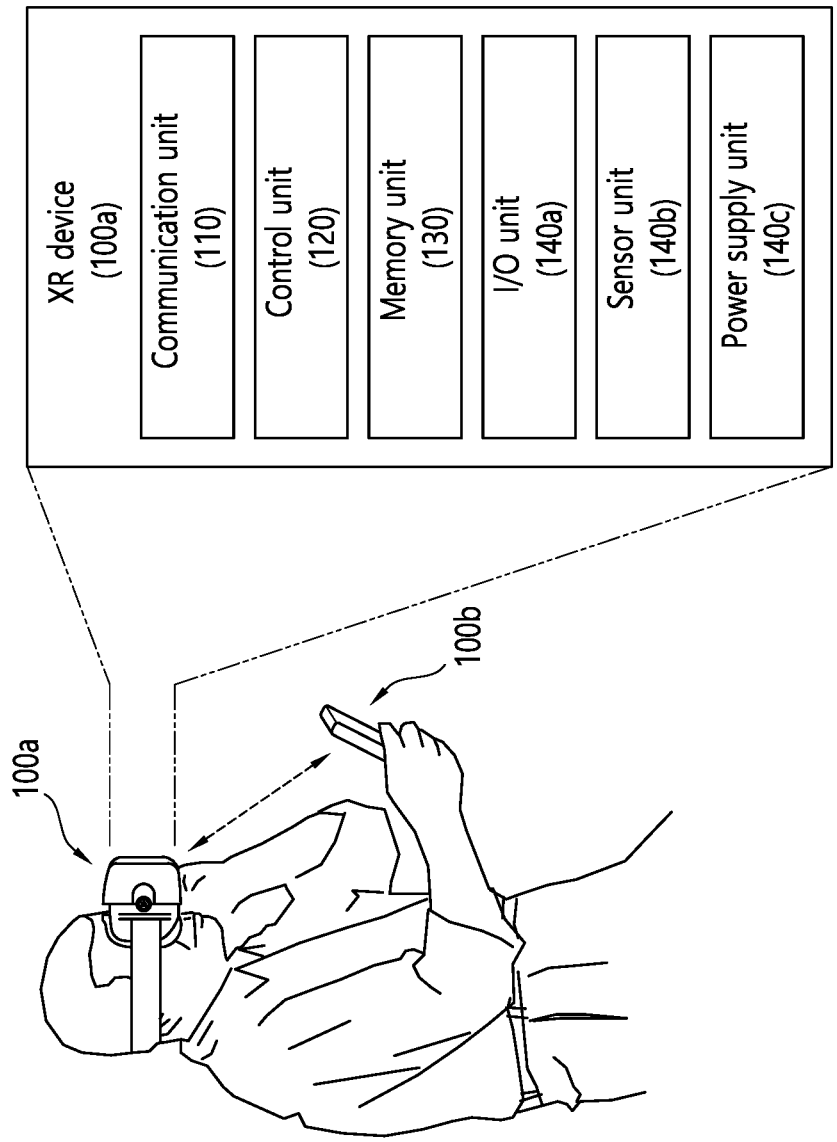
FIG. 80 illustrates an example of an XR device applied to the present disclosure.

FIG. 80 illustrates an example of an XR device applied to the present disclosure. The XR device may be implemented by an HMD, an HUD mounted in a vehicle, a television, a smartphone, a computer, a wearable device, a home appliance, a digital signage, a vehicle, a robot, and so on.

Referring to FIG. 80, an XR device 100*a* may include a communication unit 110, a control unit 120, a memory unit 130, an I/O unit 140*a*, a sensor unit 140*b*, and a power supply unit 140*c*. Herein, the blocks 110~130/140*a*~140*c* correspond to the blocks 110~130/140 of FIG. 76, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, and so on. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, and so on.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information on a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information on a 3D position of the hand-held device 100*b* and generate and output an XR object corresponding to the hand-held device 100*b*.

Figure 81:
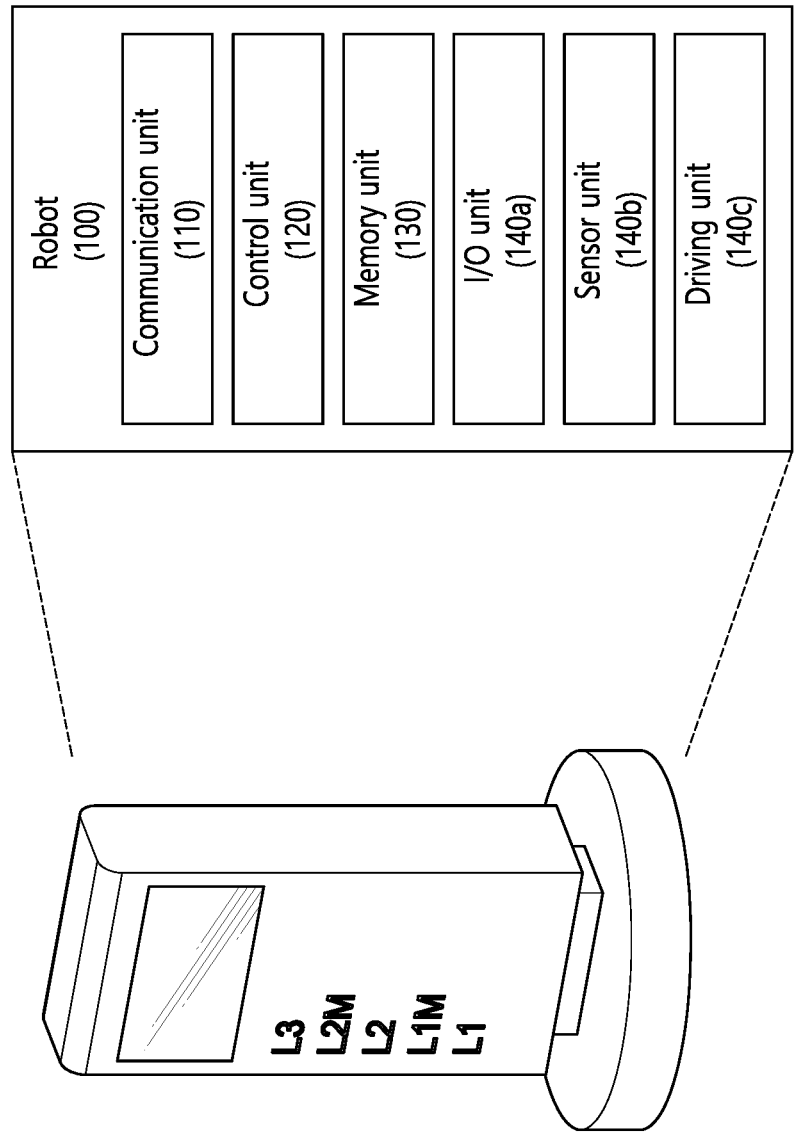
FIG. 81 illustrates an example of a robot applied to the present disclosure.

FIG. 81 illustrates an example of a robot applied to the present disclosure. The robot may be categorized into an industrial robot, a medical robot, a household robot, a military robot, and so on, according to a used purpose or field.

Referring to FIG. 81, a robot 100 may include a communication unit 110, a control unit 120, a memory unit 130, an I/O unit 140*a*, a sensor unit 140*b*, and a driving unit 140*c*. Herein, the blocks 110~130/140*a*~140*c* correspond to the blocks 110~130/140 of FIG. 76, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140*a* may obtain information from the exterior of the robot 100 and output information to the exterior of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, and so on. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit 140*c* may perform various physical operations such as movement of robot joints. In addition, the driving unit 140*c* may cause the robot 100 to travel on the road or to fly. The driving unit 140*c* may include an actuator, a motor, a wheel, a brake, a propeller, and so on.

Figure 82:
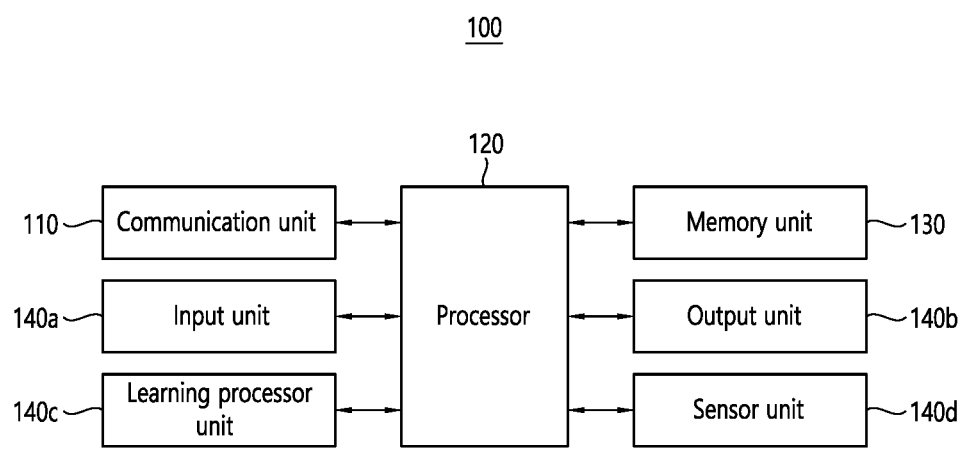
FIG. 82 illustrates an example of an AI device applied to the present disclosure.

FIG. 82 illustrates an example of an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, and so on.

Referring to FIG. 82, an AI device 100 may include a communication unit 110, a control unit 120, a memory unit 130, an I/O unit 140*a*/140*b*, a learning processor unit 140*c*, and a sensor unit 140*d*. The blocks 110~130/140*a*~140*d* correspond to blocks 110~130/140 of FIG. 76, respectively.

The communication unit 110 may transmit and receive wired/radio signals (e.g., sensor information, user input, learning models, or control signals) to and from external devices such as other AI devices (e.g., 100x, 200, 400 of FIG. 72) or an AI server 200 using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 72). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may obtain various types of data from the exterior of the AI device 100. For example, the input unit 140a may obtain learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 72). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

The claims set forth herein can be combined in a variety of ways. For example, the technical features of the method claims of this specification may be combined to be implemented as a device, and the technical features of the device claims of this specification may be combined to be implemented as a method. In addition, the technical features of the method claims of the present specification and the technical features of the device claims may be combined to be implemented as a device, and the technical features of the method claims of the present specification and the technical features of the device claims may be combined to be implemented as a method.

What is claimed is:

1. A method comprising:
    transmitting, by a first device, at least one beam to a second device; and
    receiving, by the first device, information of a measurement result for the at least one beam from the second device,
    wherein the at least one beam is generated based on a signal synthesized, at a power controller, from a laser signal being incident on a metasurface,
    wherein the laser signal comprises a plurality of frequency components,
    wherein the synthesized signal is a signal to which power amplification is applied for each of the plurality of frequency components, and
    wherein the power amplification is applied based on an intensity for each of the plurality of frequency components.

2. The method of claim 1, wherein the laser signal is generated by a laser source of the first device.

3. The method of claim 2, wherein the first device includes the laser source, the metasurface, and the power controller.

4. The method of claim 1, wherein the plurality of frequency components is classified into L frequency components.

5. The method of claim 4, wherein the power controller,
    branches the laser signal into L signals based on a 1:L coupler,
    where L is a natural number;
    selects, based on L filters, L components from each of the L signals corresponding to a frequency component of each of the L filters;
    applies the power amplification to each of the L components; and
    generates the synthesized signal from the L components whose power is amplified based on an L:1 coupler.

6. The method of claim 4, wherein the power controller,
    extracts the laser signal into L components with different frequency components based on an Arrayed Waveguide Grating (AWG),
    where L is a natural number;
    applies the power amplification to each of the L components; and
    generates the synthesized signal from the L components whose power is amplified based on an L:1 coupler.

7. The method of claim 4, wherein the power controller,
    extracts the laser signal into L components with different frequency components based on an Arrayed Waveguide Grating (AWG),
    where L is a natural number;
    applies a phase shift to each of the L components;
    applies the power amplification to each of the L components whose phase is shifted; and
    generates the synthesized signal from the L components whose power is amplified based on an L:1 coupler.

8. The method of claim 1, wherein the first device is a base station, and the second device is a terminal.

9. A first device comprising:
a transceiver;
at least one processor; and
at least one memory operably connectable to the at least one processor and storing instructions that, based on being executed by the at least one processor, perform operations comprising:
transmitting, via the transceiver, at least one beam to a second device; and
receiving, via the transceiver, information of a measurement result for the at least one beam from the second device,
wherein the at least one beam is generated based on signal synthesized, at a power controller, from a laser signal being incident on a metasurface,
wherein the laser signal comprises a plurality of frequency components,
wherein the synthesized signal is a signal to which power amplification is applied for each of the plurality of frequency components, and
wherein the power amplification is applied based on an intensity for each of the plurality of frequency components.

* * * * *